United States Patent
Shishido et al.

(10) Patent No.: US 8,554,880 B2
(45) Date of Patent: Oct. 8, 2013

(54) SYSTEM FOR CLASSIFICATION, LOCATION AND TRANSMISSION OF MUSIC PLAYLISTS

(75) Inventors: Ichiro Shishido, Yokohama (JP); Masaaki Makino, Yokohama (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 95 days.

(21) Appl. No.: 12/921,034

(22) PCT Filed: Mar. 6, 2009

(86) PCT No.: PCT/JP2009/054324
§ 371 (c)(1),
(2), (4) Date: Sep. 3, 2010

(87) PCT Pub. No.: WO2009/110605
PCT Pub. Date: Sep. 11, 2009

(65) Prior Publication Data
US 2011/0016198 A1     Jan. 20, 2011

(30) Foreign Application Priority Data

Mar. 7, 2008  (JP) ................................ 2008-058216
Mar. 17, 2008  (JP) ................................ 2008-068274

(51) Int. Cl.
*G06F 15/16*    (2006.01)
(52) U.S. Cl.
USPC ....................................................... 709/219
(58) Field of Classification Search
USPC ....................................................... 709/219
See application file for complete search history.

(56) References Cited

U.S. PATENT DOCUMENTS

| | | | |
|---|---|---|---|
| 5,659,666 A * | 8/1997 | Thaler | 706/16 |
| 7,206,775 B2 * | 4/2007 | Kaiser et al. | 1/1 |
| 8,101,844 B2 * | 1/2012 | Silbert et al. | 84/613 |
| 2006/0143236 A1 | 6/2006 | Wu | |
| 2006/0170945 A1 * | 8/2006 | Bill | 358/1.13 |

FOREIGN PATENT DOCUMENTS

| | | |
|---|---|---|
| EP | 1 708 200 A1 | 10/2006 |
| JP | 2003-015666 A | 1/2003 |
| JP | 2004-117632 A | 4/2004 |
| JP | 2005-276337 A | 10/2005 |
| JP | 2006-268100 A | 10/2006 |
| JP | 2007-274105 A | 10/2007 |
| JP | 2007-287256 A | 11/2007 |
| WO | 2006/048988 A1 | 5/2006 |
| WO | 2006/077769 A1 | 7/2006 |
| WO | 2006/109488 A1 | 10/2006 |

OTHER PUBLICATIONS

Search Report issued on Jun. 24, 2011 in the counterpart European application No. 09718296.8, 7 pages.

* cited by examiner

*Primary Examiner* — Ryan Jakovac
(74) *Attorney, Agent, or Firm* — Nath, Goldberg & Meyer; Jerald L. Meyer; Stanley N. Protigal

(57) ABSTRACT

A server (1) transmits playlists, each playlist including a description of content acquisition information, and playlist configuration data represented between playlists in numerical values. A terminal device (2) receives playlists and playlist configuration data from the server (1), and for a reproduction of content, changes a playlist to be used in accordance with playlist configuration data to reproduce a content of playlist after change. This allows the terminal device (2) to reproduce content in accordance with a state of mind a user may have, based on the playlist configuration data.

42 Claims, 51 Drawing Sheets

FIG. 3

| PLAYLIST ID | REPRODUCTION ORDER | TITLE OF CONTENT | PRODUCER | ACQUISITION INFORMATION |
|---|---|---|---|---|
| PLAYLIST 1 | 1 | TITLE 1 | PRODUCER 1 | http://www.server1/... |
| | 2 | TITLE 2 | PRODUCER 2 | http://www.server2/.... |
| | 3 | TITLE 3 | PRODUCER 3 | http://www.server2/... |
| | ........ | ........ | ........ | ........ |
| PLAYLIST 2 | 1 | ........ | ........ | http://www.server3/... |
| | 2 | ........ | ........ | http://www.server3/.... |
| | 3 | ........ | ........ | http://www.server5/.... |
| | ........ | ........ | ........ | ........ |
| ........ | ........ | ........ | ........ | ........ |
| PLAYLIST P | 1 | ........ | ........ | http://www.server7/... |
| | 2 | ........ | ........ | http://www.server8/.... |
| | 3 | ........ | ........ | http://www.server9/.... |
| | ........ | ........ | ........ | ........ |

FIG. 4

CONFIGURATION DATA ID WITH HIGHEST PRIORITY

| PLAYLIST CONFIGURATION DATA ID | PLAYLIST CONFIGURATION DATA | TRANSITION COMMAND DATA | DESCRIPTION DATA |
|---|---|---|---|
| ID1 | PLAYLIST CONFIGURATION DATA 1 | TRANSITION COMMAND DATA 1 | DESCRIPTION DATA 1 |
| ID2 | PLAYLIST CONFIGURATION DATA 2 | TRANSITION COMMAND DATA 2 | DESCRIPTION DATA 2 |
| ........ | ........ | ........ | ........ |
| IDM | PLAYLIST CONFIGURATION DATA M | TRANSITION COMMAND DATA M | DESCRIPTION DATA M |

FIG. 5

| PLAYLIST ID | PLAYLIST 1 | PLAYLIST 2 | PLAYLIST 3 | ....... | PLAYLIST N |
|---|---|---|---|---|---|
| ORDER | 1 | 2 | 3 | ....... | N |

(A)

| PLAYLIST ID | Classic | Easy Listening | Folk | Rock | Heavy Metal |
|---|---|---|---|---|---|
| ORDER | 1 | 2 | 3 | 4 | 5 |

| PLAYLIST ID | PLAYLIST 1 | PLAYLIST 2 | PLAYLIST 3 | ....... | PLAYLIST N |
|---|---|---|---|---|---|
| COORDINATE VALUE (DIMENSION 1) | | | | | |
| COORDINATE VALUE (DIMENSION 2) | | | | | |
| ....... | | | | | |
| COORDINATE VALUE (DIMENSION L) | | | | | |

(A)

| PLAYLIST ID | Classic | Easy Listening | Folk | Rock | Heavy Metal |
|---|---|---|---|---|---|
| COORDINATE VALUE (DIMENSION 1) | 0.2 | 0.6 | 0.8 | 1.5 | 2.5 |

| PLAYLIST ID | PLAYLIST 1 | PLAYLIST 2 | PLAYLIST 3 | ...... | PLAYLIST N |
|---|---|---|---|---|---|
| PLAYLIST 1 | SIMILARITY 11 | SIMILARITY 12 | SIMILARITY 13 | | SIMILARITY 1N |
| PLAYLIST 2 | SIMILARITY 12 | SIMILARITY 22 | SIMILARITY 23 | | SIMILARITY 2N |
| PLAYLIST 3 | SIMILARITY 13 | SIMILARITY 23 | SIMILARITY 33 | | SIMILARITY 3N |
| ...... | | | ...... | | ...... |
| PLAYLIST N | SIMILARITY 1N | SIMILARITY 2N | SIMILARITY 3N | | SIMILARITY NN |

(B)

| PLAYLIST ID | Classic | Easy Listening | Folk | Rock | Heavy Metal |
|---|---|---|---|---|---|
| Classic | 1.0 | 0.8 | 0.4 | 0.2 | 0.0 |
| Easy Listening | 0.8 | 1.0 | 0.7 | 0.3 | 0.1 |
| Folk | 0.4 | 0.7 | 1.0 | 0.6 | 0.2 |
| Rock | 0.2 | 0.3 | 0.6 | 1.0 | 0.7 |
| Heavy Metal | 0.0 | 0.1 | 0.2 | 0.7 | 1.0 |

FIG. 8

| LAYER 1 (UPPER PLAYLISTS) | ORDER IN LAYER 1 | LAYER 2 (LOWER PLAYLISTS) | ORDER IN LAYER 2 |
|---|---|---|---|
| Classic | 1 | BAROQUE | 1 |
| | | CLASSICAL | 2 |
| | | ROMANTIC | 3 |
| | | IMPRESSIONIST | 4 |
| | | CONTEMPORARY MUSIC | 5 |
| Easy Listening | 2 | ......... | ......... |
| Folk | 3 | | |
| Rock | 4 | 1950s | 1 |
| | | 1960s | 2 |
| | | 1970s | 3 |
| | | 1980s | 4 |
| | | 1990s | 5 |
| | | 2000s | 6 |
| Heavy Metal | 5 | ......... | ......... |

| TRANSITION COMMAND ID | DIRECTION | VARIATION AMOUNT | DISPLAY MESSAGE |
|---|---|---|---|
| COMMAND 1 | 0 | 3 | QUITE DIFFERENT FEELING |
| COMMAND 2 | 0 | 1 | A LITTLE DIFFERENT FEELING |
| COMMAND 3 | + | 1 | A LITTLE MORE EXCITE |
| COMMAND 4 | − | 1 | A LITTLE MORE CALM |
| ⋮ | ⋮ | ⋮ | ⋮ |
| COMMAND K | | | |

(B)

| TRANSITION COMMAND ID | DIRECTION | VARIATION AMOUNT (DIMENSION 1) | VARIATION AMOUNT (DIMENSION 2) | ⋯ | VARIATION AMOUNT (DIMENSION L) | DISPLAYED MESSAGE |
|---|---|---|---|---|---|---|
| COMMAND 1 | 0 | 1.5 | 0.8 | ⋯ | 0.9 | QUITE DIFFERENT FEELING |
| COMMAND 2 | 0 | 0.6 | 0.6 | ⋯ | 0.8 | A LITTLE DIFFERENT FEELING |
| COMMAND 3 | + | 0.2 | 0.1 | ⋯ | 0.3 | A LITTLE MORE EXCITE |
| COMMAND 4 | − | 0.2 | 0.1 | ⋯ | 0.3 | A LITTLE MORE CALM |
| ⋮ | | ⋮ | ⋮ | | ⋮ | |
| COMMAND K | | | | | | |

(C)

| TRANSITION COMMAND ID | DIRECTION | VARIATION AMOUNT | DISPLAYED MESSAGE |
|---|---|---|---|
| COMMAND 1 | 0 | 0.1 | QUITE DIFFERENT FEELING |
| COMMAND 2 | 0 | 0.4 | SOMEWHAT DIFFERENT FEELING |
| COMMAND 3 | 0 | 0.8 | SLIGHTLY DIFFERENT FEELING |
| ⋮ | ⋮ | ⋮ | ⋮ |
| COMMAND K | | | |

FIG. 10

| ORDER | 1 PLAYLIST 1 | 2 PLAYLIST 2 | 3 PLAYLIST 3 | ... | N PLAYLIST N |
|---|---|---|---|---|---|
| PLAYLIST 1 | | SIMILARITY 12 | SIMILARITY 13 | ...... | SIMILARITY 1N |
| PLAYLIST 2 | SIMILARITY 12 | SIMILARITY 22 | SIMILARITY 23 | ...... | SIMILARITY 2N |
| PLAYLIST 3 | SIMILARITY 13 | SIMILARITY 23 | SIMILARITY 33 | ...... | SIMILARITY 3N |
| ...... | ...... | ...... | ...... | ...... | ...... |
| PLAYLIST N | SIMILARITY 1N | SIMILARITY 2N | SIMILARITY 3N | ...... | SIMILARITY NN |

FIG. 11

| TRANSITION COMMAND ID | LAYER | DIRECTION | VARIATION AMOUNT | DISPLAY MESSAGE |
|---|---|---|---|---|
| COMMAND 1 | 1 | 0 | 3 | QUITE DIFFERENT FEELING |
| COMMAND 2 | 1 | 0 | 1 | A LITTLE DIFFERENT FEELING |
| COMMAND 3 | 1 | + | 1 | A LITTLE MORE EXCITE |
| COMMAND 4 | 1 | - | 1 | A LITTLE MORE CALM |
| ...... | | | | |
| COMMAND J | 2 | + | 1 | A LITTLE HOTTER ONE |
| COMMAND J+1 | 2 | + | 1 | A LITTLE OLDER ONE |
| ...... | | | | |
| COMMAND K | | | | |

FIG. 37

| CLASSIFICATION CONFIGURATION DATA ID | CLASSIFICATION CONFIGURATION DATA | TRANSITION COMMAND DATA | DESCRIPTION DATA |
|---|---|---|---|
| ID 1 | CLASSIFICATION CONFIGURATION DATA 1 | TRANSITION COMMAND DATA 1 | DESCRIPTION DATA 1 |
| ID 2 | CLASSIFICATION CONFIGURATION DATA 2 | TRANSITION COMMAND DATA 2 | DESCRIPTION DATA 2 |
| ... | ... | ... | ... |
| ID M | CLASSIFICATION CONFIGURATION DATA M | TRANSITION COMMAND DATA M | DESCRIPTION DATA M |

CONFIGURATION DATA ID WITH HIGHEST PRIORITY

| CLASSIFICATION CATEGORY | CATEGORY 1 | CATEGORY 2 | CATEGORY 3 | ......... | CATEGORY N |
|---|---|---|---|---|---|
| ORDER | 1 | 2 | 3 | ......... | N |

(B)

| CLASSIFICATION CATEGORY | Classic | Easy Listening | Folk | Rock | Heavy Metal |
|---|---|---|---|---|---|
| ORDER | 1 | 2 | 3 | 4 | 5 |

| CLASSIFICATION CATEGORY | CATEGORY 1 | CATEGORY 2 | CATEGORY 3 | ......... | CATEGORY N |
|---|---|---|---|---|---|
| COORDINATE VALUE (DIMENSION 1) | | | | | |
| COORDINATE VALUE (DIMENSION 2) | | | | | |
| ......... | | | | | |
| COORDINATE VALUE (DIMENSION L) | | | | | |

(B)

| CLASSIFICATION CATEGORY | Classic | Easy Listening | Folk | Rock | Heavy Metal |
|---|---|---|---|---|---|
| COORDINATE VALUE (DIMENSION 1) | 0.2 | 0.6 | 0.8 | 1.5 | 2.5 |

| | CATEGORY 1 | CATEGORY 2 | CATEGORY 3 | ... | CATEGORY N |
|---|---|---|---|---|---|
| CATEGORY 1 | SIMILARITY 11 | SIMILARITY 12 | SIMILARITY 13 | ... | SIMILARITY 1N |
| CATEGORY 2 | SIMILARITY 2 | SIMILARITY 22 | SIMILARITY 23 | ... | SIMILARITY 2N |
| CATEGORY 3 | SIMILARITY 3 | SIMILARITY 23 | SIMILARITY 33 | ... | SIMILARITY 3N |
| ... | ... | ... | ... | ... | ... |
| CATEGORY N | SIMILARITY N | SIMILARITY 2N | SIMILARITY 3N | ... | SIMILARITY NN |

(B)

| | Classic | Easy Listening | Folk | Rock | Heavy Metal |
|---|---|---|---|---|---|
| Classic | 1.0 | 0.8 | 0.4 | 0.2 | 0.0 |
| Easy Listening | 0.8 | 1.0 | 0.7 | 0.3 | 0.1 |
| Folk | 0.4 | 0.7 | 1.0 | 0.6 | 0.2 |
| Rock | 0.2 | 0.3 | 0.6 | 1.0 | 0.7 |
| Heavy Metal | 0.0 | 0.1 | 0.2 | 0.7 | 1.0 |

FIG. 41

| LAYER 1 (UPPER CATEGORIES) | ORDER IN LAYER 1 | LAYER 2 (LOWER CATEGORIES) | ORDER IN LAYER 2 |
|---|---|---|---|
| Classic | 1 | BAROQUE | 1 |
| | | CLASSICAL | 2 |
| | | ROMANTIC | 3 |
| | | IMPRESSIONIST | 4 |
| | | CONTEMPORARY MUSIC | 5 |
| Easy Listening | 2 | ......... | ......... |
| Folk | 3 | ......... | ......... |
| Rock | 4 | 1950s | 1 |
| | | 1960s | 2 |
| | | 1970s | 3 |
| | | 1980s | 4 |
| | | 1990s | 5 |
| | | 2000s | 6 |
| Heavy Metal | 5 | ......... | ......... |

FIG. 42

| ORDER | 1 | 2 | 3 | ... | N |
|---|---|---|---|---|---|
| | CATEGORY 1 | CATEGORY 2 | CATEGORY 3 | ... | CATEGORY N |
| CATEGORY 1 | SIMILARITY 11 | SIMILARITY 12 | SIMILARITY 13 | ... | SIMILARITY 1N |
| CATEGORY 2 | SIMILARITY 12 | SIMILARITY 22 | SIMILARITY 23 | ... | SIMILARITY 2N |
| CATEGORY 3 | SIMILARITY 13 | SIMILARITY 23 | SIMILARITY 33 | ... | SIMILARITY 3N |
| ... | ... | ... | ... | ... | ... |
| CATEGORY N | SIMILARITY 1N | SIMILARITY 2N | SIMILARITY 3N | ... | SIMILARITY NN |

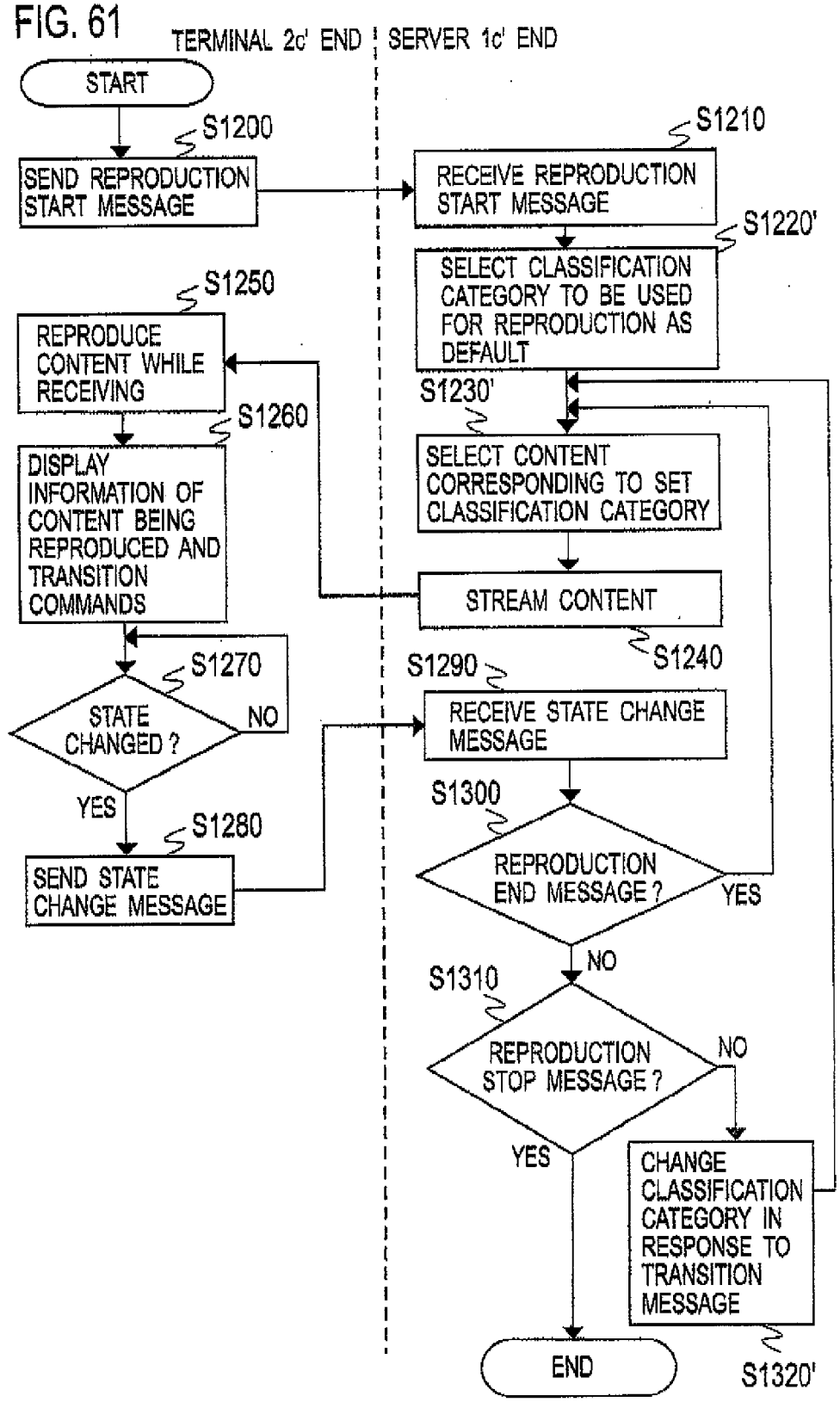

SYSTEM FOR CLASSIFICATION, LOCATION AND TRANSMISSION OF MUSIC PLAYLISTS

This is a National Phase Application filed under 35 U.S.C. 371 as a national stage of PCT/JP2009/054324, filed on Mar. 6, 2009 and claims benefit to Japanese Patent Application No. (s) P2008-058216, filed on Mar. 7, 2008 and No. P2008-068274, filed on Mar. 17, 2008, the entire content of which is hereby incorporated by reference in its entirety.

TECHNICAL HELD

The present invention relates to a server, a terminal, and a reproducer.

BACKGROUND ART

In recent years, there has been widespread use of digital contents including a picture, music, a video, and the like, to be stored for use in a large-capacity storage such as hard disk drive. This has led to a growing demand for, among others, a search technique to retrieve a desired content from a great number of contents, and a technique to automatically categorize and organize contents, giving rise to development of techniques in these fields.

In the music field, there has been disclosed a device configured to create playlists of collections of pieces of music fitting to a user's desired impression. There have been patent literatures 1 and 2 describing a delivery system including a terminal configured to create playlists, and a server also configured to create playlists for transmission to the terminal for use. This permits a listening of pieces of music fitting to a user's impression from among a large music database on the server.

In these conventional techniques, there has been use of a coordinate system for creation of playlists, representing subjective impressions of pieces of music (audio information) such as "cheerful", "gloomy", "aggressive", and "soft", permitting a creation of playlist fitting to a user's impression without the need of previous knowledge about the pieces of music. This also permits a playlist with a combination of pieces of music having different impressions, thus allowing for a creation of playlist full of variety.

Patent document 1: Japanese Patent Application Laid-Open Publication No. 2003-15666

Patent document 2: Japanese Patent Application Laid-Open Publication No. 2004-117632

DISCLOSURE OF THE INVENTION

However, in the above-noted conventional techniques, there has not been an adequate consideration for a changeover among pieces of music in accordance with a state of mind the user may have during reproduction. That is, in the above-noted conventional techniques, the processes of transition of impressions of pieces of music are defined in advance when playlists are created, thus constituting a difficulty, for a situation in which one wants to listen to a mixture of pieces of music having various impressions, to reproduce in a different process of transition from a defined one in creation of the playlist.

In fact, one might feel like listening to a piece of music having a different impression. Such change in state of mind is not predictable in creation of playlists, thus failing to fully respond to such need in the conventional techniques.

It is an object of the present invention to provide a sewer, a terminal, and a reproducer allowing for an intuitive and facilitated changeover among various contents in accordance with a state of mind the user may have as a listener or viewer.

To achieve the object, according to the present invention, there is a server comprising: a playlist configuration data memory configured to store: a set of playlist configuration data including a plurality of playlists represented in numerical values, respectively, where a difference value between playlists having a strong relationship becomes smaller, and a difference value between playlists having a weak relationship becomes larger; and a set of transition command data including a plurality of transition commands showing numerical values for changeovers among playlists; a reproducer configured to reproduce a content in accordance with a playlist; a transmitter-receiver configured to communicate with an outside server; and a controller configured to work for a reception of an input specifying a transition command from the plurality of transition commands, to have a numerical value corresponding to a playlist being used by the reproducer when the input is received, shown in the set of playlist configuration data, to have an addition thereto or a subtraction therefrom, of a numerical value shown by the transition command specified by the input, to select a playlist represented by a closest or corresponding numerical value to a numerical value obtained by the addition or the subtraction, to change from a reproduction being implemented by the reproducer to a reproduction in accordance with the selected playlist, and to work for a reception of an input from a user to specify a set of playlist configuration data from plural sets of playlist configuration data stored in the sewer, to have the transmitter-receiver transmit a message for requesting the set of playlist configuration data to the sewer, to store the set of playlist configuration data transmitted from the sewer as a result of the transmission of the message, in the playlist configuration data memory.

Here, the controller is configured to decide randomly between an addition or a subtraction of the numerical value shown by the transition command specified by the input, to the numerical value shown in the set of playlist configuration data.

According to the present invention, there is a terminal comprising: a playlist configuration data memory configured to store: a set of playlist configuration data including a plurality of playlists represented, respectively, in numerical values where playlists having a stronger relationship are represented by a numerical value closer to a predetermined numerical value; and a set of transition command data including a plurality of transition commands showing numerical values for changeovers among playlists; a reproducer configured to reproduce a content in accordance with a playlist a transmitter-receiver configured to communicate with an outside sewer; and a controller configured to work for a reception of an input specifying a transition command from the plurality of transition commands, to select a playlist having a relationship with a playlist being used by the reproducer when the input is received, shown by a closest or corresponding numerical value to a numerical value shown by the transition command specified by the input, to change from a reproduction being implemented by the reproducer to a reproduction in accordance with the selected playlist, and to work for a reception of an input from a user to specify a set of playlist configuration data from plural sets of playlist configuration data stored in the server, to have the transmitter-receiver transmit a message for requesting the set of playlist configuration data to the server, to store the set of playlist configuration data transmitted from the server as a result of the transmission of the message, in the playlist configuration data storage.

According to the present invention, there is a reproduction device connectable through an interface to a terminal connected through a network to a sewer, the reproduction device comprising: a playlist configuration data memory configured to store: a set of playlist configuration data including a plurality of playlists represented in numerical values, respectively, where a difference value between playlists having a strong relationship becomes smaller, and a difference value between playlists having a weak relationship becomes larger; and a set of transition command data including a plurality of transition commands showing numerical values for changeovers among playlists; a reproducer configured to reproduce a content in accordance with a playlist; an interface controller configured to communicate with the terminal; and a controller configured to work for a reception through the interface controller, of a set of playlist configuration data acquired by the terminal from plural sets of playlist configuration data stored in the server, to store the set of playlist configuration data in the playlist configuration data memory, and to work for a reception of an input specifying a transition command from the plurality of transition commands, to have a numerical value corresponding to a playlist being used by the reproducer when the input is received, shown in the set of playlist configuration data, to have an addition thereto or a subtraction therefrom, of a numerical value shown by the transition command specified by the input, to select a playlist represented by a closest or corresponding numerical value to a numerical value obtained by the addition or the subtraction, to change from a reproduction being implemented by the reproducer to a reproduction in accordance with the selected playlist.

Here, the controller is configured to decide randomly between an addition or a subtraction of the numerical value shown by the transition command specified by the input, to the numerical value shown in the set of playlist configuration data.

According to the present invention, there is a reproduction device connectable through an interface to a terminal connected through a network to a server, the reproduction device comprising: a playlist configuration data memory configured to store: a set of playlist configuration data including a plurality of playlists represented in numerical values, respectively, where playlists having a stronger relationship are represented by a numerical value closer to a predetermined numerical value; and a set of transition command data including a plurality of transition commands showing numerical values for changeovers among playlists; a reproducer configured to reproduce a content in accordance with a playlist; an interface controller configured to communicate with the terminal; and a controller configured to work for a reception through the interface controller, of a set of playlist configuration data acquired by the terminal from plural sets of playlist configuration data stored in the server, to store the set of playlist configuration data in the playlist configuration data memory, and to work for a reception of an input specifying a transition command from the plurality of transition commands, to select a playlist having a relationship with a playlist being used by the reproducer when the input is received, shown by a closest or corresponding numerical value to a numerical value shown by the transition command specified by the input, to change from a reproduction being implemented by the reproducer to a reproduction in accordance with the selected playlist.

According to the present invention, there is a server comprising: a playlist memory configured to store a plurality of playlists for streaming of a content to a terminal; a playlist configuration data memory configured to store: a set of playlist configuration data including the plurality of playlists represented in numerical values, respectively, where a difference value between playlists having a strong relationship becomes smaller, and a difference value between playlists having a weak relationship becomes larger, and a set of transition command data including a plurality of transition commands showing numerical values for changeovers among playlists; and a controller configured to work for a reception of an input specifying a transition command from the plurality of transition commands from the terminal, to have a numerical value corresponding to a playlist being used for a streaming reproduction by the reproducer when the input is received, shown in the set of playlist configuration data, to have an addition thereto or a subtraction therefrom, of a numerical value shown by the transition command specified by the input, to select a playlist represented by a closest or corresponding numerical value to a numerical value obtained by the addition or the subtraction, to change from a streaming reproduction being implemented by the reproducer to a streaming reproduction in accordance with the selected playlist.

Here, the controller is configured to decide randomly between an addition or a subtraction of the numerical value shown by the transition command specified by the input, to the numerical value shown in the set of playlist configuration data.

According to the present invention, there is a server, comprising: a playlist memory configured to store a plurality of playlists for streaming of a content to a terminal; a playlist configuration data memory configured to store: a set of playlist configuration data including the plurality of playlists represented in numerical values, respectively, where playlists having a stronger relationship are represented by a numerical value closer to a predetermined numerical value; and a set of transition command data including a plurality of transition commands showing numerical values for changeovers among playlists; and a controller configured to work for a reception of an input specifying a transition command from the plurality of transition commands from the terminal, to select a playlist having a relationship with a playlist being used for a streaming reproduction by the reproducer when the input is received, represented by a closest or corresponding numerical value to a numerical value shown by the transition command specified by the input, to change from a streaming reproduction being implemented by the reproducer to a streaming reproduction in accordance with the selected playlist.

According to the present invention, there is a terminal comprising: a receiver configured to receive a set of playlist configuration data representing relationships between a plurality of playlists in numerical values from a server, a playlist configuration data memory configured to store the set of playlist configuration data; a content acquirer configured to give an instruction to the server to select and transmit a content in accordance with a specified playlist in the plurality of playlists, to acquire the content; a reproducer configured to reproduce the content acquired by the content acquirer; and a controller configured to select a single playlist from the plurality of playlists in accordance with the set of playlist configuration data stored in the playlist configuration data memory, and specify the single playlist and control the content acquirer to acquire a content.

There may be use of combination of the playlist configuration data memory configured to store a set of transition command data for selecting the single playlist, and the controller configured to display messages on a display device in accordance with the set of transition command data stored in the playlist configuration data memory, for a selection by a user, to select the single playlist in accordance with the set of transition command data and the set of playlist configuration data in correspondence to the selected message.

The set of transition command data stored in the playlist configuration data memory may include a target value in relation to a degree of difference between a playlist specified at the acquirer and the single playlist selected by the controller. The controller may configured to read numerical values representing relationships between the specified playlist specified at the acquirer and each of other playlists with reference to the set of playlist configuration data stored in the playlist configuration data memory, to read the target value of the set of transition command data from the playlist configuration data memory to select a playlist having a least difference between a read numerical value and the target value, as the single playlist.

There may be use of combination of the playlist memory configured to store a plurality of playlists, each playlist including a playlist ID identifying a playlist uniquely, the playlist configuration data memory configured to use the playlist IDs for relationships between the plurality of playlists, to store a set of playlist configuration data represented in numerical values indicating relationships between a plurality of playlist IDs, the content acquirer configured to acquire the content in accordance with the acquisition information corresponding to the specified playlist ID with reference to the playlist memory, and the controller configured to select a single playlist ID from a plurality of playlist IDs included in the set of playlist configuration data in accordance with the set of playlist configuration data stored in the playlist configuration data memory, to specify the single playlist ID to control the content acquirer to acquire a content.

According to the present invention, there is a reproduction device connectable through an interface to a terminal connected to a server over a network, comprising: a playlist memory configured to store a plurality of playlists, each playlist including a description of acquisition information for acquiring a content; an interface controller configured to transfer, through the interface, a set of playlist configuration data representing relationships between the plurality of playlists in numerical values, received by the terminal from the server; a playlist configuration data memory configured to store the set of playlist configuration data; a content acquirer configured to acquire the content in accordance with the acquisition information of the specified playlist in the plurality of playlists with reference to the playlist memory; a reproducer configured to reproduce the content acquired by the content acquirer; and a controller configured to select a single playlist from the plurality of playlists in accordance with the set of playlist configuration data stored in the playlist configuration data memory, and specify the single playlist and control the content acquirer to acquire a content.

According to the present invention, there is a method for transmitting playlist configuration data, comprising steps of creating a set of playlist configuration data representing relationships between a plurality of playlists in numerical values, each playlist including a description of acquisition information for acquiring a content; and transmitting the created set of playlist configuration data to a terminal.

According to the present invention, there is a method for reproducing a content comprising steps of selecting a single playlist from a plurality of playlists in accordance with a set of playlist configuration data representing relationships between the plurality of playlists in numerical values, each playlist including a description of acquisition information for acquiring a content; and reproducing the content in accordance with the single playlist.

According to the present invention, there is a computer program executable by a computer to implement a processing, comprising steps of creating a set of playlist configuration data representing relationships between a plurality of playlists in numerical values, each playlist including a description of acquisition information for acquiring a content; and transmitting the created set of playlist configuration data to a terminal.

According to the present invention, there is a computer program executable by a computer to implement a processing, comprising steps of selecting a single playlist from a plurality of playlists in accordance with a set of playlist configuration data representing relationships between the plurality of playlists in numerical values, each playlist including a description of acquisition information for acquiring a content; and reproducing the content in accordance with the single playlist.

According to the present invention, there is a server comprising: a classification configuration data memory configured to store a set of classification configuration data representing relationships between a plurality of categories of classification in numerical values, for contents classified by category, and a transmitter configured read the set of classification configuration data from the classification configuration data memory to transmit to a terminal.

According to the present invention, there is a server comprising: a classification configuration data memory configured to store a set of classification configuration data representing relationships between a plurality of categories of classification in numerical values for contents classified into categories; a content memory configured to store contents classified in accordance with the categories of classification; a content selector configured to receive a state change message from a terminal to select the content from the content memory in accordance with the set of classification configuration data stored in the classification configuration data memory; and a transmitter configured to transmit the selected content selected by the content selector to the terminal.

There may be use of combination of the classification configuration data memory configured to add a set of transition command data representing directions of changes and variation amounts between a plurality of categories of classification in correspondence with each set of classification configuration data to store with the classification configuration data, and the transmitter configured to transmit the set of transition command data to the terminal.

There may be use of combination of a content memory configured to store a content classified in accordance with the categories of classification, and the transmitter configured to read the content from the content memory to transmit to the terminal.

For any content stored in the content memory including an audio data, there may be use of an audio analyzer configured to analyze the audio data to extract acoustic features thereof, categorizing the content into prescribed categories of classification in accordance with the extracted acoustic features.

The classification configuration data memory may store a plural sets of classification configuration data and to read, in accordance with a read demand, a set of playlist configuration data with highest priority or a set of playlist configuration data specified from outside, from the plural sets of playlist configuration data.

The set of classification configuration data may be an order of the plurality of categories of classification in accordance with a predetermined criterion.

The set of classification configuration data may be coordinate values of the plurality of categories of classification in a predetermined coordinate system.

The set of classification configuration data may be similarities between the plurality of categories of classification.

According to the present invention, there is a terminal comprising: a receiver configured to receive a set of classification configuration data representing relationships between a plurality of categories of classification in numerical values, for contents classified by category, from a server; a classification configuration data memory configured to store the set of classification configuration data; a content memory configured to store the content; a content selector configured to select the content from the content memory; a reproducer configured to reproduce the selected content; and a controller configured to change a category of classification of the content in accordance with the set of classification configuration data stored in the classification configuration data memory, and control the content selector to select a content of a changed category of classification.

According to the present invention, there is a terminal comprising: a receiver configured to receive a set of classification configuration data representing relationships between a plurality of categories of classification in numerical values, for contents classified by category, from a server; a classification configuration data memory configured to store the set of classification configuration data; a content selector configured to give an instruction to the server to select and transmit the content over a network; a reproducer configured to reproducer the received content; and a controller configured to change a category of classification of the content in accordance with the set of classification configuration data stored in the classification configuration data memory and control the content selector to select and transmit a content of the changed category of classification.

Here, the set of classification configuration data may further has a set of transition command data representing directions of changes and variation amounts among corresponding plural categories of classification, added thereto, and the controller may configured to display messages on a display device in accordance with the set of transition command data added to the set of classification configuration data for a selection by a user and change a category of the content in accordance with the transition command in correspondence to the selected message.

According to the present invention, there is a reproduction device connectable through an interface to a terminal connected to a server over a network, comprising: an interface controller configured to transfer, through the interface, a set of classification configuration data representing relationships between a plurality of categories of classification in numerical values, for contents classified by category, received by the terminal from the server; a classification configuration data memory configured to store the set of classification configuration data; a content memory configured to store the content; a content selector configured to select the content from the content memory; a reproducer configured to reproduce the selected content; and a controller configured to change a category of classification of the content in accordance with the set of classification configuration data stored in the classification configuration data memory, and control the content selector to select a content of a changed category of classification.

BRIEF DESCRIPTION OF THE DRAWINGS

FIG. 3 is a diagram showing a storage format of playlists in a playlist memory portion.

FIG. 4 is a diagram showing an entire storage format in a playlist configuration data memory portion.

FIG. 5 is tables illustrating playlist configuration data using order.

FIG. 6 is tables illustrating playlist configuration data using coordinate values.

FIG. 7 is tables illustrating playlist configuration data using similarities.

FIG. 8 is a table illustrating playlist configuration data having layers.

FIG. 9 is tables illustrating transition command data.

FIG. 10 is a table illustrating playlist configuration data using similarities and order.

FIG. 11 is a table illustrating transition command data having layers.

FIG. 37 is a diagram showing an entire storage format in a classification configuration data memory portion.

FIG. 38 is tables illustrating classification configuration data using order.

FIG. 39 is tables illustrating classification configuration data using coordinate values.

FIG. 40 is tables illustrating classification configuration data using similarities.

FIG. 41 is a table illustrating classification configuration data having layers.

FIG. 42 is a table illustrating classification configuration data using similarities and order.

FIG. 61 is a flowchart showing a content reproduction process according to the eighth embodiment.

BEST MODE FOR CARRYING OUT THE INVENTION (First Embodiment)

Figure 1:
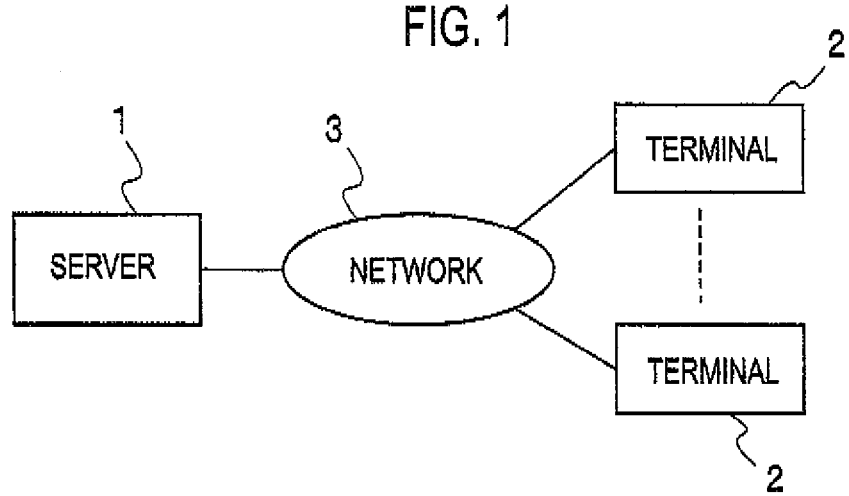
FIG. 1 is a diagram showing an entire configuration of a system according to a first embodiment of the present invention.

FIG. 1 is a diagram showing an entire configuration of a system according to a first embodiment of the present invention.

In FIG. 1, the present system includes a server 1 configured to deliver contents, and a terminal 2 configured to receive and reproduce contents, which are interconnected through a network 3. There may be one or more terminals 2. The present embodiment describes for music contents, but is not limited to this. Contents may be video (animation) data including a film and a TV program, still image data including a picture, or other types of data.

Figure 2:
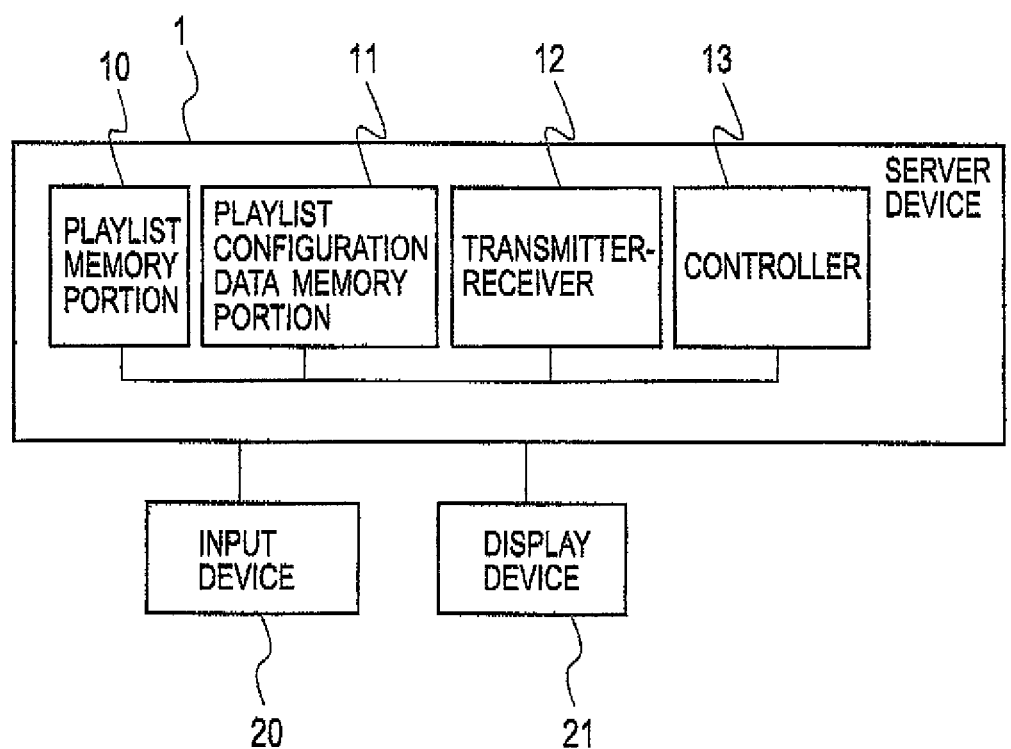
FIG. 2 is a block diagram showing a configuration of a server according to the first embodiment.

FIG. 2 is a block diagram showing a configuration of the server 1 according to the first embodiment in FIG. 1.

In FIG. 2, the server 1 includes a playlist memory portion 10, a playlist configuration data memory portion 11, a transmitter-receiver 12, and a controller 13. The server 1 has an input device 20 such as keyboard, mouse, etc. for operations by an administrator, and a display device 21 such as display, connected thereto. It is noted that the server 1 may be implemented in the form of a software processing employing a typical computer including a CPU, a RAM, and a ROM, a hard disk drive, or such, using the CPU to execute computer programs stored in the ROM, hard disk drive, or such. This also applies for servers in other embodiments to be described later on. In the present embodiment, the playlist memory portion 10 and playlist configuration data memory portion 11 are arranged in the same server 1, but can be arranged in different servers.

FIG. 3 is a table illustrating data stored in the playlist memory portion 10. As shown in FIG. 3, the playlist memory portion 10 stores playlists (P, where P>=2). Each playlist is a set of associated data of a playlist ID, a reproduction order of contents, titles of contents, producers (artist), and content acquisition information. To each playlist, one or more contents are associated. A playlist ID is a numerical value or text data for a unique identification of playlist. In the example in FIG. 3, content acquisition information is a URL (Uniform Resource Locator) indicating a location of content (delivery file), etc. According to first to fourth embodiments of the present invention, for use of an identical device for a device for storage of contents and a device for use (acquisition) of contents, there is not necessarily the need of using URL etc., but there may be use of an identifier (content ID) for unique identification of content or a path for file including content. For example, as will be described later on, when the sever 1 stores contents and acquires them for delivery, acquisition information described in a playlist may be, among others, a path for file storing content, or a content ID in a database storing contents for use.

Contents may be stored in a content memory portion of the server 1 (not shown in FIG. 2), or in a different device from the server 1, which is accessible from the terminal 2. There may be information including a production year, a genre, a situation or a place suitable for reproduction to be included in a playlist. There may be an omission of information of, among others, a content title, a producer, etc.

In the embodiment 1, a playlist is assumed to be created by an operator or an administrator on a server. A playlist may be created, or a part of contents thereof may be changed by a user on the terminal 2. In the present embodiment, a playlist is created using a genre, a time of production, a mood of content, or a situation or place suitable for reproduction of content, etc.

FIG. 4 is a diagram illustrating data stored in the playlist configuration data memory portion 11.

That is, the playlist configuration data memory portion 11 associates and stores a playlist configuration data ID, a set of playlist configuration data representing relationships between playlists, a set of transition command data, and description data, and further stores a highest priority configuration data ID, in a format in FIG. 4. A playlist configuration data ID is an ID for a unique identification among sets of playlist configuration data. The highest priority configuration data ID is a playlist configuration data ID to be used with the highest priority. The example in FIG. 4 stores M sets for each data (M>=1). There may be a set of playlist configuration data instead of sets of playlist configuration data. For only one set to be stored, the playlist configuration data IDs and the highest priority configuration data ID can be omitted. As will be described later on, transition command data and description data can be also omitted. Each set of playlist configuration data is associated with a part or all of playlists stored in the playlist memory portion 10 using playlist IDs in common. The number of playlists associated with a set of playlist configuration data may be different for every set of playlist configuration data. Each set of playlist configuration data stores data in a later-described format.

According to the first embodiment, as a basic format of playlist configuration data, there is use of three formats in FIGS. 5 to 7. In either format, a set of playlist configuration data is composed of numerical values representing relationships between playlists (playlist IDs).

FIG. 5A is a table illustrating a first format for playlist configuration data.

The first format, as shown in FIG. 5, relates playlist IDs of playlists (N, where N>=2) to an order 1 to N when the playlists are ranked in accordance with a predetermined criterion.

FIG. 5B is a table illustrating a set of playlist configuration data in the first format for playlists created by music genre. In FIG. 5B, there is use of five genres of "Classic", "Easy Listening", "Folk", "Rock", and "Heavy Metal" to create corresponding 5 playlists. The order in this example is determined in accordance with the strength of sound pressure, the strength of beat, or a subjective degree of "excitement", of a typical piece of music in each genre, where '1' represents weakest, and '5' strongest.

FIG. 6A is a table illustrating a second format for playlist configuration data.

The second format, as shown in FIG. 6A, relates playlist IDs of playlists (N, where N>=2) to coordinate values when the playlists are located in a predetermined coordinate system. The number of dimensions in coordinates is L (L>=1).

FIG. 6B, as well as FIG. 5B, illustrates a set of playlist configuration data in the second format when playlists are created by music genre. In this example, the number of dimensions in coordinates is 1. As coordinate values, there is use of numerical values, representing the strength of sound pressure, the strength of beat, or a subjective degree of excitement, of a typical piece of music in each genre, as coordinate values.

FIG. 7A illustrates a third format for playlist configuration data.

The third format represents, as shown in FIG. 7A, similarities between two arbitrary playlists of N playlists (N>=2) in a matrix form, where rows and columns are composed of playlist IDs. Elements in matrix represent similarities between two playlists. For example, "similarity 13" in FIG. 7A represents a similarity between "playlist 1" and "playlist 3".

FIG. 7B, as well as FIGS. 5B and 6B, illustrates a set of playlist configuration data in the third format when playlists are created by genre. In this example, elements in matrix are numerical values of 0.0 to 1.0, where 1.0 shows the highest similarity and 0.0 the lowest similarity. On-diagonal elements in matrix are similarities between identical playlists, showing all 1.0. For a symmetric matrix like this example, symmetric elements of same values may be omitted.

The foregoing description is for the basic format for playlist configuration data. The playlists can be in layers.

FIG. 8 is a table illustrating a set of playlist configuration data having layers.

In FIG. 8, playlists are created by a combination of music genre and time of production, to have two layers where a layer 1 (upper playlist) corresponds to genres and a layer 2 (lower playlist) corresponds to time of production. An upper playlist corresponds to one or more lower playlists, and a lower playlist corresponds to one upper playlist. For a respective upper playlist as well as for a respective lower playlist, there is an order associated therewith as described. For example, in FIG. 8, a playlist with "baroque" as layer 2 is a playlist of collection of contents having a genre of "Classic" and time of production of "baroque". There may be use of a configuration with three or more layers. In the example in FIG. 4, M sets of playlist configuration data are stored in either one of the above-described formats. M sets of playlist configuration data may be all in the same format, or may be in different formats for every set of playlist configuration data.

Description is now made of transition command data stored in the playlist configuration data memory portion 11 (refer to FIG. 4).

The transition command data is used for changeovers of playlists on the terminal 2, as will be described later on.

FIG. 9 A-C illustrate sets of transition command data.

In the examples in FIG. 9 A-C, K sets of transition command data are stored. Each transition command is an associated data of a transition command ID, a direction, a variation amount, and a display message. A transition command II) is a numerical value or text data for a unique identification of transition command.

According to the first embodiment, directions and variation amounts of transition command data are information to be used for a change, that is a changeover among playlists for reproduction of contents. The usage thereof will be described in detail in description of a reproduction process on the terminal 2.

In FIG. 9 A-C, a direction is either one of three types, '0', '+', and where '0' represents a direction unspecified, '+' a direction changed toward small values in an order or coordinate values, and '−' a direction changed toward large values in an order or coordinate values.

A set of variation amounts is stored in a format corresponding to a storage format (first to third formats) of a set of playlist configuration data.

The example in FIG. 9A uses an order described as the first format for playlist configuration data, where '3' represents a changeover to a playlist having three differences in the order, and '1' a changeover to a playlist having one difference in the order.

The example in FIG. 9B uses coordinate values described as the second format for playlist configuration data. For this system of variation amounts to be itemized, the variation amounts stored are arrayed in a format of columns identical in number to (L) dimensions of the coordinate system.

The example in FIG. 9C uses similarities in the third format shown in FIG. 7 for playlist configuration data. A numerical value in variation amount represents a changeover to a playlist having a similarity closest to the value, indicating one numerical value such as '0.1'. For a single use of similarities, only commands with direction '0' are stored. As shown in FIG. 10 where similarities and an order are stored in combination for playlist configuration data, the order is used for determinations of directions, and the similarities are used for variation amounts on the terminal 2, allowing for the use of similarities with commands having directions. There may be storage of similarities and coordinate values in combination, where the coordinate values are used for determinations of directions and the similarities are used for variation amounts on the terminal 2. In the first embodiment, directions and variation amounts of transition command data are treated separately as described, however directions may be omitted by adding signs to variation amounts.

The display messages in transition command data are text data to be displayed by the terminal 2 on a display device 41. The display messages may be created on the terminal 2 in accordance with directions and variation amounts of transition command data, permitting an omission of storage of the display messages.

FIG. 11 illustrates a set of transition command data for playlists configuration data having layers.

FIG. 11 adds a "layer" to transition command data in FIG. 9. This indicates what number layer from the highest layer is intended. Others are similar to those of the transition command data in FIG. 9.

Back to FIG. 4, the description data stored in the playlist configuration data memory portion 11 provides a user on the terminal 2 with characteristics of each set of playlist configuration data, and is used for a selection of one set from sets of playlist configuration data by a user.

Figure 12:
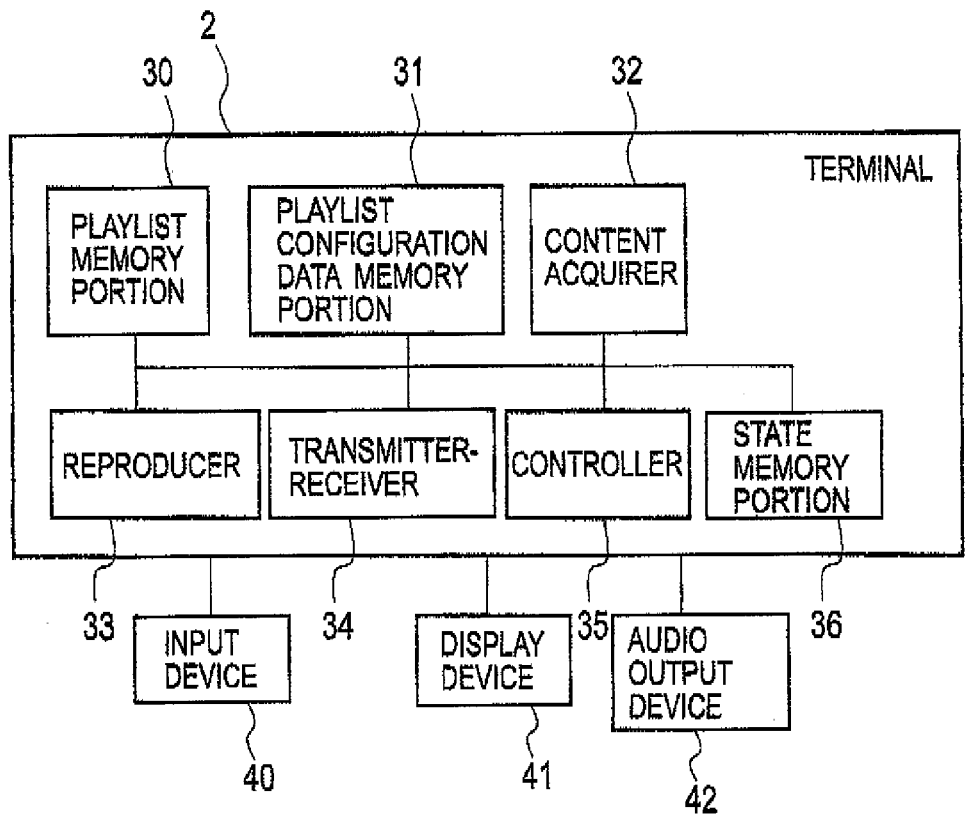
FIG. 12 is a block diagram showing a configuration of a terminal according to the first embodiment.

FIG. 12 is a block diagram showing a configuration of the terminal 2 shown in FIG. 1.

In FIG. 12, the terminal 2 includes a playlist memory portion 30, a playlist configuration data memory portion 31, a content acquirer 32, a reproducer 33, a transmitter-receiver 34, a controller 35, and a state memory portion 36, and has an input device 40, a display device 41, and an audio output device connected thereto.

The input device 40 includes a keyboard, a mouse, a remote controller, a touch panel, and the like, for a reception of instruction for operation by a user. The display device 41 includes a display or the like for a reproduction of content and a display of information. The audio output device 42 includes speakers, headphones and the like necessary for a reproduction of content. It is noted that the terminal 2 may be implemented in the form of a software processing employing a typical computer including a CPU, a RAM, and a ROM, a hard disk drive, or such, using the CPU to execute computer programs stored in the ROM, hard disk drive, or such. This applies for, among others, a terminal, a reproducer according to other embodiments, as will be described later on.

Figure 13:
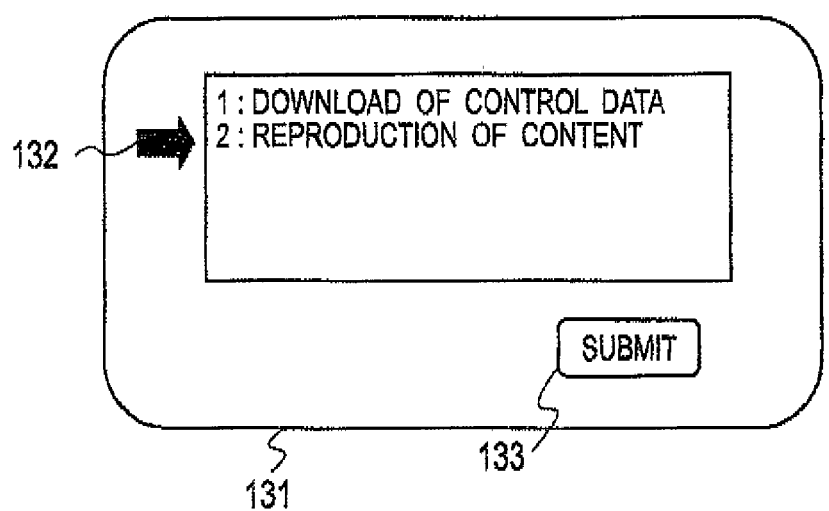
FIG. 13 is a diagram illustrating a menu screen on the terminal according to the first embodiment.

FIG. 13 illustrates a menu screen displayed on the display device 41 by the controller 35 in the terminal 2 immediately after power-on.

In FIG. 13, a menu screen 131 displays two items of menu for selection: "1: Download of control data"; and '2: Reproduction of content'. A left-hand arrow shows a location of a cursor 132. When a user moves the cursor 132 on a desired menu item by the input device 40, and clicks a submit button 133, a corresponding process is started for each menu item.

Description is now made of operations of the terminal 2 and the server 1 when two items of menu for selection are selected respectively on the menu screen 131, with reference to a flowchart.

Figure 14:
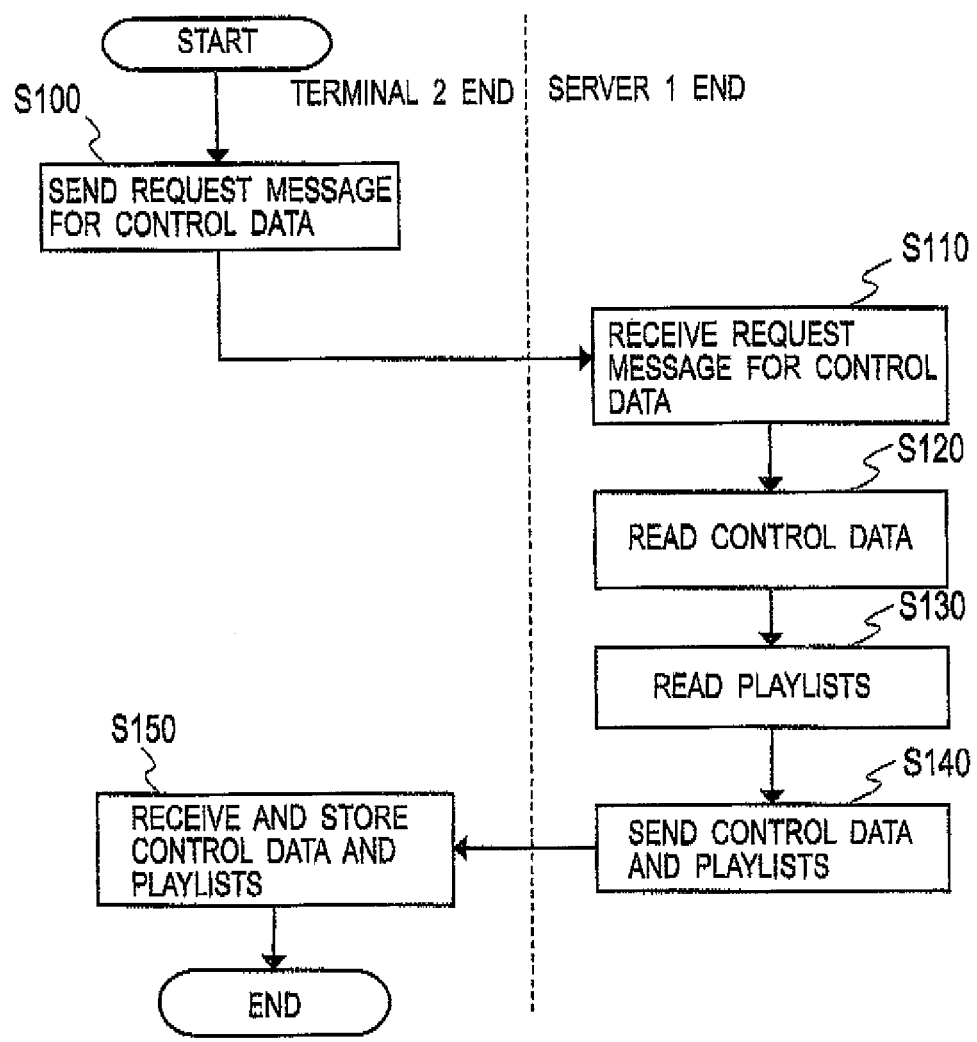
FIG. 14 is a flowchart showing a download process of control data.

FIG. 14 is a flowchart showing a download process of control data on the terminal 2 and the server 1, when a user selects a menu item of "1: Download of control data" on the menu screen 131 shown in FIG. 13.

On the terminal 2 end, when a user selects the menu item of "Download of control data" on the menu screen 131 shown in FIG. 13, at a step S100, the controller 35 of the terminal 2 transmits a request message for control data to the server 1 through the transmitter-receiver 34.

At a step S110, on the server 1 end, the controller 13 receives a request message for control data through the transmitter-receiver 12, and at a step S120, refers to a highest priority configuration data ID in the playlist configuration data memory portion 11 to read a set of playlist configuration data and a set of transition command data having a corresponding playlist configuration data ID, as control data. When the playlist configuration data memory portion 11 stores only a set of data, it is read. It is noted that in the first embodiment the server 1 transmits a set of transition command data to the terminal 2, but the terminal 2 can store a set of transition command data in advance, thereby omitting storage of the transition command data in the playlist configuration data memory portion 11 of the server 1, to read only the playlist configuration data as control data at the step S120.

At a step S130, on the server 1, the controller 13 acquires playlist IDs in the set of playlist configuration data read at the step S120, and refers to the playlist memory portion 10 to read all the playlists corresponding to acquired playlist IDs.

At a step S140, on the server 1, the controller 13 transmits control data read at the step S120 and playlists read at the step S130 to the terminal 2.

At a step S150, on the terminal 2, the controller 35 receives control data of playlist configuration data and transition command data, and playlists through the transmitter-receiver 34 from the server 1, to store the control data in the playlist configuration data memory portion 31 and the playlists in the playlist memory portion 30.

According to the foregoing download process of control data, there is no need of operation for selection or the like, by a user, thus suitable for a simplified operation on the terminal 2. It is noted that playlists corresponding to a set of playlist configuration data can be stored in advance in the playlist memory portion 30 of the terminal 2, thus permitting an omission of transmission of playlists at the steps of S130 and S140.

Figure 15:
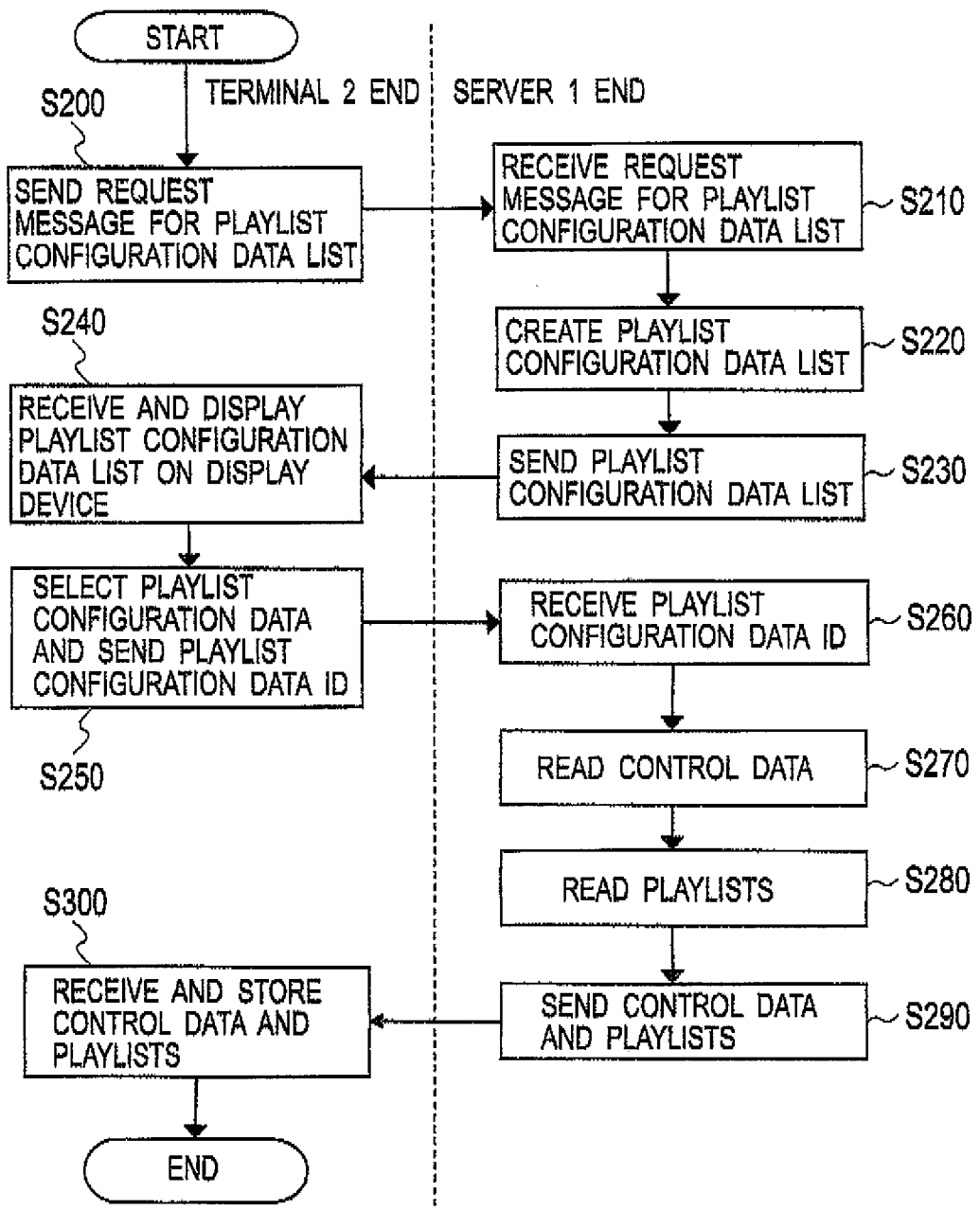
FIG. 15 is a flowchart showing a different download process of control data.

Description is now made of another example of a download process of control data, with a flowchart in FIG. 15.

The process needs description data to be stored in the playlist configuration data memory portion 11 in the server 1. Without this process, the description data will be omitted.

In this case, at a step S200, on the terminal 2, the controller 35 transmits a request message for playlist configuration data list, a view of playlist configuration data through the transmitter-receiver 34 to the server 1.

At a step S210, on the server 1 end, the controller 13 receives a request message for playlist configuration data list through the transmitter-receiver 12, and at a step S220, reads data from the playlist configuration data memory portion 11 to create a playlist configuration data list Specifically, all playlist configuration data IDs and description data stored in the playlist configuration data memory portion 11 are associated and read to be a playlist configuration data list.

At a step S230, the controller 13 transmits the created playlist configuration data list through the transmitter-receiver 12 to the terminal 2.

At a step S240, on the terminal 2, the controller 35 receives a playlist configuration data list through the transmitter-receiver 34 from the server 1, and displays the playlist configuration data list on the display device 41.

Figure 16:
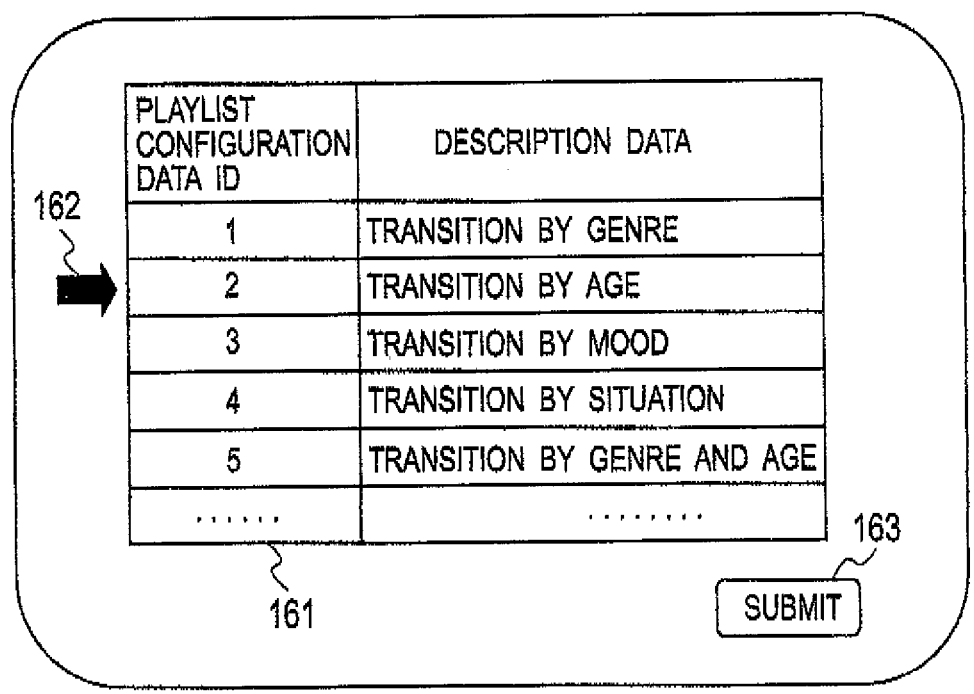
FIG. 16 is a diagram illustrating a screen display of a playlist configuration data list.

FIG. 16 is a diagram illustrating a playlist configuration data list displayed on the display device 41.

In FIG. 16, a playlist configuration data list 161 displays playlist configuration data IDs and corresponding description data. There may be a display of description only. A left-hand arrow represents a location of a cursor 162. A user reads description data and decides a desired set of playlist configuration data, then moves the cursor 162 on a desired menu item through the input device 40, and clicks a submit button 163 to select the set of playlist configuration data.

Back to FIG. 15, at a step S250, when a user selects a desired set of playlist configuration data from the playlist configuration data list 161 displayed on the display device 41, the controller 35 receives an instruction through the input device 40 from the user, and transmits a playlist configuration data ID corresponding to the instruction through the transmitter-receiver 34 to the server 1.

At a step S260, on the server 1, the controller 13 receives a playlist configuration data ID through the transmitter-receiver 12 from the terminal 2, and at a step S270, reads a set of playlist configuration data and a set of transition command data corresponding to the received playlist configuration data ID as control data, from the playlist configuration data memory portion 11.

Then, at a step S280, the controller 13 acquires playlist IDs included in the set of playlist configuration data read at the step S270, refers to the playlist configuration memory portion 10, and reads all the playlists corresponding to the acquired playlist IDs. At a step S290, the controller 13 transmits control data read at the step S270 and playlists read at the step S280 through the transmitter-receiver 12 to the terminal 2.

At a step S300, on the terminal 2, the controller 35 receives control data and playlists through the transmitter-receiver 34 from the server 1, and stores the control data in the playlist configuration data memory portion 31 and the playlists in the playlist memory portion 30.

According to the foregoing download process of control data, a user can make a selection from sets of playlist configuration data, allowing for an enhancement of user's satisfaction.

In the first embodiment, there may be use of either download process of control data in FIG. 14 or 15. In the foregoing description, there is description of a start of process by user's menu selection. In addition, there may be a transmission of request message for control data from the terminal 2 to the server 1 at a predetermined time interval. With a reception of user's instruction for "Reproduction of content", there may be a check for playlists and control data. If they are not found, prior to a reproduction of content, an automatic download process may be implemented. Or, there may be a list of playlists to be transmitted from the server 1 to the terminal 2 to be displayed on the display device 41 for user's selection of a playlist or playlists for download. Then, a selected playlist or playlists and control data necessary for the reproduction may be downloaded from the server 1 to the terminal 2. Further, playlists and control data may be stored in the terminal 2 in advance.

Figure 17:
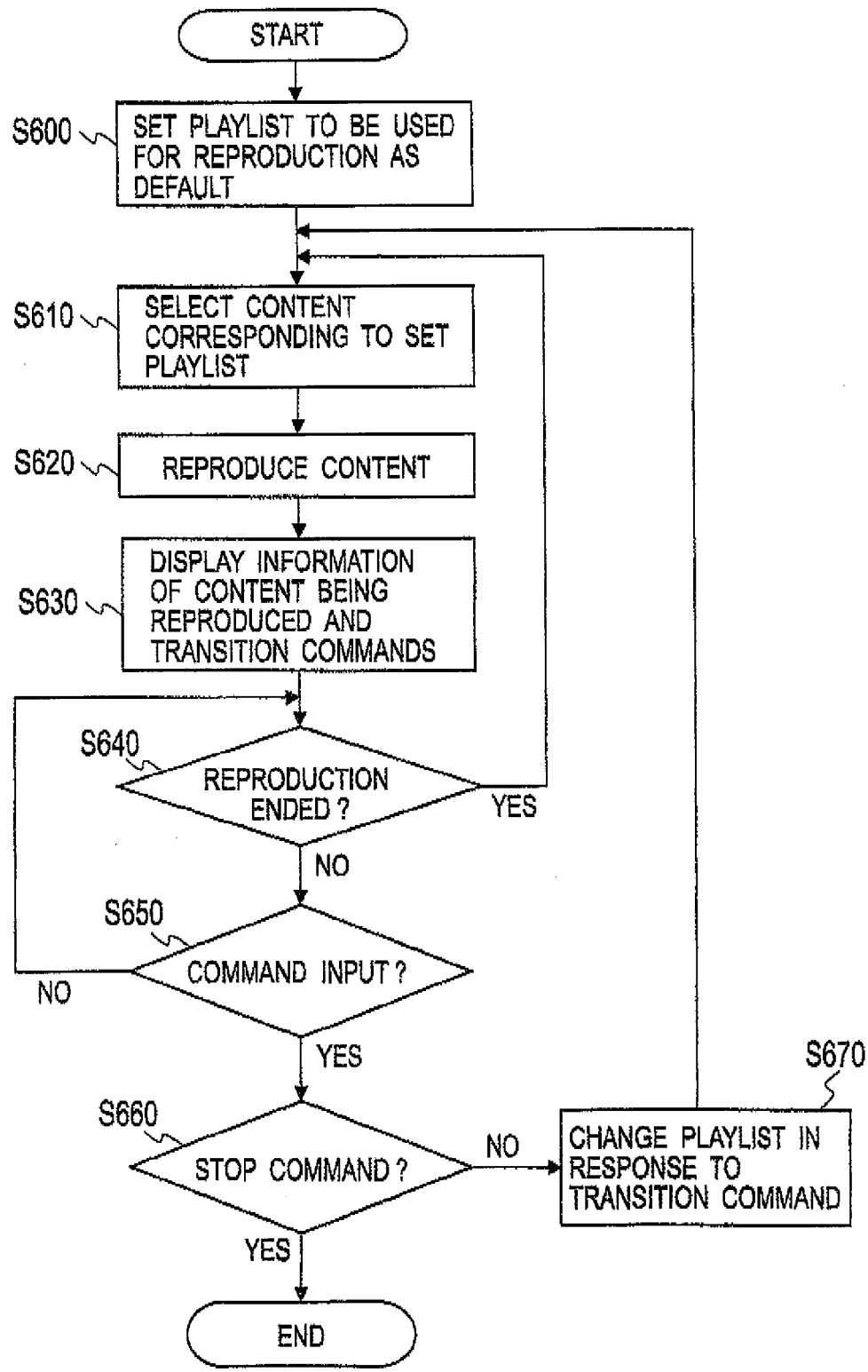
FIG. 17 is a flowchart showing a content reproduction process.

FIG. 17 is a flowchart showing a content reproduction process when the menu item of "2: reproduction of content" is selected on the menu screen 131 in FIG. 13.

At a step S600, on the terminal 2, the controller 35 refers to the playlist configuration data memory portion 31 to select a playlist ID of playlist to be used for reproduction, as default, from playlist IDs described in a set of playlist configuration data stored therein, and stores in the state memory portion 36. For playlist configuration data with layers, for example, a playlist ID of playlist in the lowest layer may be selected. As a method for selecting a playlist ID, the following three methods will be employed.

There is a first method to randomly select a playlist ID with random numbers, or the like.

There is a second method to select a playlist ID previously used. The state memory portion 36 may be configured with a nonvolatile memory portion, and when a playlist ID previously used is stored therein, it may be used.

There is a third method for a user to select a playlist ID of desired playlist. In this case, the controller 35 reads playlists from the playlist memory portion 30 to create a list of playlists for display on the display device 41. A user selects one of playlist from the list of playlists displayed on the display device 41, and the playlist ID thereof is stored in the state memory portion 36. It is noted that as the third method, other than the foregoing method, the controller 35 may reads playlist IDs from the playlist configuration data memory portion 31 to create a list of playlist IDs to display on the display device 41 for user's selection of playlist ID.

After a playlist ID is selected, at a step S610, the content acquirer 32 reads a playlist ID stored in the state memory portion 36, and acquires a content in sequence in accordance with a playlist corresponding to the playlist ID. Specifically, the content acquirer 32 reads a playlist, from the playlist memory portion 30, corresponding to the playlist ID stored in the state memory portion 36, reads content acquisition information in accordance with a reproduction order described in the playlist, acquires a deliver file of content through the transmitter-receiver 34, and temporarily stores in the content acquirer 32. In the first embodiment, there is description of contents to be put as delivery files on the server 1 or another device accessible from the terminal 2, but the terminal 2 may include a content memory portion for storage in advance.

At a step S620, the reproducer 33 reads a content stored in the content acquirer 32, implements a necessary process of decode, etc., thereon, and then outputs on the display device 41 and the audio output device 42 for reproduction of the content.

At a step S630, the controller 35 displays information about a content being reproduced, and a set of transition command data for changeovers of playlists for use of reproduction of content, on the display device 41. That is, the controller 35 reads display messages of transition command data (refer to FIGS. 9, 11) from the playlist configuration data memory portion 31, or creates display messages in accordance with directions and variation amounts, and reads information of, among others, a title, a producer, etc. for a content being reproduced, from the playlist memory portion 30 for display on the display device 41.

Figure 18:
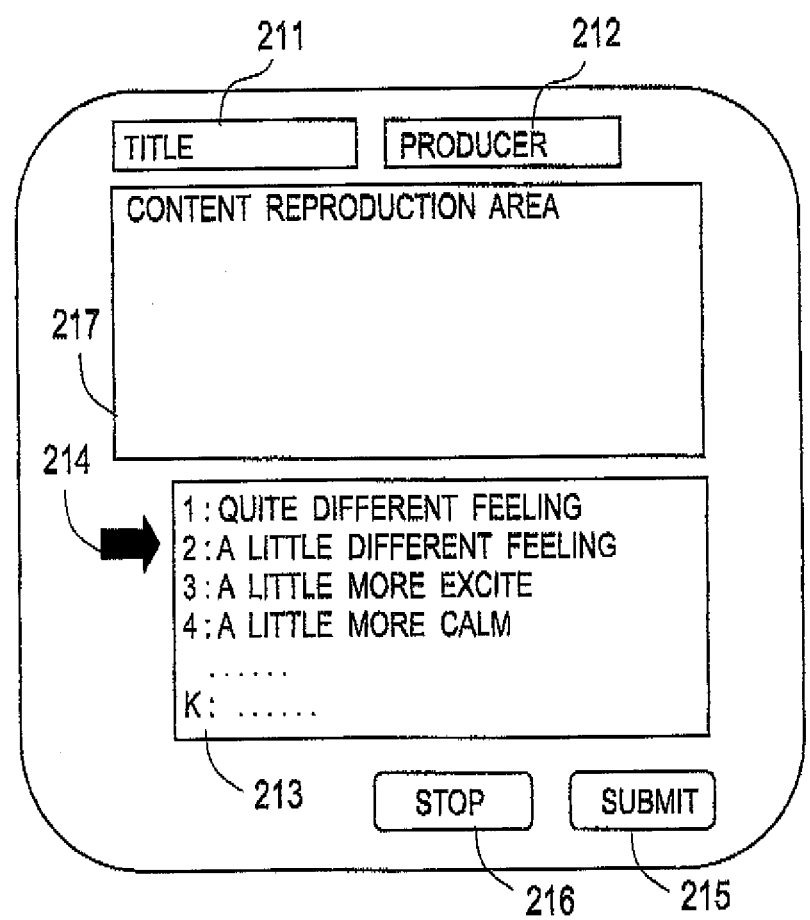
FIG. 18 is a diagram illustrating a screen during a reproduction of content.

FIG. 18 illustrates a screen display displayed on the display device 41 at the step S630.

In this example, at the top of the screen, there is a display of a title 211 and a producer 212 of content. At the bottom of the screen, there is a display of display messages 213 of transition commands. A left-hand arrow represents a location of a cursor 214. When a user puts the cursor 214 on a desired display message 213 of transition command through the input device 40 and clicks a submit button 215, the user can make a changeover of playlists used for reproduction of content. There may be a process not to display a display message 213 of currently unavailable transition command. For example, with a set of playlist configuration data having an order of 1 to 5, for a playlist of order 5 being currently selected, there is no more increase in numerical value for the order. Thus there may be no display of the display message 213 of transition command for increase in numerical value for the order.

In addition, there is a stop button 216. When a user clicks the stop button 216, the controller 35 detects it as a command for stop of reproduction. A transition command and a stop command will be described as a command. At the middle of screen, there is a content reproduction area 217. This may be omitted depending on a kind of content. There may be an overwrapped display of information of a title 211, a producer 212, transition commands, etc. on the content reproduction area 217.

Back to the description of FIG. 17, at a step S640, the controller 35 determines whether or not a reproduction of content is ended. If the reproduction is ended (Yes at the step S640), then the control flow goes back to the step S610 for the content acquirer 32 to acquire a content having next order in reproduction order of a playlist currently used.

On the other hand, if the reproduction of content is not ended (No at the step S640), at a step S650, the controller 35 determines whether or not there is a command input from a user. If there is no command input (No at the step S650), the control flow goes back to the step S640 for repeat of processes.

On the other hand, if there is a command input (Yes at the step S650), at a step S660, the controller 35 determines whether or not the input command is a stop command. If it is a stop command (Yes at the step S660), the process for reproduction of content is ended.

On the other hand, if it is not a stop command (No at the step S660), at a step S670, the controller 35 makes a changeover of playlists used for reproduction of content, in accordance with a set of playlist configuration data and an input transition command and stores a new playlist ID in the state memory portion 36, and the control flow goes back to the step S610 for repeat of processes after the step 610.

There may be information about which content is played for every playlist, to be stored in the playlist memory portion 30 or the state memory portion 36. Then, at the step S610, the acquisition of content may be started not from a first content in the corresponding playlist, but from a content having next reproduction order to one previously reproduced in the corresponding playlist. This prevents frequent repeats of a same content in changeovers among playlists, thus having an enhanced efficiency that a user does not get tired easily. There is not necessarily the need of reproduction of contents in the order described in a playlist. The order of reproduction may be randomly decided or changed to be reproduced.

Figure 19:
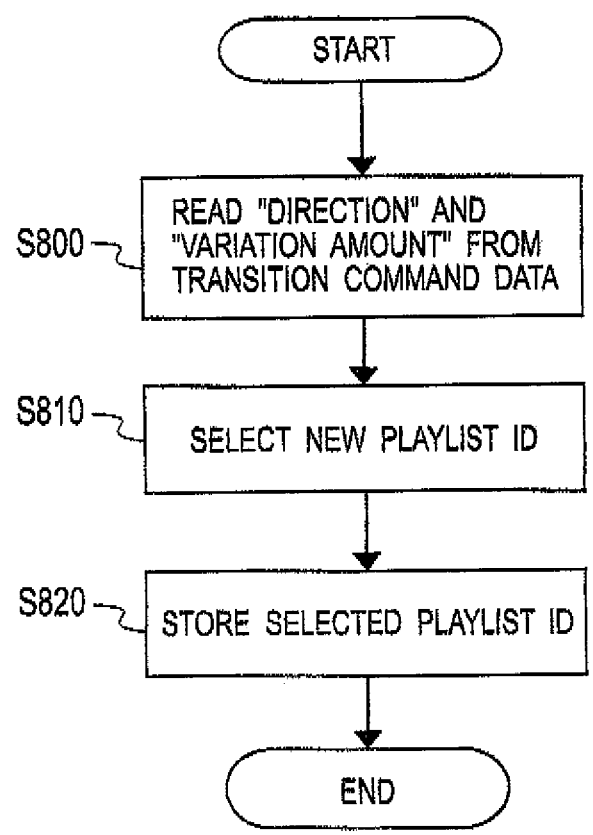
FIG. 19 is a flowchart showing a playlist changeover process.

FIG. 19 is a flowchart showing details of a playlist changeover process at the step S670 in FIG. 17.

In the playlist changeover process at the step S670 in FIG. 17, the controller 35 reads a "direction" and a "variation amount" corresponding to an input transition command from the playlist configuration data memory portion 31 at a step S800. At that time, for playlists having layers and transition command data including "layers" as shown in FIG. 11, a "layer" is also read. Following processes target a "layer" read at this step.

At a step S810, the controller 35 reads a numerical value corresponding to a playlist ID of a playlist in use stored in the state memory portion 36, from a set of playlist configuration data stored in the state memory portion 36, and with the numerical value, and a direction and variation amount read at the step S800, selects a playlist ID of a new playlist to store in the state memory portion 36 at a step S820. Details of the process at the step S810 depend on a storage format of playlist configuration data.

Description is now made of details of a process at the step S810 in FIG. 19 for each format of playlist configuration data.

Description is made for playlist configuration data in the first format using "order" in FIG. 5, or in the second format using "coordinate values" in FIG. 6. In this case, from a set of playlist configuration data, an order or a coordinate value, which is a numerical value corresponding to a playlist ID of playlist in use stored in the state memory portion 36 is read to be used with a direction and a variation amount read at the step S800 to carry out a numerical operation of addition, subtraction, or the like, to select a playlist ID of a new playlist based on a result of the numerical operation.

Figure 20:
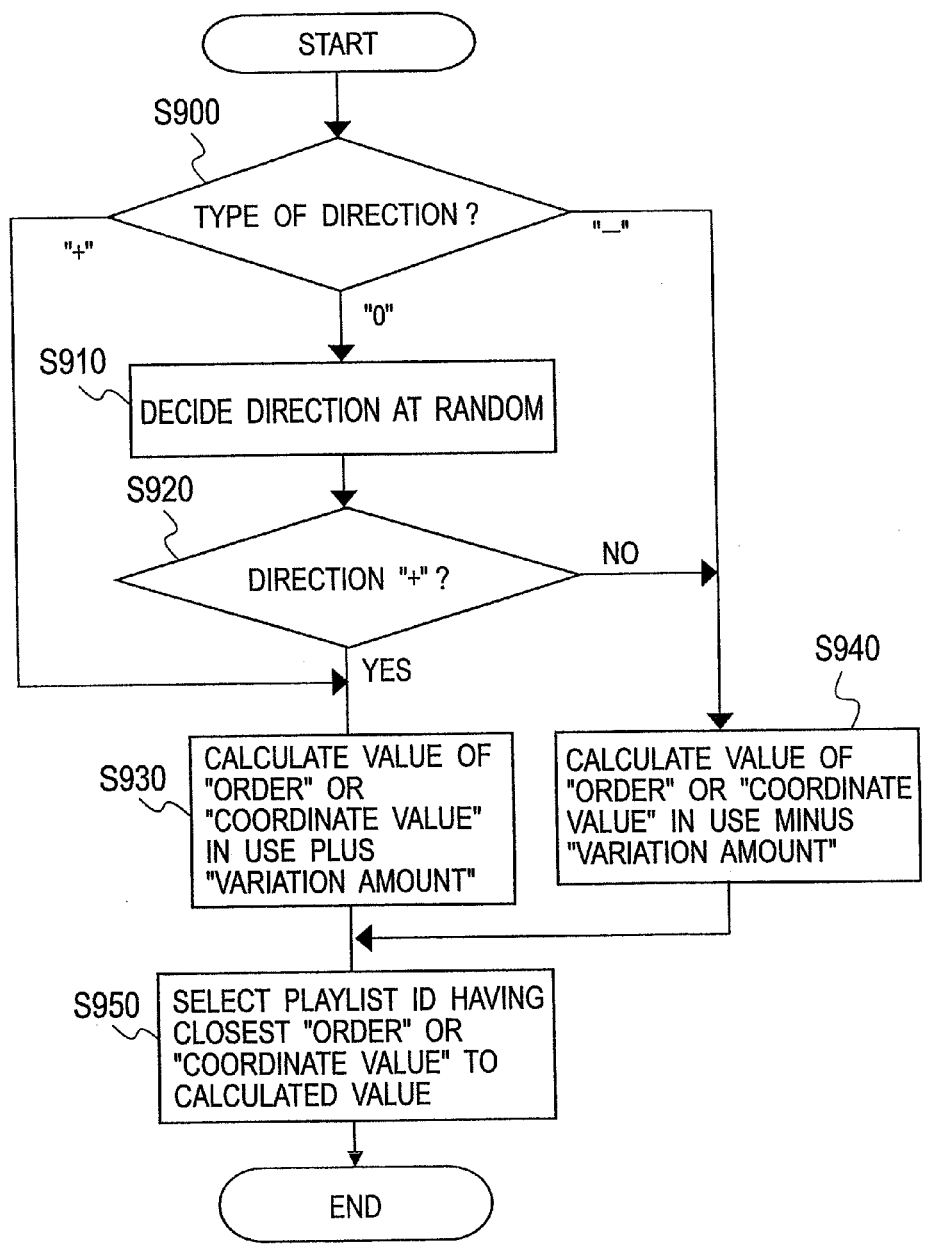
FIG. 20 is a flowchart showing details of a playlist selection process.

FIG. 20 is a flowchart showing details of the process at the step S810 for playlist configuration data in the first format using "order" in FIG. 5, or in the second format using "coordinate values" in FIG. 6.

At first, at a step S900, the controller 35 determines whether or not the "direction" read at the step S800 is '0', '+', or '−'. If it is '0', the control flow goes to a step S910, while if it is '+', it goes to a step S930 and if it is '−', it goes to a step S940.

At the step S910, the controller 35 randomly decides a direction of '+' or '−' using random numbers, and at the following step S920, determines whether or not the direction decided at the step S910 is '+'. If it is '+', the control flow goes to the step S930, and if it is '−', goes to the step S940.

At the step S930, the controller 35 reads an "order" or a "coordinate value", corresponding to a playlist in use, that is a playlist ID stored in the state memory portion 36, from the playlist configuration data memory portion 31, to calculate the value plus a "variation amount" read at the step S800. For coordinate values having dimensions, addition is performed for every dimension. Then the control flow goes to a step S950.

On the other hand, at the step S940, the controller 35 reads an "order" or a "coordinate value", corresponding to a playlist in use, to calculate the value minus a "variation amount" read at the step S800. Then the control flow goes to the step S950.

Then, at the step S950, the controller 35 refers to the playlist configuration data memory portion 31 to select a playlist ID of a playlist having a closest value to a value calculated at the step S930 or S940, that is an "order" or a "coordinate value" having a least difference. Here, a selection is made except for a playlist corresponding to a playlist ID stored in the state memory portion 36, a playlist now in use, thereby causing a changeover among playlists without fail.

The foregoing is details of the process at the step S810 for playlist configuration data using "order" or "coordinate values". In the foregoing process, the direction and variation amount of transition command data is a difference in numerical value between a playlist before change, a playlist in use, and a new playlist, a playlist after change, in a set of playlist configuration data, that is a target value regarding a difference in the order or coordinate values. There is not always a changeover of playlists with complete correspondence to a direction and a variation amount in transition command data, thereby selecting a playlist with a closer condition.

Here, there will be a numerical example using "order" in FIGS. 5B and 9A. When a playlist ID stored in the state memory portion 36 is "Classic" (order '1') and "command 3" in FIG. 9A (direction '+' and variation amount '1') is selected, at the step S930 an operation of '1+1=2' is carried out, and at the step S950 a selection is made of a playlist ID corresponding (closest) to the order '2', "Easy Listening".

There will be a numerical example using "coordinate values" in FIGS. 6B and 9B. It is noted that the number of dimensions is 1, and there is storage of numerical values corresponding to only dimension 1 in FIG. 9B. When a playlist ID stored in the state memory portion 36 is "Easy Listening" (coordinate value '0.6'), and "command 3" in FIG. 9B (direction '+' and variation amount '0.2') is selected, at the step S930 an operation of '0.6+0.2⁼0.8' is carried out, and at the step S950 a selection is made of a playlist ID corresponding (closest) to the coordinate value '0.8', "Folk". In this example, there is complete correspondence between a target coordinate value obtained by operation and a coordinate value of playlist in playlist configuration data. As a matter of course, there can be a difference.

Description is now made of the process at the step S810 for playlist configuration data in a format using similarities in FIG. 7. From playlist configuration data, all values (similarities) relative to a playlist in use, which is a playlist ID stored in the state memory portion 36, are read to perform a comparison operation with a variation amount read at the step S800, to select a playlist ID of a new playlist based on the result of comparison operation. Detailed description will be made of this process with reference to a flowchart in FIG. 21.

At a step S1500, the controller 35 reads a column corresponding to a playlist ID stored in the state memory portion 36, from matrix data of similarities, which is playlist configuration data.

At a step S1510, the controller 35 selects an element having a least different value with a "variation amount" read at the step S800, from the column data. If there are elements having the same difference with the "variation amount", there might be use of random numbers to select either one.

At a step S1520, the controller 35 selects a playlist ID of a playlist corresponding to an element selected at the step S1510, to end the step S810.

There will be a numerical example using "similarities" in FIGS. 7B and 9C. When a playlist ID stored in the state memory portion 36 is "Easy Listening", and "command 2" in FIG. 9C (variation amount '0.4') is selected, at the step S1500 a column ('0.8', '1.0', '0.7', '0.3', '0.1') corresponding to "Easy Listening" are read from matrix data in FIG. 7B. At the step S1510, there is made a selection of element '0.3' having a closest value to the variation amount '0.4' from these values. At the step S1520, there is made a selection of corresponding playlist ID "Rock".

The same is true for playlist configuration data using similarities. It might be said that a variation amount in transition command data is a target value regarding a similarity between a playlist before change, which is a playlist in use, and a new playlist, which is a playlist after change. "Similarity" and "degree of difference" are a pair of concepts. It is said that a variation amount is a target value regarding a degree of difference between a playlist before change and a playlist after change.

The foregoing description is for the content reproduction process. The above-noted content reproduction process enables more subjective operations compared to a method to display titles of playlists on the display device 41 for selection by user.

According to the first embodiment, at the step S600 in the flowchart in FIG. 17, the control flow includes, but is not limited to a default setting of playlist to be used for reproduction. This step can be changed to another method. For example, at the top of reproduction process, there may be selection of a desired content by a user, setting a playlist including the content as default.

According to the method as described, a user only considers a relative change based on a content being currently reproduced to select a transition command. On the basis of content being currently reproduced, one can typically image a relative change with ease. On the other hand, by a method to display titles, etc. of playlists on the display device for selection by a user, regardless of a currently reproduced content, one needs to image a content of each playlist depending on text information, causing difficulty in subjective operations. For example, when there are titles of playlists of "quite excite", "a little excite", "a little calm", "quite calm", etc, it is difficult by viewing these titles to predict the absolute degree of excitement of each playlist, to predict the content corresponding thereto in advance (before reproduction). On the other hand, based on a content being currently reproduced, a selection of choice representing a relative change, such as "a little more excite" or "a little more calm", means having a specific criterion, which is a content being reproduced. This permits use of auditory/visual information regarding the content besides text information for determination, thus is intuitive and relatively facilitated for a user.

According to the present embodiment, the server 1 transmits a set of playlist configuration data representing relationships between playlists in numerical values, to the terminal 2 through the network 3. The terminal 2 receives the set of playlist configuration data, and, for a reproduction of content, makes a changeover among playlists for contents in accordance with the set of playlist configuration data, to reproduce a content of playlist after change. This allows for a reproduction of content in accordance with a state of mind the user may have from a plenty of contents with a facilitated operation.

According to the first embodiment, every set of playlist configuration data has an addition of set of transition commands representing directions for change and variation amounts in corresponding playlists, and display messages corresponding to variation amounts of transition commands, respectively. The terminal 2 displays display messages for user's selection, allowing for employment of a method, based on a playlist, to specify a relative change therefrom, to change to another playlist for reproduction of the content.

This eliminates times and labors that otherwise might have been necessitated to prepare playlists with processes of transition of impressions defined in advance, and enables an intuitive operation to effect a changeover among various playlists, permitting reproduction of the content. As a result, there come up favorable applications such as making use of a trail listening before purchase of contents as a chance of access to a plenty of contents available from the server 1.

According to the first embodiment, a user on the terminal 2 can request a preferred one from sets of playlist configuration data to the server 1 to have a transmission thereof from the server 1 for use. Thus, the user can define a process of transition of playlists in accordance with one's preference. Accordingly, a changeover among sets of playlist configuration data in accordance with user's preference renews the process of transition of playlists even for contents the user already have. Thus, the user does not get tired easily, and user's interest or attention for contents or delivery service will be kept without difficulty. For a reproduction of even known contents for a user, the contents are reproduced with a changeover among playlists for reproduction of contents in accordance with a set of playlist configuration data, increasing a chance to discover a surprising similarity or commonality between contents for multifaceted enjoyments.

(Second Embodiment)

Description is now made of a second embodiment of the present invention. The entire configuration of a system according to the embodiment 2 is similar to that of FIG. 1, where a server 1a instead of the server 1 is connected to a terminal 2 through a network 3. In the second embodiment, configuration and operations of the terminal 2 is similar to those of the first embodiment. Thus, description is made of only the server 1a.

Figure 22:
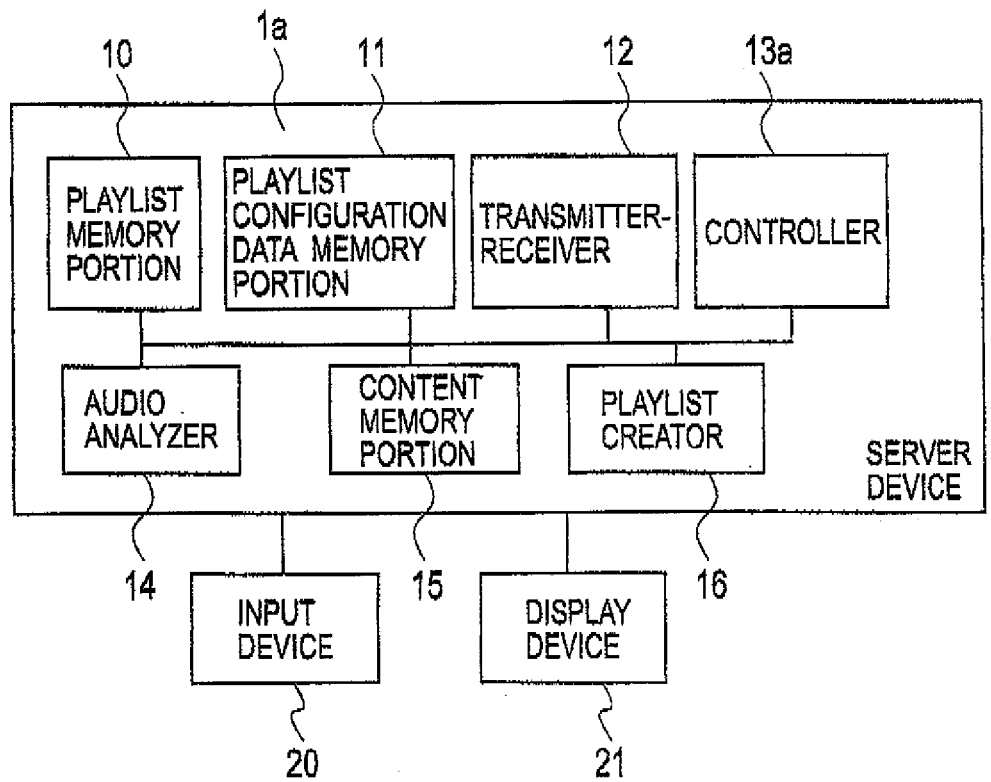
FIG. 22 is a block diagram showing a configuration of a server according to a second embodiment.

FIG. 22 illustrates a configuration of the server 1a according to the second embodiment.

In the server 1a according to the second embodiment, compared with the server 1 according to the first embodiment, there is an addition of an audio analyzer 14, a content memory portion 15 and a playlist creator 16, and a controller 13a is slightly different. Other elements are similar to those of the first embodiment. In the second embodiment, the content memory portion 15 is provided in the server 1a. Contents may be stored in a different device from the server 1a, and the server 1a may include a content acquirer.

In the second embodiment, the audio analyzer 14 analyzes an audio data being a content, or audio data attached or included in a content, to automatically determine a music genre of content and mood of content for use. Contents according to the present embodiment are, for example, music audio data, video data with audio such as music video, etc., slide show data combining still image and music audio data.

The content memory portion 15 stores a delivery file including a content described in a playlist stored in the playlist memory portion 10.

Figure 23:
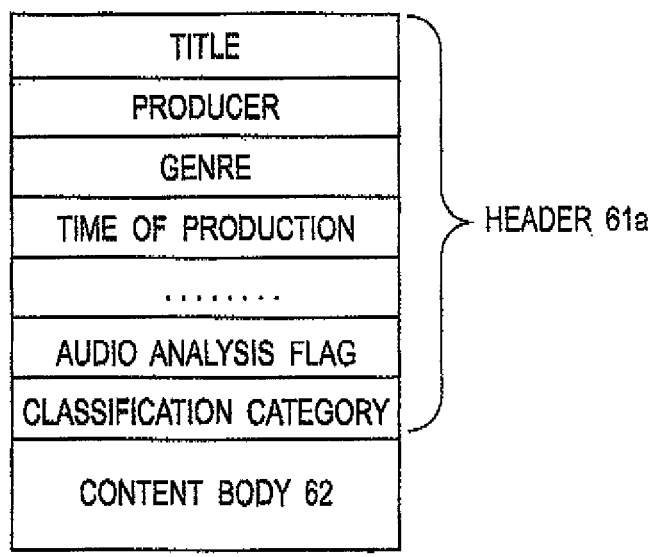
FIG. 23 is a diagram showing a format of a delivery file according to the second embodiment.

FIG. 23 illustrates a storage format of delivery file stored in the content memory portion 15 according to the second embodiment. Each delivery file is configured with a header 61a and content body 62, as shown in FIG. 23. The header 61a includes attribute information of content, such as a title, a producer (artist), a genre, time of production of content, etc., an audio analysis flag, and a category of classification.

Figure 24:
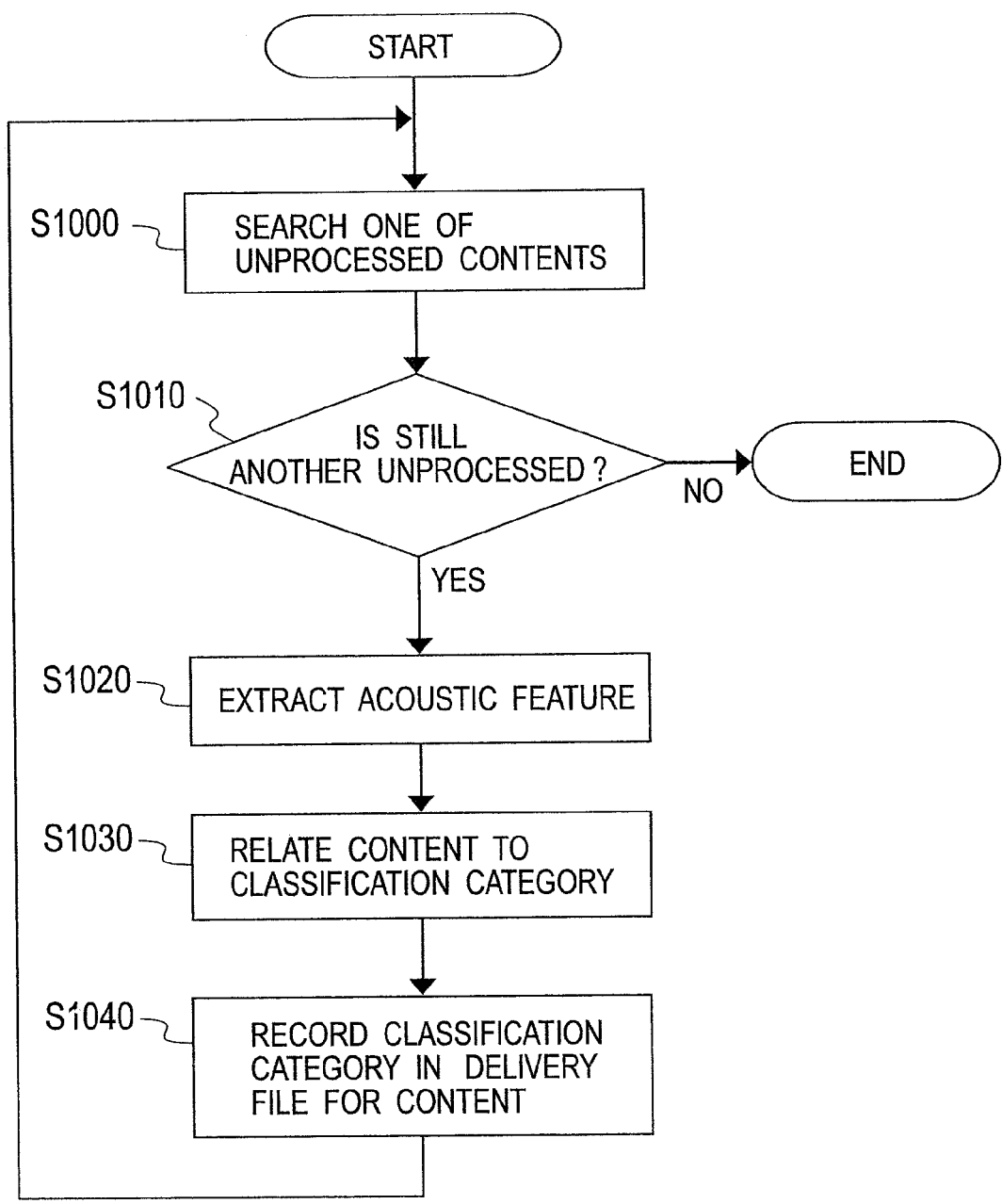
FIG. 24 is a flowchart showing an audio analysis process according to the second embodiment.

FIG. 24 is a flowchart showing an audio analysis process by the audio analyzer 14 according to the second embodiment.

The audio analysis process is started with the controller 13a to detect a new delivery file added to the content memory portion 15 and to give an instruction to the audio analyzer 14. Or, an administrator on the server 1a may give an instruction to start an audio analysis process through an input device 20.

That is, at a step S1000, the audio analyzer 14 searches an unprocessed content, which is without audio analysis process. For the header 61a of a delivery file with audio analysis process, there is a flag representing that an audio analysis is processed to be recorded as will be described later on, permitting a determination of whether or not an audio analysis process is implemented.

At a step S1010, the audio analyzer 14 determines whether or not there is a delivery file without audio analysis process. If there is no unprocessed delivery file (No at the step S1010), the control flow ends, while if there is still an unprocessed delivery file (Yes at the step S1010), at a step S1020, the audio analyzer 14 reads an audio data included in the content body 62 of the delivery file to extract acoustic features.

As a method for extracting acoustic features, for example, there can be use of a technique disclosed in Japanese Patent Application Laid-Open Publication No. 2007-322598. As acoustic features, there may be the strength of audio signal, a frequency distribution, a tempo, the strength of beat, etc. to be detected as acoustic features. After an analysis of audio data, there may be a block estimated from the audio data, as music is recorded therein, to be targeted for an extraction of acoustic features.

At a step S1030, the audio analyzer 14 relates a content to prescribed categories of classification using acoustic features. As a method for relating acoustic features to categories of classification, there can be use of a technique disclosed in Japanese Patent Application Laid-Open Publication No. 2007-322598. As categories of classification, there can be use of music genres of "classics", "rock", "jazz", etc. There can be use of moods of content, such as "calm", "dynamic", and "groovy rhythm".

At a step S1040, the audio analyzer 14 records a category of classification acquired at the step S1030 in the delivery file, stores in the content memory portion 15, and the control flow goes back to the step S1000.

When a content is created, an audio analysis flag is set as '0'. At the step S1040, while recording a category of classification, the audio analysis flag is changed to '1'. The foregoing description is for the audio analysis process. At the step S1030, a content may be related to categories of classification, and at the step S1040, a delivery file for a content may have a record of categories of classification.

In the playlist configuration data memory portion 11, as a playlist ID, there is a record of correspondence with the above-mentioned category of classification, as same in the first embodiment.

Figure 25:
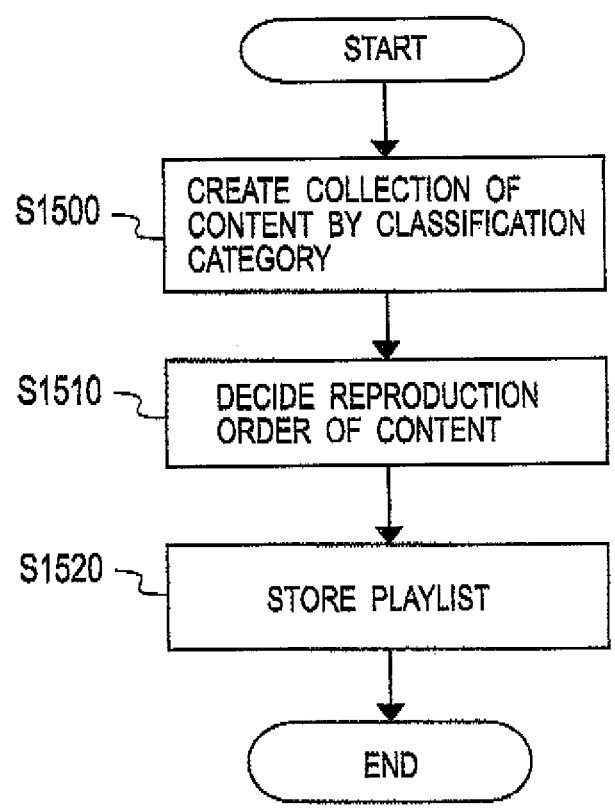
FIG. 25 is a flowchart showing a playlist creation process according to the second embodiment.

Description is now made of a playlist creation process by the playlist creator 16, with refer rice to a flowchart in FIG. 25.

At a step S1500, the playlist creator 16 reads deliver files in sequence from the content memory portion 15 to create a collection of contents for each category of classification.

At a step S1510, the playlist creator 16 decides a reproduction order of contents for each collection of contents created at the step S1500. A reproduction order can be decided using header information in delivery files. For example, the order may be in chronological order of production, or decided in accordance with a notation of, among others, title, or producer. It is noted that there is no need of all contents included in a collection of content to be put in a playlist. The number of contents to be put in a playlist may be limited. The reproduction order of contents included in a collection of contents may be decided by an administrator on the server 1a, or a user on the terminal 2.

At a step S1520, the playlist creator 16 associates a reproduction order and content acquisition information to create a playlist for each collection of contents and stores in the playlist memory portion 10. Playlist IDs in the playlist memory portion 10 are similar to those in the playlist configuration data memory portion 11, corresponding to categories of classification used by the audio analyzer 14. The foregoing description is for the playlist creation process.

Therefore, on the server 1 of the first embodiment, there is the need of creating a playlist by a content creator, or, among others, an administrator or user on the server 1. On the server 1a of the second embodiment, a playlist is automatically created by, among others, the audio analyzer 14, playlist creator 16, etc.

The second embodiment, in addition to the effects of the first embodiment, further allows for a significant cut of, among others, man-hours or costs. By combination of the first and second embodiments, there can be parallel use of a playlist made by hand and a playlist automatically created by the audio analysis, allowing for a provision of various and multifaceted playlists.

(Third Embodiment)

Description is now made of a third embodiment of the present invention.

Figure 26:
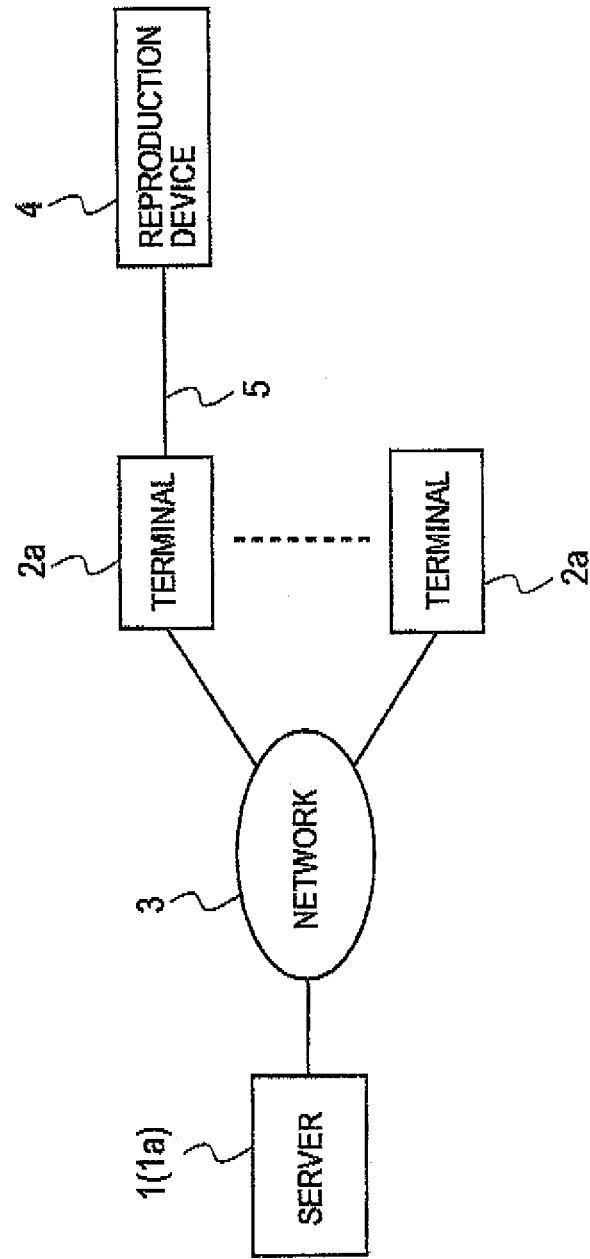
FIG. 26 is a diagram showing an entire configuration of a system according to a third embodiment.

FIG. 26 is a block diagram showing an entire configuration of a system according to the third embodiment.

As a server of the third embodiment, there may be use of either the server 1 of the first embodiment in FIG. 2, or the server 1a of the second embodiment in FIG. 22. For simplification of description, it will be described as server 1 later on. Operations of the sewer are similar to those in the first or second embodiment, and description will be omitted.

In the third embodiment, a terminal 2a connected to the server 1 through a network 3, has a reproduction device 4 connected thereto through an interface 5. The connection between the terminal 2a and the reproduction device 4 can be disconnected as needed. As the interface 5, there can be use of various interfaces, such as a wired/wireless LAN, USB, IEEE1394, etc. Instead of the interface 5, there can be use of a memory card, etc. for data exchange between the terminal 2a and the reproduction device 4.

Figure 27:
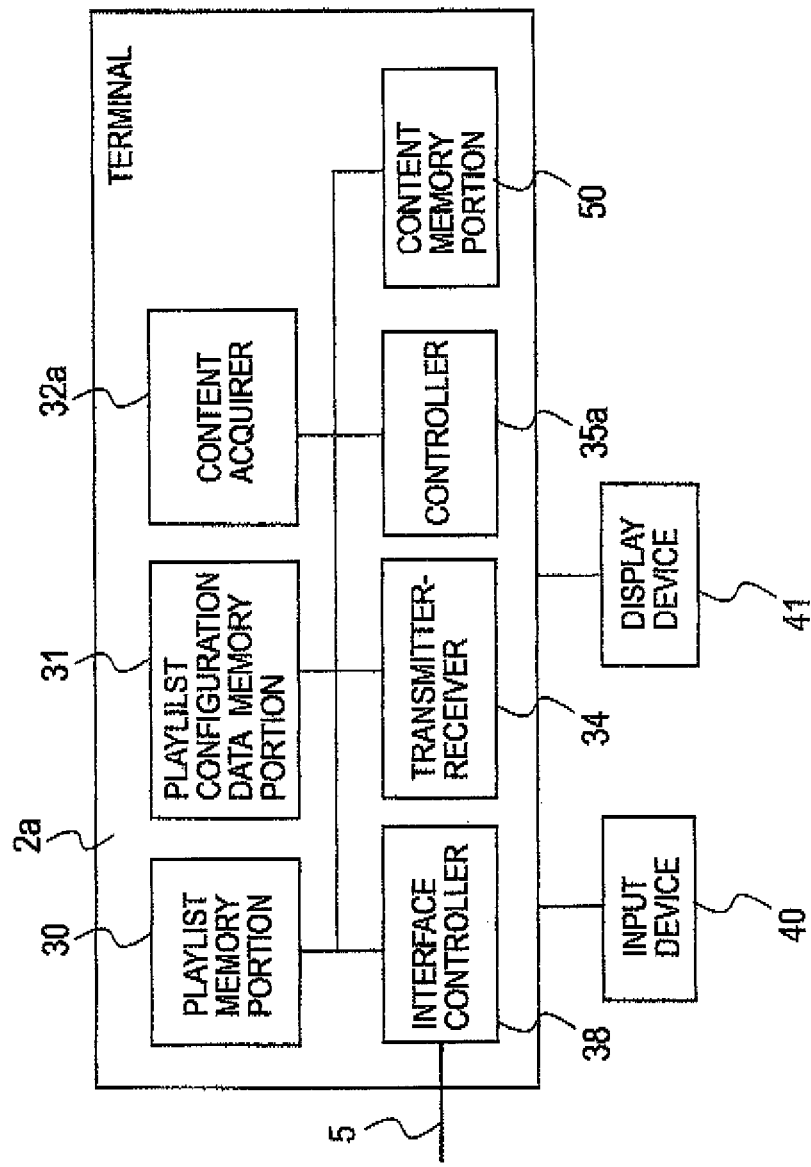
FIG. 27 is a block diagram showing a configuration of a terminal according to the third embodiment.

FIG. 27 is a block diagram illustrating a configuration of the terminal 2a.

In FIG. 27, the terminal 2a includes a playlist memory portion 30, a playlist configuration data memory portion 31, a content acquirer 32a, a transmitter-receiver 34, a controller 35a, an interface controller 38, and a content memory portion 50, and has an input device 40 and a display device 41 connected thereto.

Figure 28:
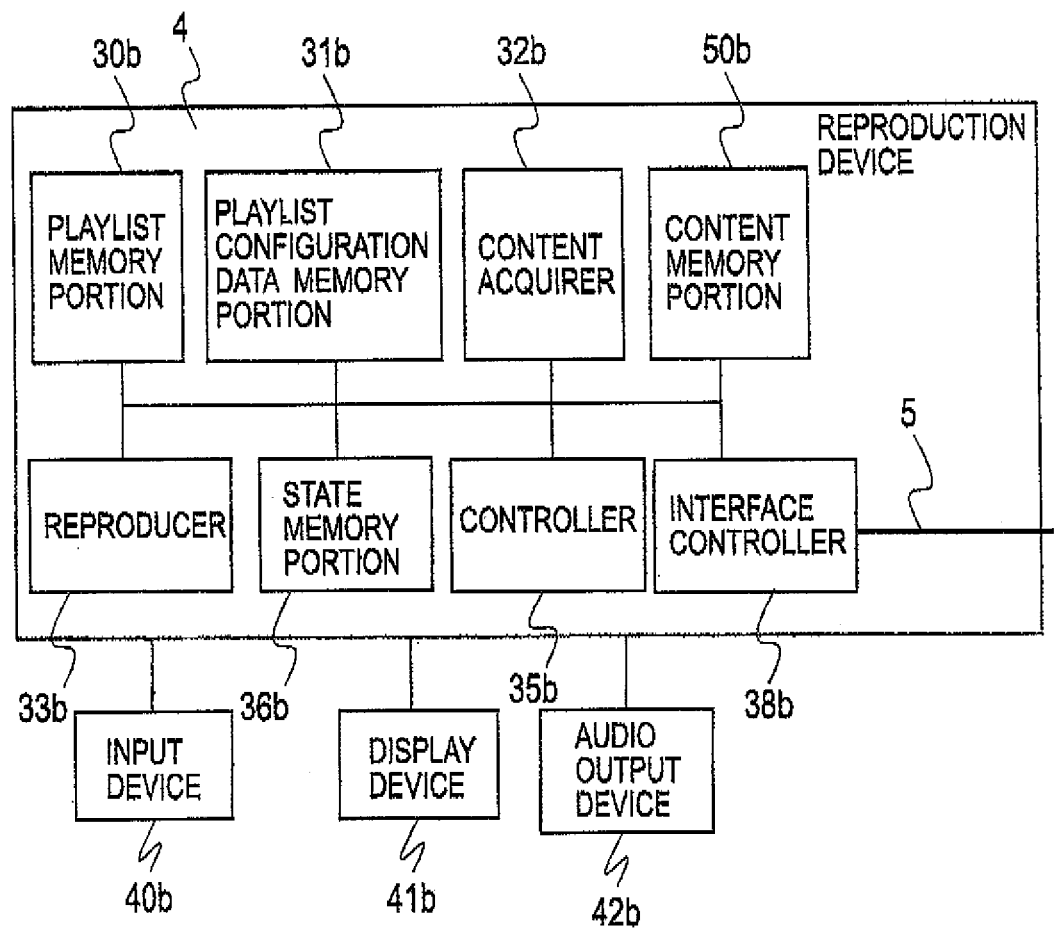
FIG. 28 is a block diagram showing a configuration of a reproduction device according to the third embodiment.

FIG. 28 is a block diagram illustrating a configuration of the reproduction device 4.

In FIG. 28, the reproduction device 4 includes a playlist memory portion 30b, a playlist configuration data memory portion 31b, a content acquirer 32b, a reproducer 33b, a controller 35b, a state memory portion 36b, an interface controller 38b, and a content memory portion 50b, and has an input device 40b, a display device 41b and an audio output device 42b connected thereto. It is noted that the reproduction device 4, the input device 40b, and the display device 41b and the audio output device 42b may be configured as a single device, to be a portable reproduction device.

Figure 29:
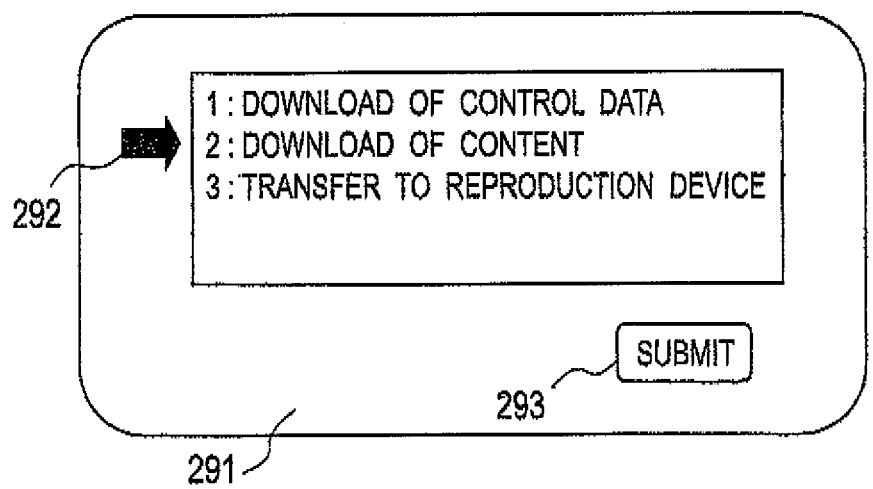
FIG. 29 is a diagram illustrating a menu screen on the terminal according to the third embodiment.

FIG. 29 is a diagram illustrating a menu screen 291 on the display device 41 by the controller 35a of the terminal 2a after power-on.

In the menu screen 291 shown in FIG. 29, there is display of three kinds of menu: "1: Download of control data"; "2: Download of content"; and "3: Transfer to reproduction device". A left-hand arrow shows a location of a cursor 292. When a user moves the cursor 292 on a desired menu item by the input device 40 and clicks a submit button 293, a corresponding process for each menu item is started.

For a user selecting a menu item of "1: Download of control data", operations of the terminal 2a and the server 1 are similar to those of the first embodiment.

Figure 30:
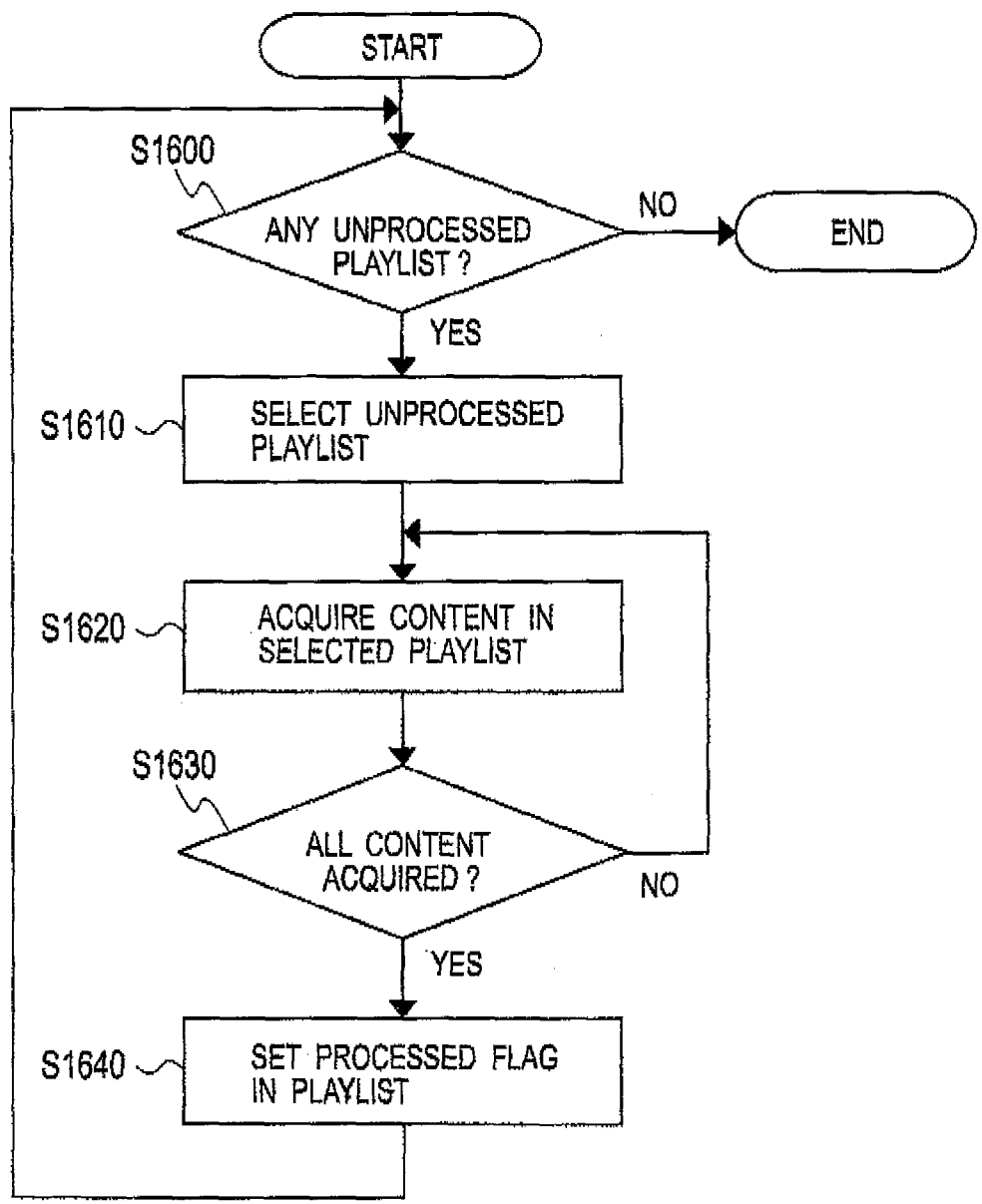
FIG. 30 is a flowchart showing a content download process according to the third embodiment.

FIG. 30 is a flowchart showing a content download process on the terminal 2a and the server 1 when a user selects a menu item of "2: Download of content" from the menu screen 291 in FIG. 29.

At a step S1600, on the terminal 2a, the controller 35a reads the playlist memory portion 30 to determine whether or not an unprocessed playlist, which is without a download of content, is on the terminal 2a. At the playlist memory portion 30, each playlist has a flag for record whether or not a download process is implemented.

At a step S1610, on the terminal 2a, the controller 35a selects one of unprocessed playlists.

At a step S1620, on the terminal 2a, the content acquirer 32a acquires contents in sequence in accordance with a playlist selected at the step S1610 and stores in the content memory portion 50. Specifically, with reference to the playlist memory portion 30, in accordance with the reproduction order described in the corresponding playlist, the content acquirer 32a reads content acquisition information, acquires contents through the transmitter-receiver 34, and stores in the content memory portion 50. Delivery files of contents are stored in the server 1, or another device accessible from the terminal 2a.

At a step S1630, the content acquirer 32a determines whether or not all contents described in the playlist selected at the step S1610 are acquired. If all contents are acquired, the control flow goes to a step S1640, and if not, goes back to the step S1620 to acquire a next content.

At the step S1640, on the terminal 2a, the controller 35a sets a flag to indicate that a download is processed, recorded in the playlist memory portion 30. Then, the control flow goes back to the step S1600 to repeat the foregoing processes. The foregoing description is for the content download process. It is noted that the content download process may be omitted with contents stored in the content memory portion 50 of the terminal 2a in advance.

Figure 31:
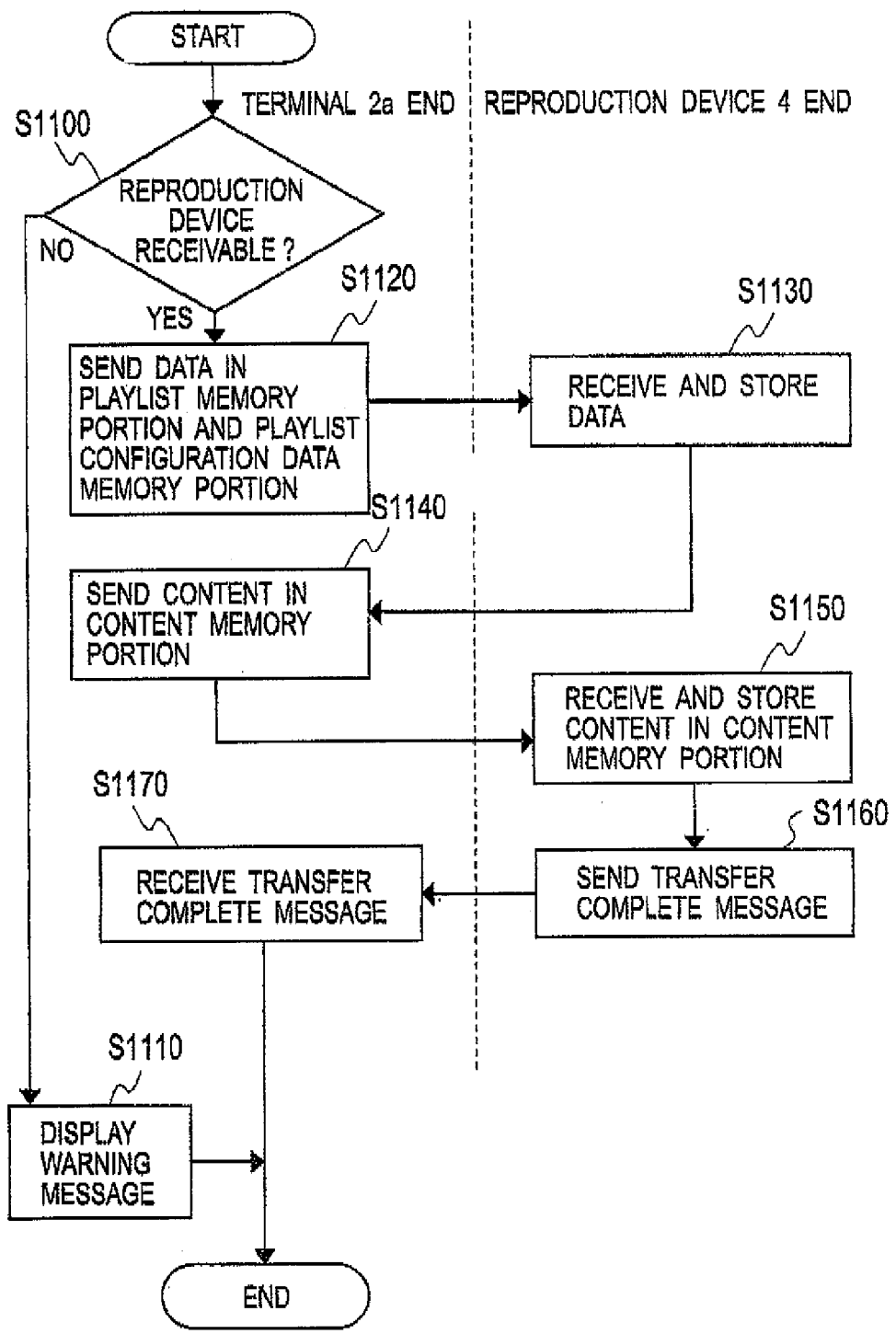
FIG. 31 is a flowchart showing a transfer process to the reproduction device according to the third embodiment.

FIG. 31 is a flowchart showing operations on the terminal 2a and the reproduction device 4 when a user selects a menu item of "3: Transfer to reproduction device" from the menu screen 291 in FIG. 29.

At a step S1100, on the terminal 2a, the interface controller 38 is connected with the reproduction device 4 through the interface 5, and determines whether or not being in a state available for reception of data. If it is in a state unavailable for reception of data (No at the step S1100), at a step S1110, the interface controller 38 displays an alert message etc. on the display device 41, and the control flow ends subsequent processes.

On the other hand, if it is available for reception of data (Yes at step S1110), at a step S1120 the interface controller 38 reads a set of playlist configuration data from the playlist configuration data memory portion 31 and playlists from the playlist memory portion 30, to transmit to the reproduction device 4 through the interface 5.

At a step S1130, on the reproduction device 4, the interface controller 38b receives a set of playlist configuration data from the terminal 2a to store in the playlist configuration data memory portion 31b, while receiving playlists to store in the playlist memory portion 30b. The interface controller 38b or the controller 35b changes content acquisition information as necessary, so that a content stored in the content memory portion 50b can be referred by content acquisition information described in a playlist. For a case in FIG. 28, acquisition information is for the content acquirer 32b of the reproduction device 4 to read the content from the content memory portion 50b on the identical device. Thus, there is not necessarily the need of using URL, etc. There may be use of a content ID, a file path name etc. for unique identification of content on the reproduction device 4.

At a step S1140, on the terminal 2a, the interface controller 38 transmits contents stored in the content memory portion 50 through the interface 5.

At a step S1150, on the reproduction device 4, the interface controller 38b receives the data and stores in the content memory portion 50b in the reproduction device 4, and at a step S1160, transmits a transfer complete message to the terminal 2a.

At a step S1170, the terminal 2a receives the transfer complete message from the reproduction device 4, and the control flow ends the process.

The foregoing description is for the transfer process from the terminal 2a to the reproduction device 4. After the transfer process is completed, a user disconnects the reproduction device 4 from the interface 5, and starts a reproduction process.

For the reproduction device 4, a reproduction process is similar to that by the terminal 2 of the first embodiment in the flowchart in FIG. 17. That is, there are same operations implemented by: the playlist memory portion 30b of the reproduction device 4 and the playlist memory portion 30 of the terminal 2; the playlist configuration data memory portion 31b of the reproduction device 4 and the playlist configuration data memory portion 31 of the terminal 2; the content acquirer 32b of the reproduction device 4 and the content acquirer 32 of the terminal 2; the reproducer 33b of the reproduction device 4 and the reproducer 33 of the terminal 2; the controller 35b of the reproduction device 4 and the controller 35 of the terminal 2; and the state memory portion 36b of the reproduction device 4 and the state memory portion 36 of the terminal 2, respectively. It is noted that operations of the content acquirer 32b of the reproduction device 4 are different from those of the content acquirer 32 of the terminal 2. Since contents to be used for reproduction are already stored in the content memory portion 50b, contents will be acquired from the content memory portion 50b, eliminating the need of acquisition of contents from the server 1, another device on the network 3, or the like.

According to the third embodiment, even the reproduction device 4 without a direct connection to the server 1 through the network 3, can connect through the terminal 2a having a communication function to the server 1 to download playlist configuration data, playlists, contents, etc. for a reproduction of content with a facilitated changeover among playlists, allowing for a reproduction of content in accordance with a state of mind the user may have.

(Fourth Embodiment)

Description is now made of a fourth embodiment.

Figure 32:
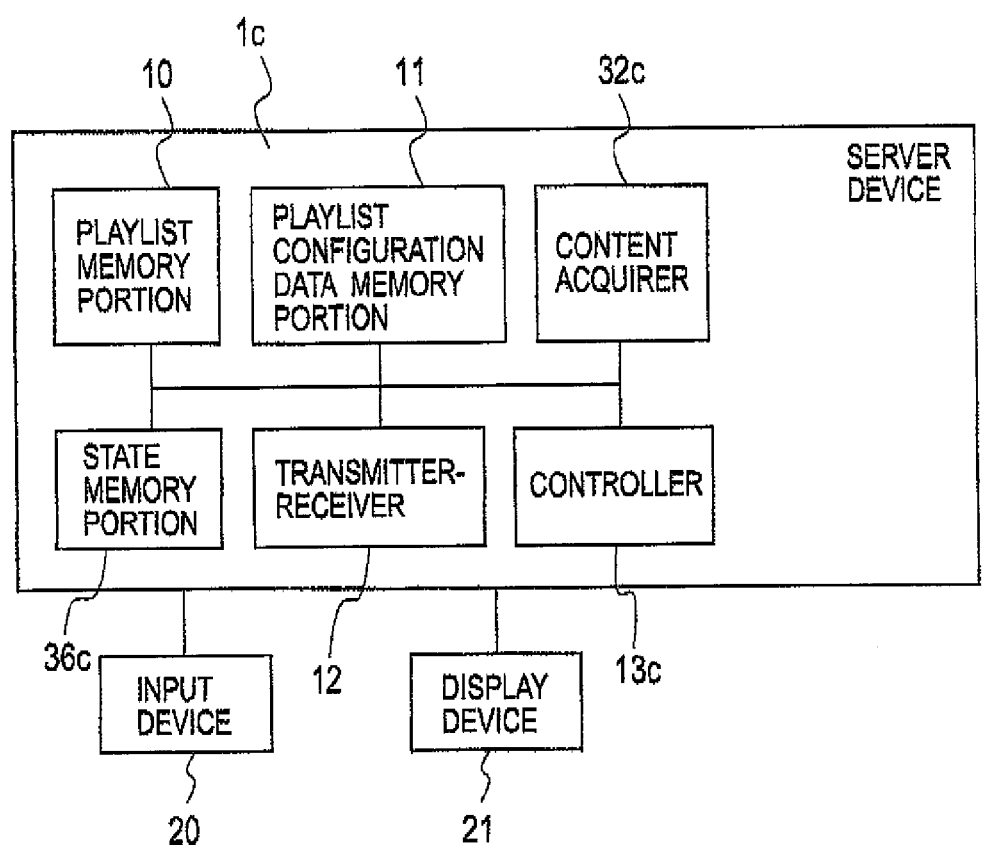
FIG. 32 is a block diagram showing a configuration of a server according to a fourth embodiment.

FIG. 32 is a block diagram illustrating a configuration of a server 1c according to the fourth embodiment.

The server 1c of the fourth embodiment includes a playlist memory portion 10, a playlist configuration data memory portion 11, a transmitter-receiver 12, a controller 13c, and a content acquirer 32c, and a state memory portion 36c, and has an input device 20 and a display device 21 connected thereto. The playlist memory portion 10, playlist configuration data memory portion 11, and transmitter-receiver 12 operate similar to those of the first embodiment. The content acquirer 32c and state memory portion 36c operate similar to the content acquirer 32 and the state memory portion 36 of the terminal 2 in the first embodiment, respectively. Although omitted in the present fourth embodiment, the server device 1c may include an audio analyzer 14 and a playlist creator 16 as well as in the second embodiment. The server 1c may include a content memory portion configured to store contents, as well as in the second embodiment.

Figure 33:
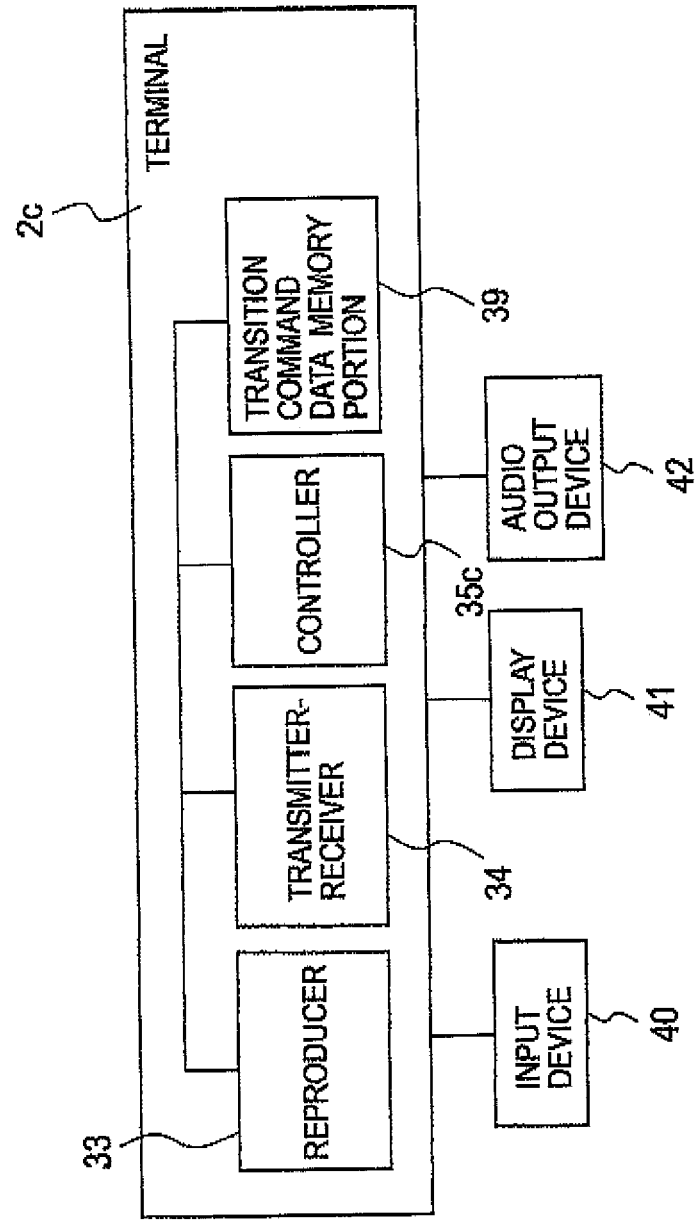
FIG. 33 is a block diagram showing a configuration of a terminal according to the fourth embodiment.

FIG. 33 is a block diagram illustrating a configuration of a terminal 2c of the fourth embodiment.

The terminal 2c of the fourth embodiment includes a reproducer 33, a transmitter-receiver 34, a controller 35c, and a transition command data memory portion 39, and has an input device 40, a display device 41, and an audio output device 42 connected thereto. In the fourth embodiment, the terminal 2c may not store playlists and playlist configuration data.

The transition command data memory portion 39 stores a set of transition command data as shown in FIG. 9 or 11. The transition command data memory portion 39 also stores a playlist configuration data ID corresponding to the set of transition command data. These data may be transmitted from the server 1c to the terminal 2c by a predetermined menu selection, as well as a playlist download process in the first embodiment. Or, these data may be transmitted from the server 1c prior to a reproduction process. Different from the first embodiment, there is no need of transmission of playlists and playlist configuration data. There is only the need of transmission of transition command data and a playlist configuration data ID as control data from the server 1c to the terminal 2c. There may be storage of transition command data and a playlist configuration data ID in the terminal 2c in advance. When the playlist configuration data memory portion 11 of the server 1c stores only one set of playlist configuration data, there may be an omission of storage of playlist configuration data ID in the transition command data memory portion 39 and transmission of playlist configuration data ID at a step S1200, which will be described later on.

Description is now made of operations.

Figure 34:
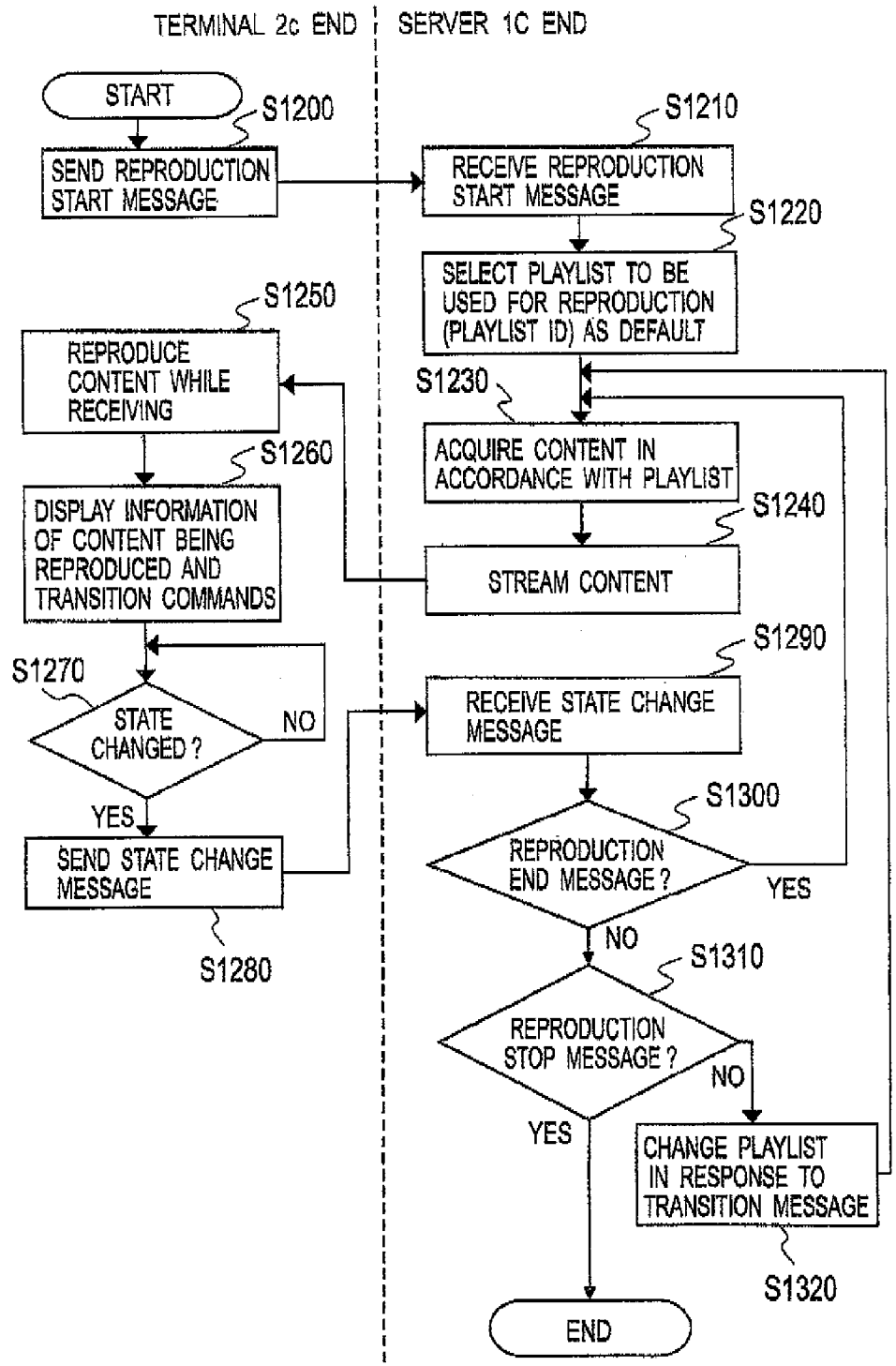
FIG. 34 is a flowchart showing a content reproduction process according to the fourth embodiment.

FIG. 34 is a flowchart showing a content reproduction process by the server 1c and the terminal 2c of the fourth embodiment.

The reproduction process is started with a predetermined instruction by a user to the terminal 2c through the input device 40.

At a step S1200, on the terminal 2c, the controller 35c reads a playlist configuration data ID from the transition command data memory portion 39 to put in a reproduction start message, and transmits to the server 1c through the transmitter-receiver 34.

At a step S1210, on the server 1c, the controller 13c receives a reproduction start message through the transmitter-receiver 12, and stores a playlist configuration data ID included in the reproduction start message in the state memory portion 36c.

At a step S1220, the controller 13c reads a set of playlist configuration data corresponding to the playlist configuration data ID stored in the state memory portion 36c from the playlist configuration data memory portion 11, and selects a playlist ID to be used for reproduction, as default, from playlist IDs included in the set of playlist configuration data, to store in the state memory portion 36c. For playlist configuration data configured with layers, a playlist ID in the lowest layer is selected, for instance.

At a step S1230, the content acquirer 32c acquires a content in accordance with a playlist of a playlist ID stored in the state memory portion 36c. Specifically, with reference to the playlist memory portion 10, in accordance with a reproduction order described in a corresponding playlist, the content acquirer 32c reads acquisition information of the content, acquires the content through the transmitter-receiver 12, and temporarily stores in the content acquirer 32c. Contents are stored in the content memory portion (not shown in FIG. 32) of the server 1c, or another device accessible from the server 1c. When the server has a content memory portion, acquisition information may not be necessarily a URL, etc. There may be use of a content ID or a path name of file, for unique identification of content in the content memory portion, as acquisition information.

At a step S1240, the controller 13c reads a content stored in the content acquirer 32c, and streams as a delivery file, etc. through the transmitter-receiver 12 to the terminal 2c. A content includes a header 61 for description of content information and a content body 62.

At a step S1250, on the terminal 2c, the controller 35c receives a content through the transmitter-receiver 34, the reproducer 33 implements necessary processes thereon including a process of decoding, to be output on the display device 41 and the audio output device 42 for reproduction of content Streaming by the server 1c permits a start of reproduction of the content, even though the terminal 2c has not received the entire delivery file.

At a step S1260, the controller 35c displays content information included in a header 61 of received content on the display device 41, and reads the transition command data memory portion 39 to display a set of transition commands for changeovers among playlists on the display device 41. The transition command data memory portion 39 stores a set of transition command data in a format as shown in FIG. 9 or 11. There are display messages corresponding to commands 1 to K to be read for display. The display screen is similar to that in FIG. 18. User's operations by use of the display screen are similar to those in FIG. 18, and redundant description is omitted.

At a step S1270, the controller 35c determines whether or not a state is changed. A state change is one of an end of reproduction of content, an input of transition command, and an input of reproduction stop command.

When and only if there is a state change (Yes at the step S1270), at a step S1280, the controller 35c transmits a state change message corresponding to the kind of state change, that is, one of a reproduction end message, a reproduction stop message, and a transition message, through the transmitter-receiver 34 to the server 1c. For the transition message, a layer, a direction, and a variation amount corresponding to the input transition command are also transmitted.

At a step S1290, on the server 1c, the controller 13c receives a state change message through the transmitter-receiver 12, and at a step S1300, determines whether or not the received state change message is a reproduction end message. If it is a reproduction end message (Yes at the step S1300), the control flow goes back to the step S1230 and the content acquirer 32c acquires next content.

If it is not a reproduction end message (No at the step S1300), the controller 13c determines whether or not it is a reproduction stop message. If it is a reproduction stop message (Yes at the step S1310), the control flow ends the content reproduction process.

If it is not a reproduction stop message (No at the step S1310), it is for a transition message. At a step S1320, the controller 13c makes a changeover of playlists based on information of a "layer", a "direction", and a "variation amount" included in the transition message, and a set of playlist configuration data corresponding to a playlist configuration data ID stored in the state memory portion 36c of the server 1c at the step S1210, and stores a playlist ID of new playlist after change in the state memory portion 36c. The control flow goes back to the step S1230, and repeats the foregoing processes. Instead of the transmission of information of a layer, a direction, and a variation amount in the transmission of transition message at the step S1280, a transition command ID (either one of commands 1 to K) may be transmitted to be compared to transition command data stored in the playlist configuration data memory portion 11 of the server 1c at the step S1320, to identify a layer, a direction and a variation amount for a changeover of the playlist.

Here, when there is use of format using "order" in FIG. 5, or "coordinate value" in FIG. 6 for a set of playlist configuration data corresponding to a playlist configuration data ID stored in the state memory portion 36c on the server 1c at the step of S1210, a playlist changeover process in response to a transition message at the step S1320 is similar to that of the first embodiment in FIG. 20. After the steps of S900 to S950 in FIG. 20, a playlist ID of selected playlist is stored in the state memory portion 36c. Different from the first embodiment, these steps are implemented not by the terminal 2(2c), but by respective elements of the server 1c.

Figure 21:
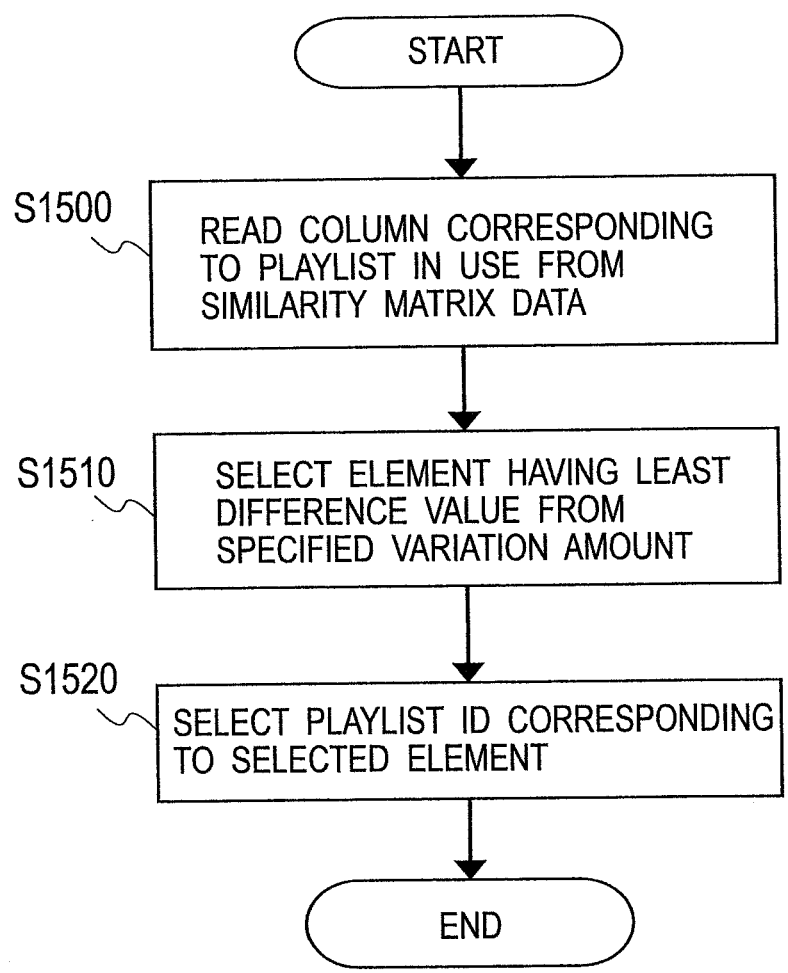
FIG. 21 is a flowchart showing details of another playlist selection process.

Detailed description of the step S1320 with a format using "similarities" for a set of playlist configuration data is similar to those of the first embodiment in FIG. 21. After the steps of S1500 to S1520 in FIG. 21, a playlist ID of selected playlist is stored in the state memory portion 36c. Different from the first embodiment, these steps are also implemented not by the terminal 2(2c), but by respective elements of the server 1c.

Other steps are similar to those of the first to third embodiments.

According to the fourth embodiment, when the server 1c streams a content, for the terminal 2c, there is no need of storing playlists and playlist configuration data, and acquisition of contents in accordance with a playlist, allowing for making the terminal 2c at low cost. From contents stored in the server 1c, or another device on the network 3, there is an intuitive operation enabled to effect a changeover among various playlists, permitting reproduction of the content. As a result, there come up favorable applications such as making use of a trial listening before purchase of contents as a chance of access to a plenty of contents provided by the server 1c or another device on the network 3.

In the fourth embodiment, the terminal 2c does not include the playlist configuration data memory portion 31 and the server 1c does not transmit a set of playlist configuration data to the terminal 2c, but the present invention is not limited to this. For example, as well as the first embodiment, instead of the transition command data memory portion 39, the playlist configuration data memory portion 3 may be included in the terminal 2c. After the server 1c transmits a set of playlist configuration data and a set of transition command data to the terminal 2c, as well as the first embodiment, processes corresponding to those at the steps S1220 and S1320 may be implemented on the terminal 2c, and a content selection process at the step S1230 may be implemented on the server 1c. That is, on the terminal 2c, a playlist ID selected in accordance with a set of playlist configuration data stored in the playlist configuration data memory portion 31 may be transmitted from the terminal 2c to the serer device 1c, and on the server 1c, with reference to the playlist memory portion 10, in accordance with a playlist corresponding to the received playlist ID, a content may be acquired for transmission to the terminal 2c.

According to the first to fourth embodiments, a user can reproduce contents in accordance with a state of mind the user may have, by use of playlists with facilitated operations. Based on a content being currently reproduced, the user can specify a relative change therefrom, to make a changeover to another playlist for reproduction of the content, allowing for an intuitive operation.

There is an intuitive operation enabled to effect a changeover among various playlists, permitting reproduction of the content. Thus, there come favorable applications such as making use of a trial listening before purchase of contents as a chance of access to a plenty of contents available from the server 1.

Further, a user can make a selection from sets of playlist configuration data for use, and one can define a process of transition of playlists in accordance with one's preference. Accordingly, a changeover among sets of playlist configuration data renews the process of transition of playlists even for contents the user already have. Thus, the user does not get tired easily, and user's interest or attention for contents or delivery service will be kept without difficulty.

In the first to fourth embodiments, there is description of delivery of content as a delivery file by the server 1, 1a, 1c or another device on the network 3, but the present invention is not limited to this. Contents may be provided to a terminal by a media of an optical disk of a CD, a DVD, a BD, etc. It may be provided through a broadcast by a broadcaster. This applies on the fifth to eighth embodiments as will be described later on.

(Fifth Embodiment)

Description is now made of a fifth to eighth embodiments of the present invention. For the first to fourth embodiments, description is made of examples of a set of playlist configuration data representing relationships in numerical values between playlists for changeovers among various playlists. The later-described fifth to eighth embodiments are examples, for contents classified by category, of a set of classification configuration data representing relationships in numerical values between categories of classification, for changeovers among contents of various categories of classification.

Figure 35:
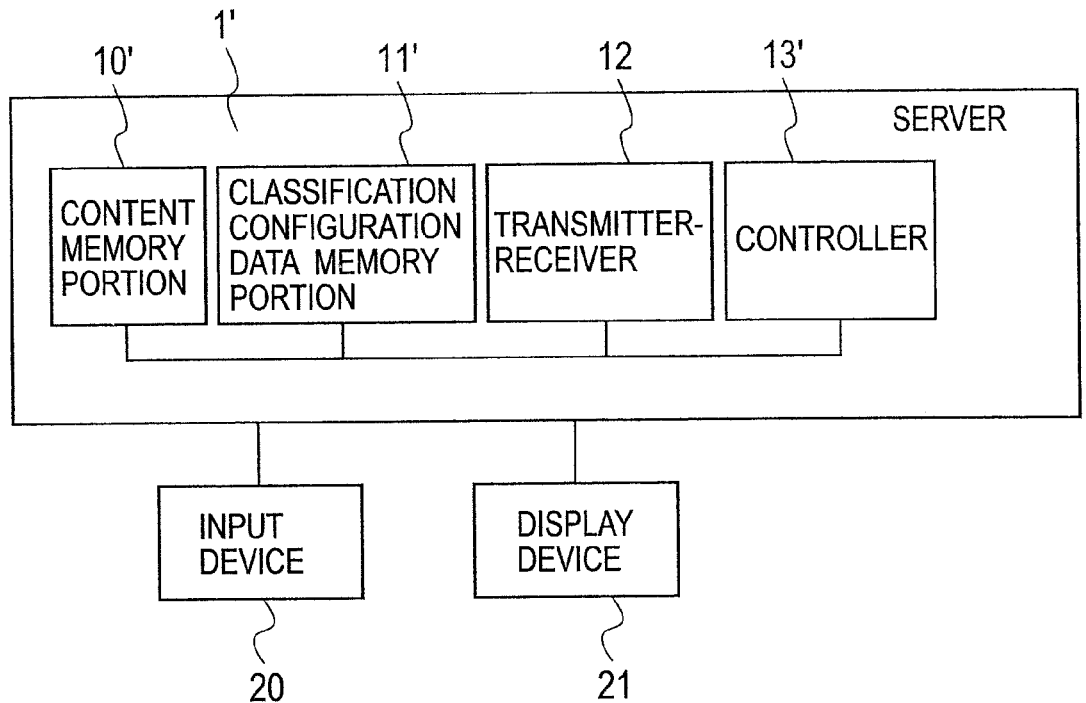
FIG. 35 is a block diagram showing a configuration of a server according to a fifth embodiment.

FIG. 35 is a block diagram illustrating a configuration of a server 1' according to the fifth embodiment.

In FIG. 35, difference from the server 1 of the first embodiment in FIG. 2, is that there are a content memory portion 10' instead of the playlist memory portion 10, and a classification configuration data memory portion 11' instead of the playlist configuration data memory portion 11. In this regard, a controller 13' has a slightly different function. Other constituent elements are similar to those in FIG. 2, and designated by like reference characters with omission of redundancy. In the fifth embodiment, the content memory portion 10' and the classification configuration data memory portion 11' are arranged in the identical server 1', but can be arranged in separate servers. It is noted that the server 1' of the fifth embodiment is also connected to a terminal 2' as shown in FIG. 1. The configuration of terminal 2' of the fifth embodiment will be described with reference to FIG. 43.

Figure 36:
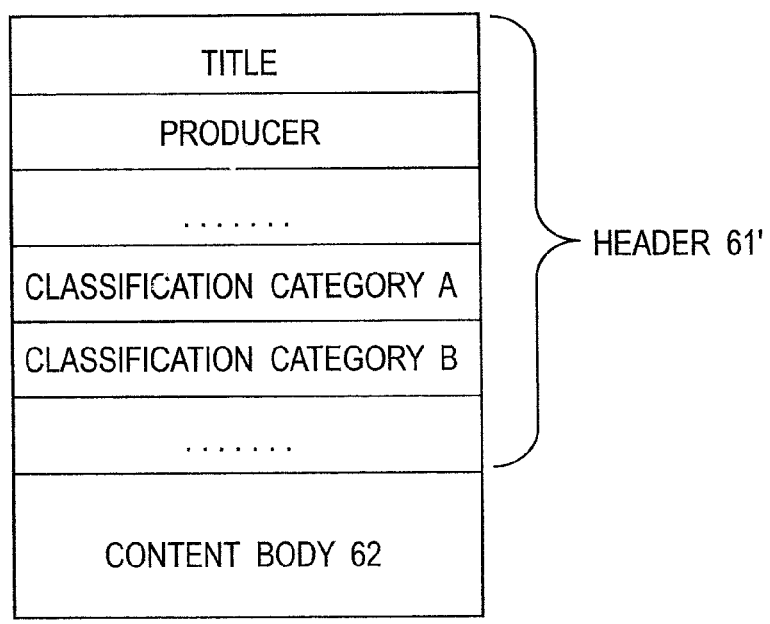
FIG. 36 is a diagram showing a format of a delivery file.

FIG. 36 is a diagram illustrating a format of content transmitted from the server 1' to the terminal 2' of the fifth embodiment.

As shown in FIG. 36, a content being a delivery file is composed of a header 61' and a content body 62. The header 61' of the fifth embodiment includes attribute information of a content, composed of a title of the content and a producer (artist), etc., and a category of classification.

Categories of classification are data of numerical values or text data representing results of categorizing of contents into categories based on a predetermined criterion. For example, as categories of classification, there is use of genre of content, time of production of content, mood of content, situation or place suitable for reproduction of content, or the like. A delivery file may include a category of classification, or categories of classification (classification category A, classification category B) as shown in the example in FIG. 36.

For the fifth embodiment, there is description of the server 1' to transmit a content having a category of classification recorded in the header 61', to the terminal 2', but not limited to this. Categories of classification may not be included in a delivery file of content, and may be transmitted to the terminal 2' separately from a content. Or, a content with categories of classification may be transferred not from the server 1' but from a DVD, etc. to the terminal 2'.

FIG. 37 is a diagram illustrating data stored in the classification configuration data memory portion 11', corresponding to FIG. 4 in the first embodiment.

That is, the classification configuration data memory portion 11' associates and stores, in a format shown in FIG. 37, a classification configuration data ID, a set of classification configuration data representing relationships between categories of classification, a set of transition command data, and description data, and further stores a configuration data ID with highest priority. Classification configuration data IDs are IDs for a unique identification of sets of classification configuration data. The configuration data ID with highest priority is a classification configuration data ID to be used with highest priority. In the example in FIG. 37, M sets of respective data are stored (M>=1). There may be not plural but one set of classification configuration data to be stored. For a set of classification configuration data to be stored, there can be an omission of classification configuration data IDs and the classification configuration data ID with highest priority. As will be described later on, there can be an omission of transition command data and description data.

In the fifth embodiment, as a basic format of classification configuration data, there is use of the following three formats in FIGS. 38 to 40.

FIG. 38 illustrates a first format for classification configuration data, corresponding to FIG. 5 of the first embodiment.

FIG. 38A relates categories 1 to N of categories of classification to an order 1 to N when they are ranked in accordance with a predetermined criterion. FIG. 38B illustrates the first format for classification configuration data for use of music genres as categories of classification. Difference from FIG. 5 of the first embodiment is only a replacement of "playlist ID" to "category of classification", and redundant description will be omitted.

FIG. 39 illustrates a second format for classification configuration data, corresponding to FIG. 6 of the first embodiment.

FIG. 39A relates categories 1 to N of categories of classification to coordinate values when they are put in a predetermined coordinate system. FIG. 39B illustrates the second format for classification configuration data for use of music genres as categories of classification. Difference from FIG. 6 of the first embodiment is only a replacement of "playlist ID" to "category of classification", and redundant description will be omitted.

FIG. 40 illustrates a third format for classification configuration data, corresponding to FIG. 7 of the first embodiment.

FIG. 40A represents similarities between arbitrary two categories from categories 1 to N of categories of classification in a matrix format FIG. 40B illustrates the third format for classification configuration data for use of music genres as categories of classification. Difference from FIG. 7 of the first embodiment is only a replacement of "playlist ID" to "category of classification".

The foregoing FIGS. 38 to 40 illustrate the basic format for classification configuration data in the fifth embodiment Categories of classification can be in layers.

FIG. 41 is a table illustrating classification configuration data in layers, corresponding to FIG. 8 of the first embodiment.

In FIG. 41, difference from FIG. 8 of the first embodiment is only a replacement of "layer 1 (upper playlists)" and "layer 2 (lower playlists)" to "layer 1 (upper categories)" and "layer 2 (lower categories)", and redundant description will be omitted.

Description is now made of transition command data (refer to FIG. 37) stored in the classification configuration data memory portion 11'.

The transition command data is, as will be described later on, data to be used for changeovers among categories of classification on the terminal 2', similar to those shown in FIGS. 9, 11, etc. of the first embodiment.

It is noted that in the fifth embodiment, as shown in FIG. 42, as classification configuration data, there is storage of a combination of similarities and order. On the terminal 2', the order is used for decisions of directions and the similarities are used for variation amounts, permitting use of commands having directional movements by use of similarities. There may be storage of a combination of similarities and coordinate values, using the coordinate values for decisions of directions and similarities for variation amounts on the terminal 2'.

Figure 43:
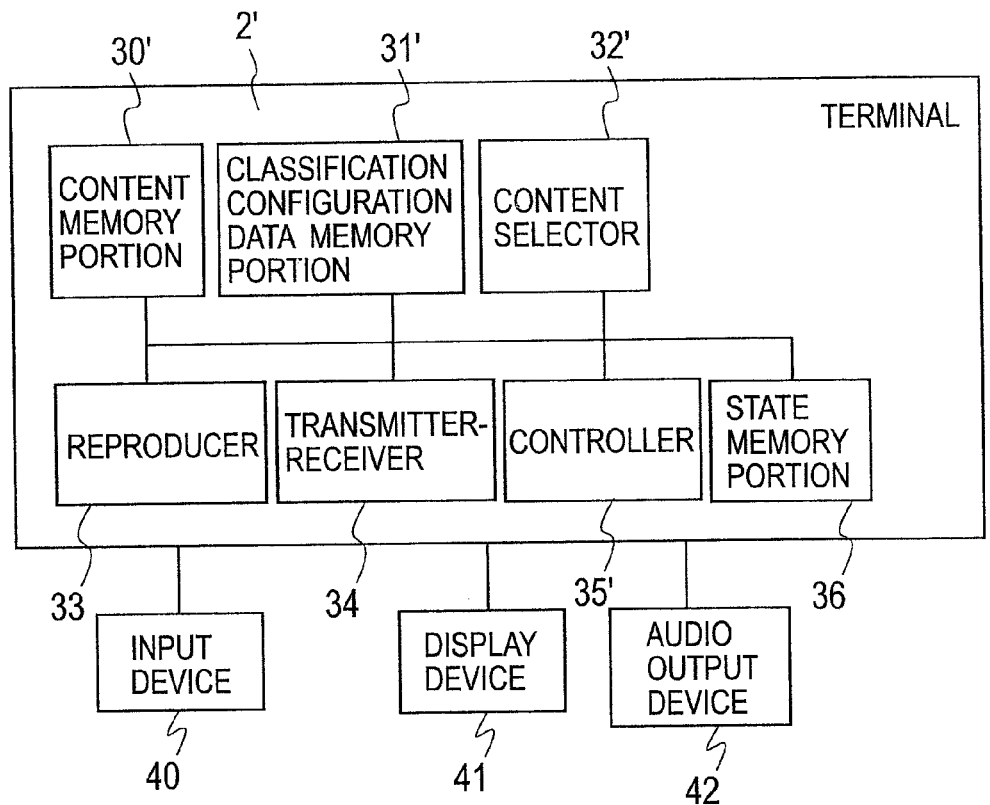
FIG. 43 is a block diagram showing a configuration of a terminal.

FIG. 43 is a block diagram illustrating a configuration of the terminal 2' of the fifth embodiment.

In FIG. 43, unlike the terminal 2 of the first embodiment in FIG. 12, the terminal 2 includes a content memory portion 30' instead of the playlist memory portion 30, a classification configuration data memory portion 31' instead of the playlist configuration data memory portion 31, and a content selector 32' instead of the content acquirer 32. In this regard, a controller 35' has a slightly different function. Other constituent elements are similar.

Figure 44:
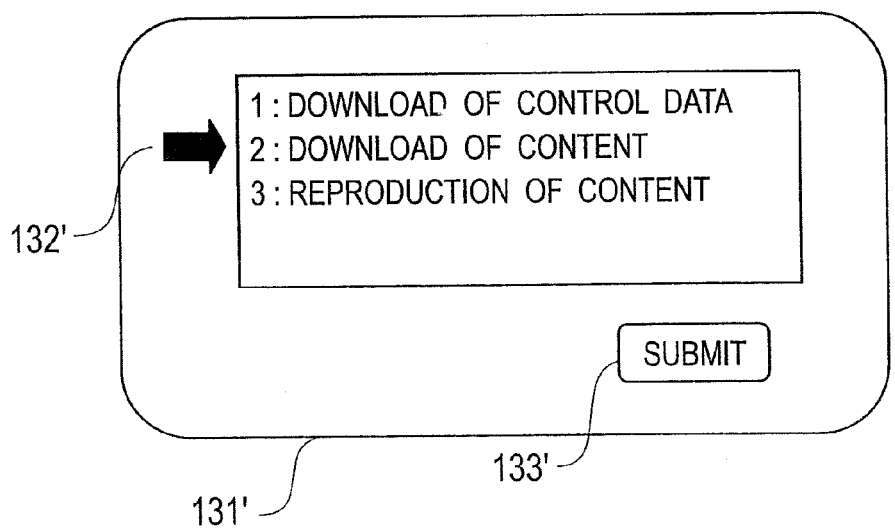
FIG. 44 is a diagram illustrating a menu screen on the terminal.

FIG. 44 illustrates a menu screen displayed on a display device 41 by the controller 35' of the terminal 2' after power-on.

In FIG. 44, a menu screen 131' displays three kinds of menu selections of "1: Download of control data"; "2: Download of content"; and "3: Reproduction of content". To the menu screen 131 of the first embodiment in FIG. 13, there is an addition of the selection menu of "3: Download of content". A curser 132', and a submit button 133 are similar to those in FIG. 13.

Description is now made of operations of the terminal 2' and the server 1' for a selection from three kinds of selection menu on the menu screen 131', with reference to a flowchart.

Figure 45:
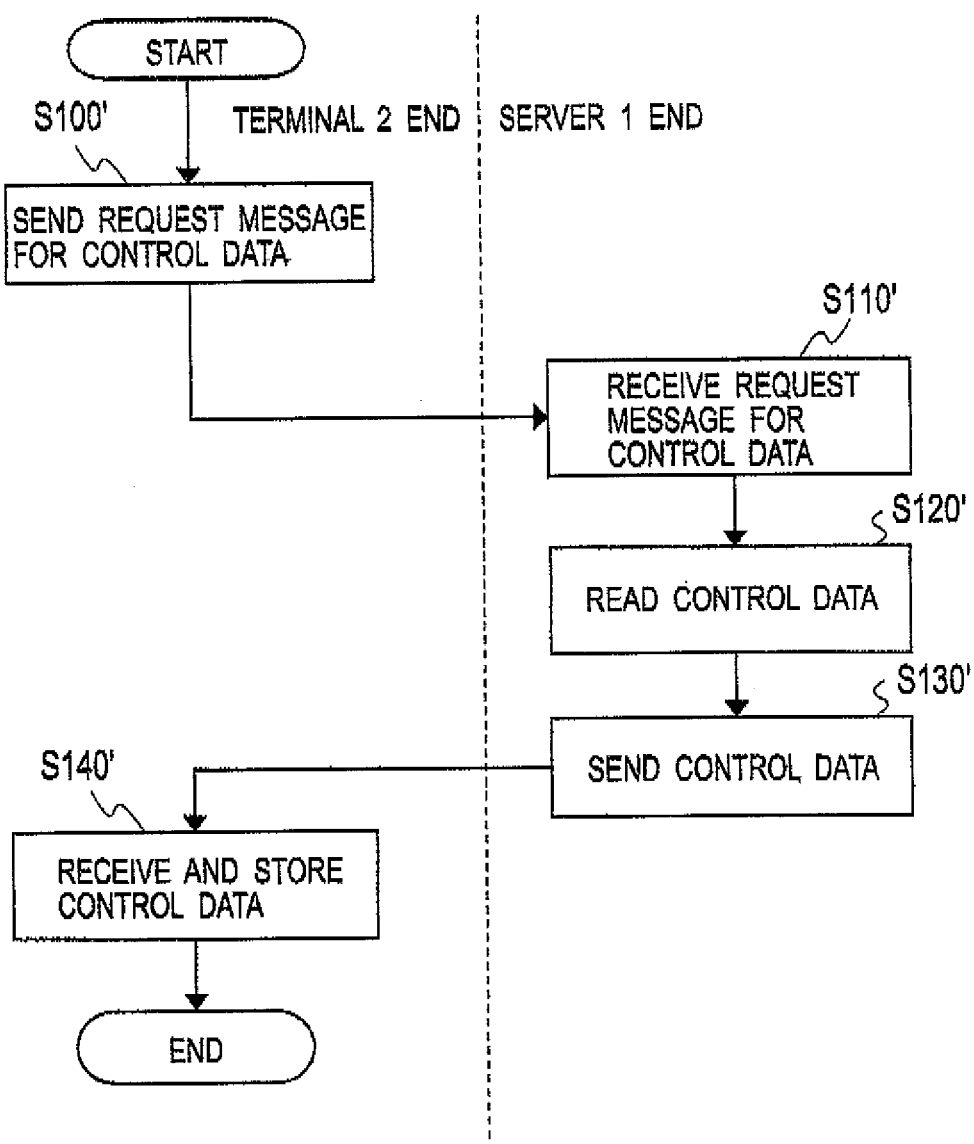
FIG. 45 is a flowchart showing a download process of control data.

FIG. 45 is a flowchart showing a download process of control data on the terminal 2' and the server 1' when a user selects "1: Download of control data" from the menu screen 131' in FIG. 44, corresponding to FIG. 14 of the first embodiment.

In the fifth embodiment, there is no use of playlists. Difference from FIG. 14 of the first embodiment, is that at a step S130' on the server 1', the controller 13' transmits a set of classification configuration data and a set of transition command data read as control data to the terminal 2' through a transmitter-receiver 12. At a step S140', on the terminal 2', the controller 35' receives a set of classification configuration data and a set of transition command data of control data from the server 1' through a transmitter-receiver 34, and stores in the classification configuration data memory portion 31'.

According to the foregoing download process of control data, there is no need of operations including a selection of condition, or the like, by a user, thus suitable for a simplified operation on the terminal 2'.

Figure 46:
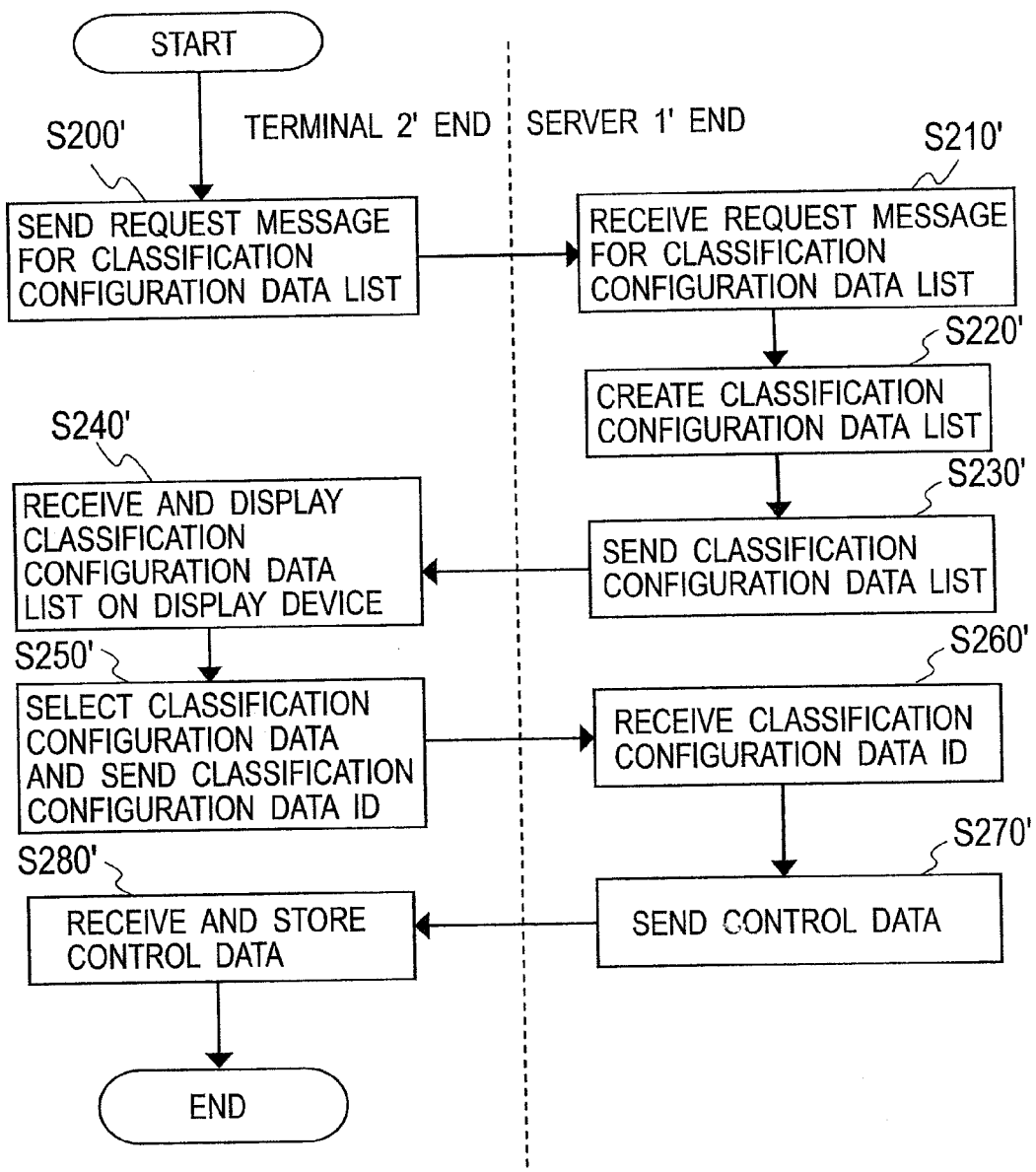
FIG. 46 is a flowchart showing a different download process of control data.

Description is now made of another example of download process of control data, with reference to a flowchart in FIG. 46.

In this process, there is the need of description data to be stored in the classification configuration data memory portion 11' of the server 1'. Without this process, the description data can be omitted.

At a step S200', on the terminal 2', the controller 35' transmits a request message for a classification configuration data list, that is a view of classification configuration data, through the transmitter-receiver 34 to the server 1', At a step S210', on the server 1' end, the controller 13' receives a request message for a classification configuration data list from the terminal 2', and at a step S220', in accordance with the request, reads data from the classification configuration data memory portion 11' to create a classification configuration data list. Specifically, all classification configuration data IDs and description data stored in the classification configuration data memory portion 11' are related and read to be as a classification configuration data list.

At a step S230', the controller 13' transmits the created classification configuration data list through the transmitter-receiver 12 to the terminal 2'.

At a step S240', on the terminal 2', the controller 35' receives a classification configuration data list through the transmitter-receiver 34 from the server 1' to display on the display device 41.

Figure 47:
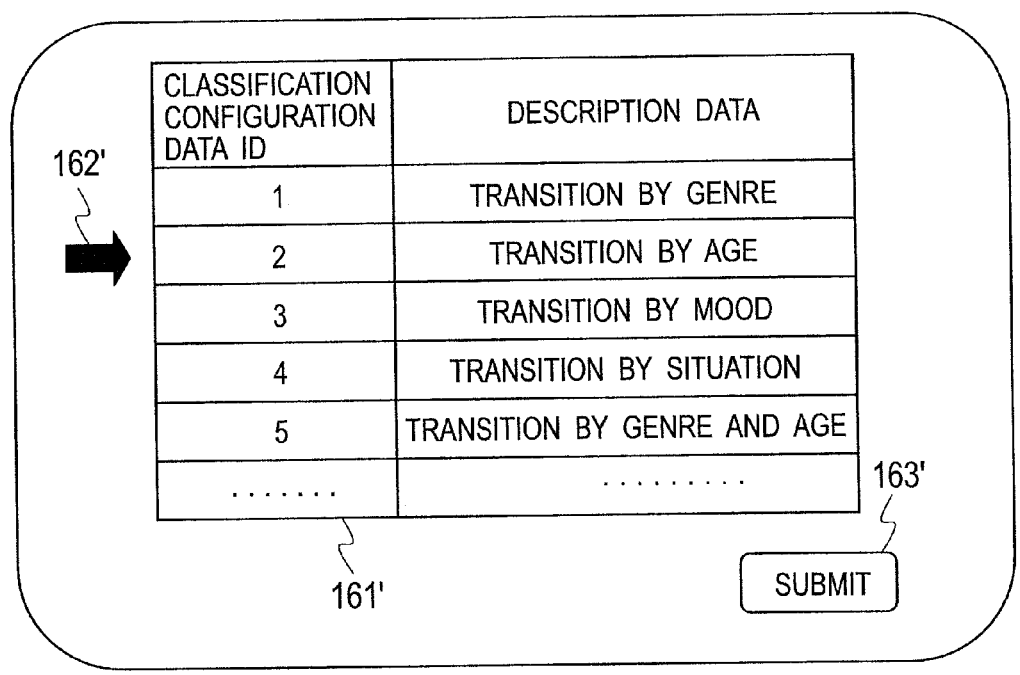
FIG. 47 is a diagram illustrating a screen display of a classification configuration data list.

FIG. 47 is a diagram illustrating a classification configuration data list displayed on the display device 41, corresponding to FIG. 16 of the first embodiment.

In a classification configuration data list 161' in FIG. 47, classification configuration data IDs are related to description data to be displayed, but only description data may be displayed. A curser 162' and a submit button 163' are similar to those in FIG. 16.

Back to FIG. 46, at a step S250', when a user selects classification configuration data from the classification configuration data list 161' displayed on the display device 41, the controller 35' receives an instruction through the input device 40 from the user, and transmits a classification configuration data ID corresponding to the instruction through the transmitter-receiver 34 to the server 1'.

At a step S260', on the server 1', the controller 13' receives a classification configuration data ID through the transmitter-receiver 12 from the terminal 2', and at a step S270', reads a set of classification configuration data and a set of transition command data corresponding to the received classification configuration data ID from the classification configuration data storage 11' to transmit as control data through the transmitter-receiver 12 to the terminal 2'.

At a step S280', on the terminal 2', the controller 35' receives the control data through the transmitter-receiver 34 from the server 1' and stores in the classification configuration data memory portion 31'.

According to the foregoing download process of control data, a user can select one from plural sets of classification configuration data, allowing for an enhancement of user's satisfaction.

In the fifth embodiment, there may be use of either download process of control data in FIG. 45 or 46. In the foregoing description, there is description of a start of process by user's menu selection. In addition, there may be a transmission of request message for classification configuration data from the terminal 2' to the server 1' at a predetermined time interval. There may be further storage of control data on the terminal 2' in advance.

Figure 48:
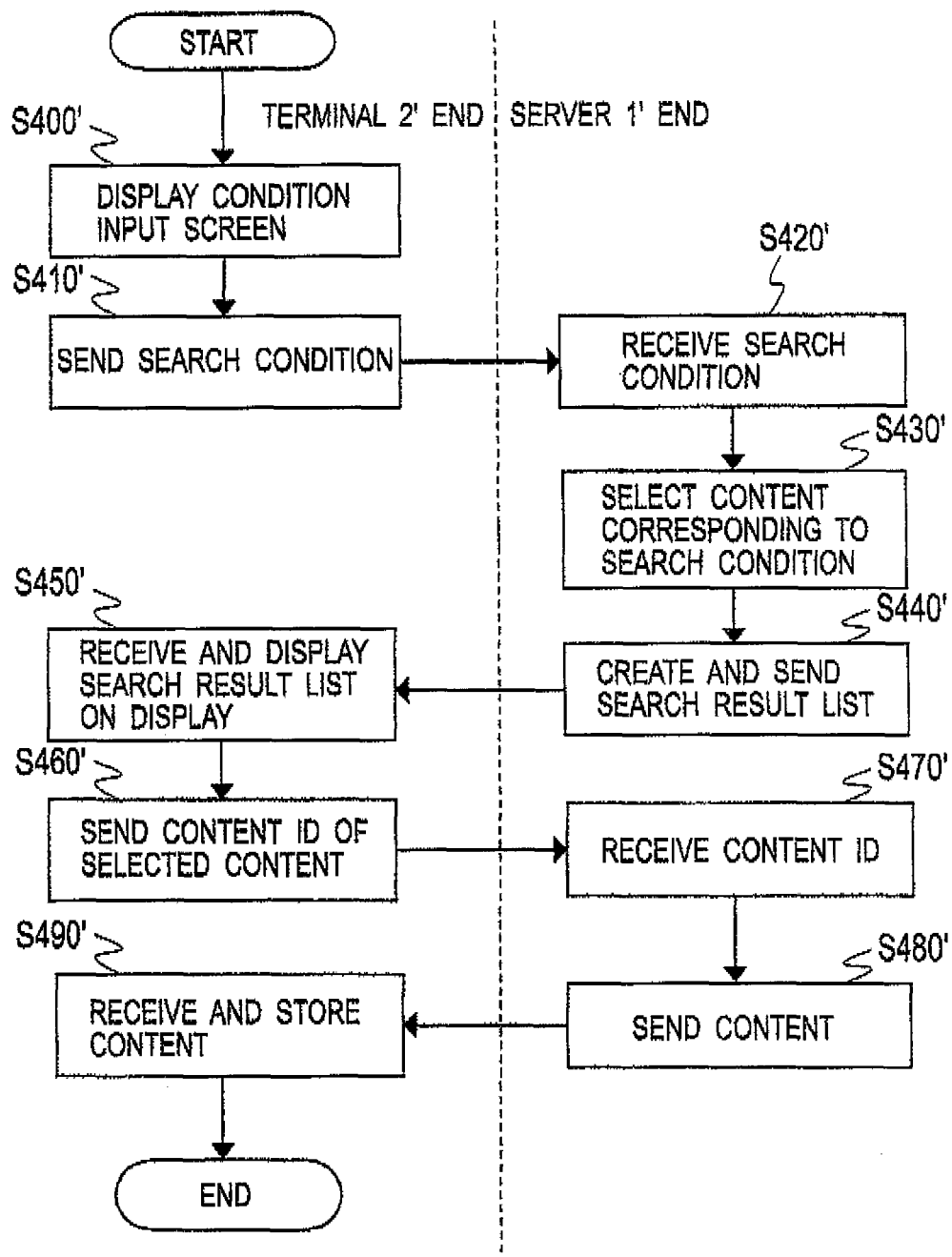
FIG. 48 is a flowchart showing a content download process.

FIG. 48 is a flowchart showing a content download process on the terminal 2' and the server 1' when a user selects a menu item of "2: Download of content" from the menu screen 131' in FIG. 44.

Figure 49:
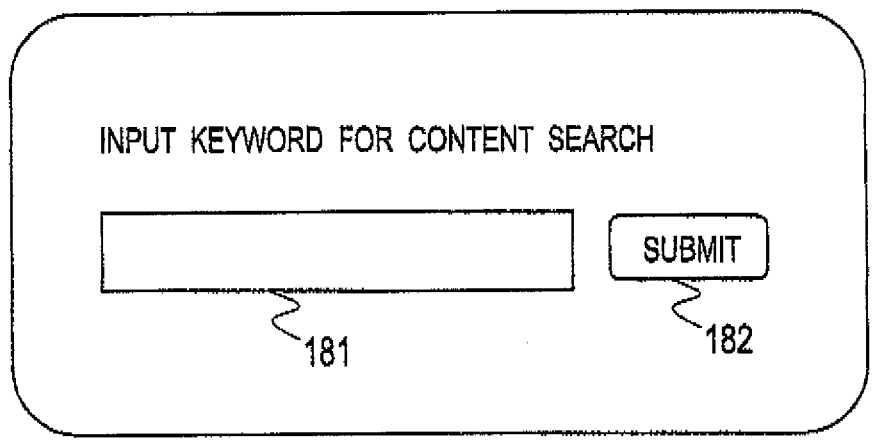
FIG. 49 is a diagram illustrating a screen display for an input of search condition.

At a step S400', on the terminal 2', the controller 35', for example, displays a search condition input screen as shown in FIG. 49 on the display device 41. A user looks at the screen and operates the input device 40 to input a search condition for desired content. In the example in FIG. 49, a search condition is input in a text box 181. There may be also selection from a genre, a time of production, a mood, a situation suitable for reproduction, or the like. There may be a combination of search conditions by AND condition or OR condition for search. In the example in FIG. 49, when the submit button 182 is clicked with no input in the text box 181, it is interpreted as no condition is specified, thereby targeting all contents stored in the server 1'.

At a step S410', when the submit button 182 is clicked, the controller 35' transmits a search condition input in the text box 181 through the transmitter-receiver 34 to the server 1'.

At a step S420', on the server 1', the controller 13' receives a search condition through the transmitter-receiver 12, and at a step S430', with reference to the content memory portion 10', selects a delivery file in accordance with the search condition. Specifically, when a keyword is specified as the search condition, the controller 13' checks whether or not to correspond to a character string recorded in a header 61' in deliver file. When a search condition is not specified at all, all contents are targeted for selection.

At a step S440', the controller 13' reads a header 61' of content selected at the step S430', and gives a content ID to information in the header 61' for unique identification, to create a search result list for transmission through the transmitter-receiver 12 to the terminal 2'. As a content ID, for example, there can be use of a path name of delivery file. The search result list includes information of a title of content, a producer, and the like. There may be headers 61' of deliver files to be stored in a database in advance, and instead of direct read of header 61' of deliver file at the steps S430' and S440', the database may be read for process.

At a step S450', on the terminal 2', the controller 35' receives a search result list through the transmitter-receiver 34 to display on the display device 41.

Figure 50:
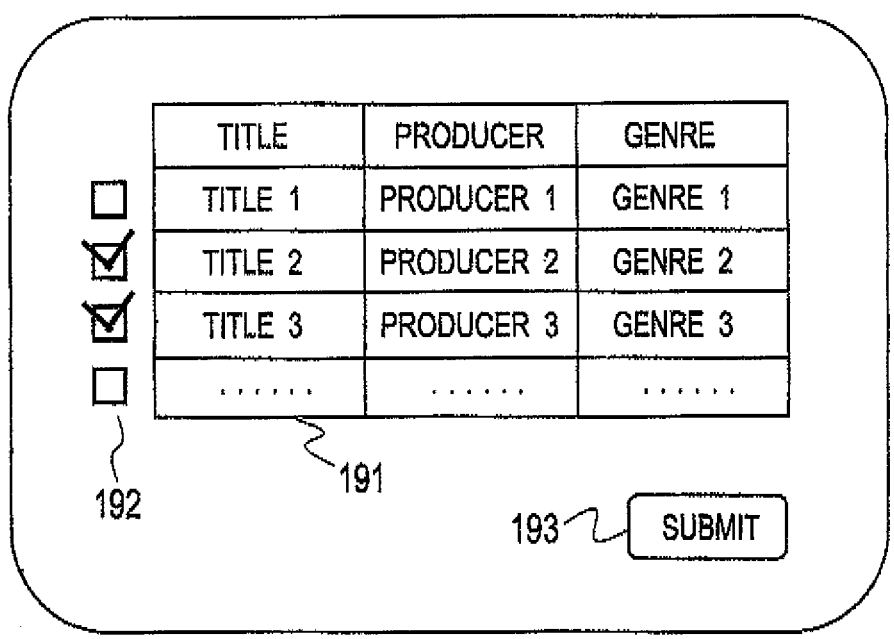
FIG. 50 is a diagram illustrating a screen display for a search result.

FIG. 50 is a diagram showing a display example of a search result list on the display device 41 by the controller 35'.

In this example, as a search result list 191, there is display of titles of contents, producers, and genres, but not limited to this. Even though there is no display of content IDs, displayed titles of contents, etc and content IDs are associated. A user checks a check box 192 shown on the left side of title of content which one desires to download, and clicks the submit button 193, thereby instructing a download of the content. By checking check boxes 192, there can be an instruction for download of contents.

After a selection of content for download in this way, at a step S 460', the controller 35' transmits a content ID of content selected by the user through the transmitter-receiver 34 to the server 1'.

At a step S470', on the server 1', the controller 13' receives a content ID through the transmitter-receiver 12, and at a step S480', reads a delivery file of content corresponding to the content ID from the content memory portion 10' for transmission through the transmitter-receiver 12 to the terminal 2'. It is noted that for reception of content IDs, corresponding all delivery files are transmitted.

At a step S490', on the terminal 2', the controller 35' receives a delivery file through the transmitter-receiver 34 to store in the content memory portion 30'. The content download process is as described.

Figure 51:
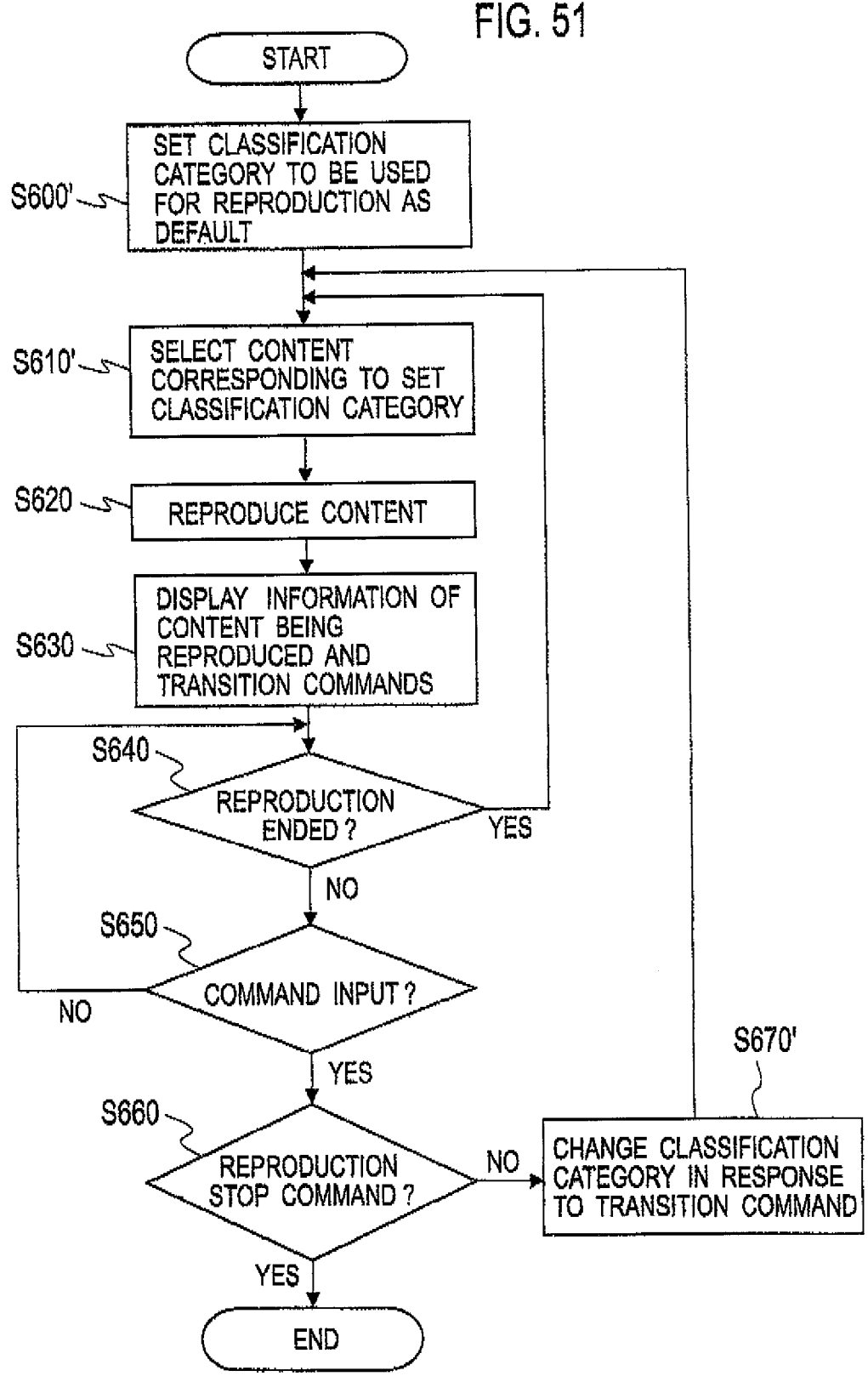
FIG. 51 is a flowchart showing a content reproduction process.

FIG. 51 is a flowchart showing a content reproduction process when a menu item of "3: Reproduction of content" is selected from the menu screen 131', corresponding to FIG. 17 of the first embodiment.

FIG. 51 corresponds to FIG. 17 in the first embodiment Difference from FIG. 17 is only a replacement of "playlist ID" at the steps S600, S610 and S670 in FIG. 17 to "category of classification" at the steps S600', S610', and S670' in FIG. 51, and other steps are similar to those in FIG. 17, thus omitting redundant description.

Figure 52:
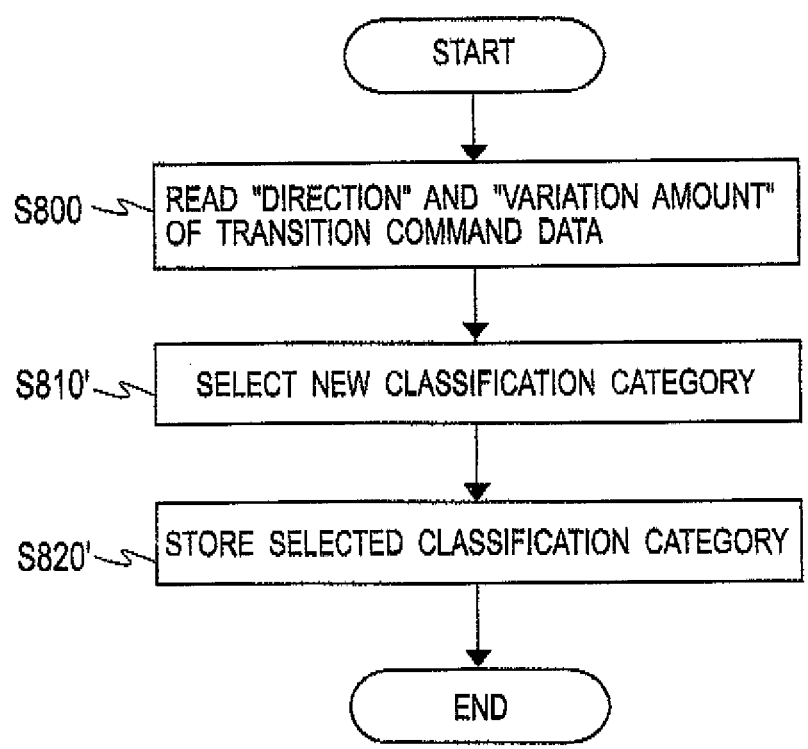
FIG. 52 is a flowchart showing a change process of category of classification.

FIG. 52 is a flowchart showing details of a changeover process of category of classification at the step S670' in FIG. 51.

FIG. 52 corresponds to FIG. 19 in the first embodiment Difference from FIG. 19 is only a replacement of "playlist ID" at the steps S810 and S820 in FIG. 19 to "category of classification" at the steps S810' and S820' in FIG. 52, and other steps are similar to those in FIG. 19, thus omitting redundant description.

Description is now made of details of a process at the step S 810' in FIG. 52 for each format of classification configuration data.

Figure 53:
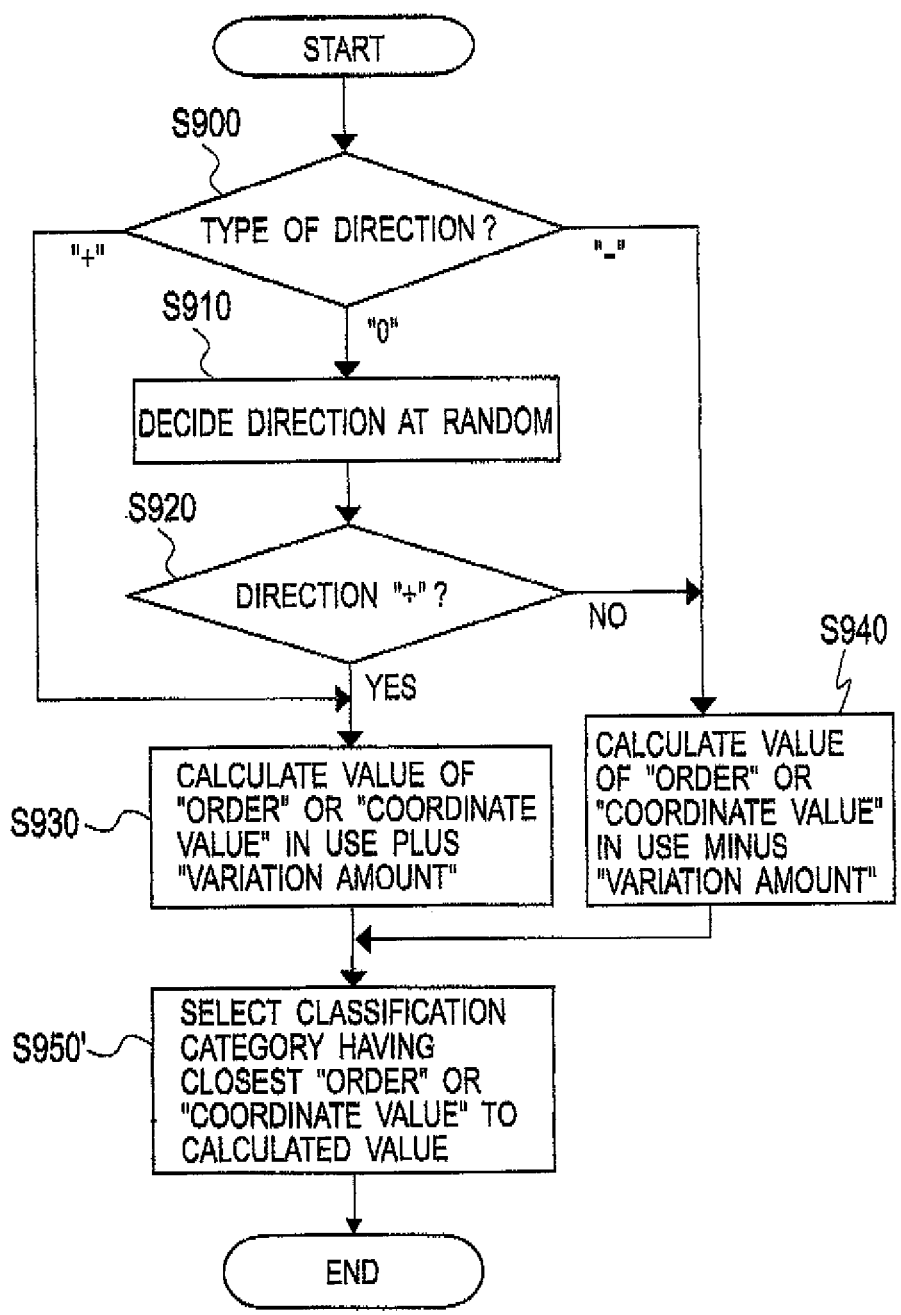
FIG. 53 is a flowchart showing details of a selection process of category of classification.

FIG. 53 is a flowchart showing details of the process at the step S810' for classification configuration data in the first format using "order" in FIG. 38, or in the second format using "coordinate value" in FIG. 39.

FIG. 53 corresponds to FIG. 20 in the first embodiment. There is only a change of "playlist" at the step of S950 in FIG. 20 to "category of classification" at the step of S950' in FIG. 53, and other steps are similar to those in FIG. 20, thus describing only the step S950'.

That is, at the step S950', the controller 35' of the fifth embodiment refers to the classification configuration data memory portion 31' to select a category of classification having a closest "order" or "coordinate value" to a calculated value at the step S930 or S940. Here, a selection is made except for a category of classification originally stored in the state memory portion 36, thereby causing a changeover among categories of classification without fail.

The foregoing is details of the process at the step S810' using "order" or "coordinate values" for categories of classification.

Figure 54:
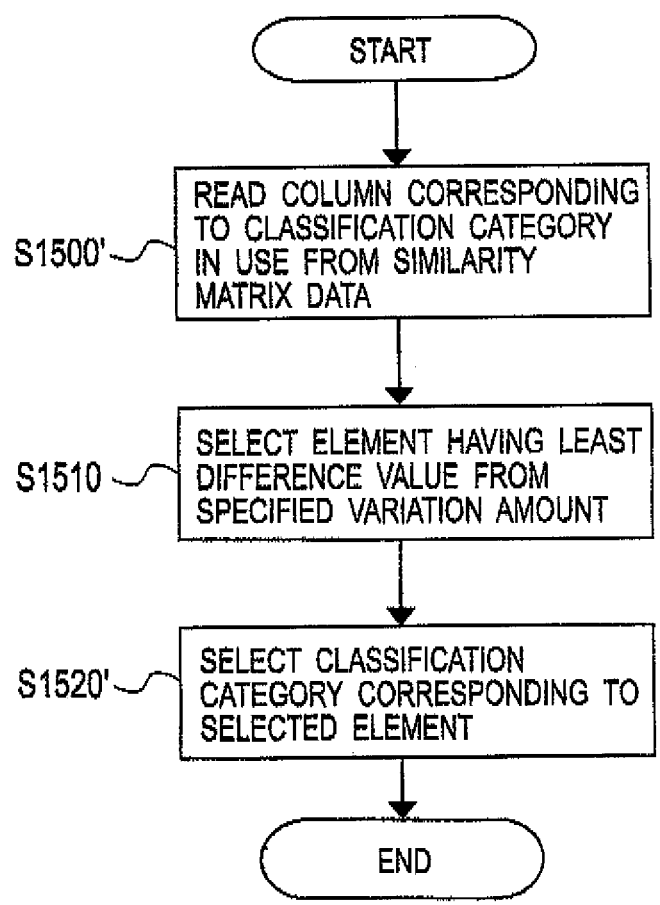
FIG. 54 is a flowchart showing details of another selection process of category of classification.

Description is now made of details of a process at the step S810' for classification configuration data using "similarities" in FIG. 40, with reference to a flowchart in FIG. 54.

FIG. 54 corresponds to FIG. 21 in the first embodiment. There is only a change of "playlist" at the steps of S1500 and S1520 in FIG. 21 to "category of classification" at the steps of S1500' and S1520' in FIG. 54, and other steps are similar to those in FIG. 20, thus omitting redundant description.

The foregoing description is for the content reproduction process on the terminal 2' of the fifth embodiment. By the foregoing content reproduction process, in the fifth embodiment, more intuitive operations are possible, compared to a method to display names of categories of classification on the display device 41 for selection by user.

Such being the case, according to the fifth embodiment, the server 1' transmits a set of classification configuration data representing relationships between categories of classification for contents being classified by category, through the network 3 to the terminal 2'. The terminal 2' receives the set of classification configuration data, and, for a reproduction of content, makes a changeover among categories of classification for contents in accordance with the set of classification configuration data, to reproduce the content of category of classification after change. As well as the first embodiment employing playlists, this allows for a reproduction of content in accordance with a state of mind the user may have, even from a plenty of contents with a facilitated operation.

According to the fifth embodiment, every set of classification configuration data has an addition of set of transition commands representing directions for change and variation amounts in corresponding categories of classification, and display messages corresponding to variation amounts of transition commands, respectively. The terminal 2' displays display messages for user's selection, allowing for employment of a method, based on a category of classification, to specify a relative change therefrom, to change to another category of classification for reproduction of the content.

According to the fifth embodiment, this eliminates times and labors that otherwise might have been necessitated to prepare playlists with processes of transition of impressions defined in advance, and enables an intuitive operation to effect a changeover among various categories of classification, permitting reproduction of the content. As a result, as well as the first embodiment, there come up favorable applications such as making use of a trail listening before purchase of contents as a chance of access to a plenty of contents available from the server 1.

According to the fifth embodiment, there can be a transmission of classification configuration data from the server 1' to the terminal 2' to update classification configuration data on the terminal 2', thus having an effect of facilitating an addition of new category of classification.

Further, according to the fifth embodiment, a user on the terminal 2' can request a preferred one from sets of classification configuration data to the server 1' to have a transmission thereof from the server 1' for use. Thus the user can define a process of transition of categories of classification in accordance with one's preference. Accordingly, a changeover among sets of classification configuration data in accordance with user's preference renews the process of transition of categories of classification even for contents the user already have. Thus, the user does not get tired easily, and user's interest or attention for contents or delivery service will be kept without difficulty. For a reproduction of even known contents for a user, the contents are reproduced with a changeover among categories of classification for reproduction of contents in accordance with a set of playlist configuration data, increasing a chance to discover a surprising similarity or commonality between contents for multifaceted enjoyments.

(Sixth Embodiment)

Description is now made of a sixth embodiment of the present invention. The entire configuration of system of the sixth embodiment is similar to that in FIG. 1. According to the sixth embodiment, a server 1a' is connected to a terminal 2' through a network 3. The configuration and operations of the terminal 2' of the sixth embodiment are similar to those of the fifth embodiment, thus describing only the server 1a'.

Figure 55:
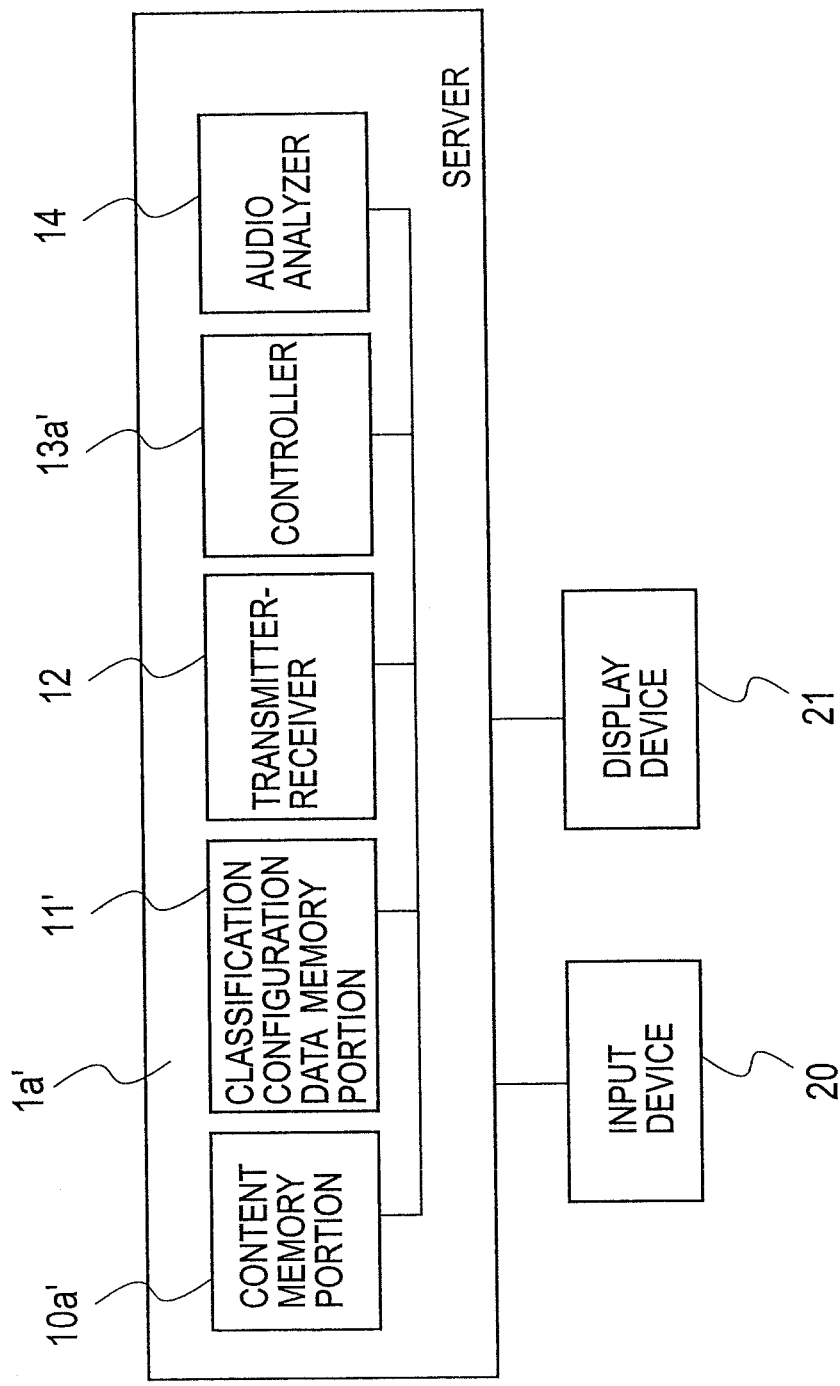
FIG. 55 is a block diagram showing a configuration of a server according to a sixth embodiment.

FIG. 55 illustrates a configuration of the server 1a' of the sixth embodiment In the server 1a' of the sixth embodiment, compared to the server 1' of the fifth embodiment, an audio analyzer 14 is added, and functions of a content memory portion 10a' and a controller 13a' are slightly different. Other constituent elements are similar to those of the fifth embodiment. That is, there is a replacement of the playlist configuration data memory portion 11 of the server 1a of the second embodiment in FIG. 22 to a classification configuration data memory portion 11'. The audio analyzer 14 is similar to that of the second embodiment in FIG. 22.

Figure 56:
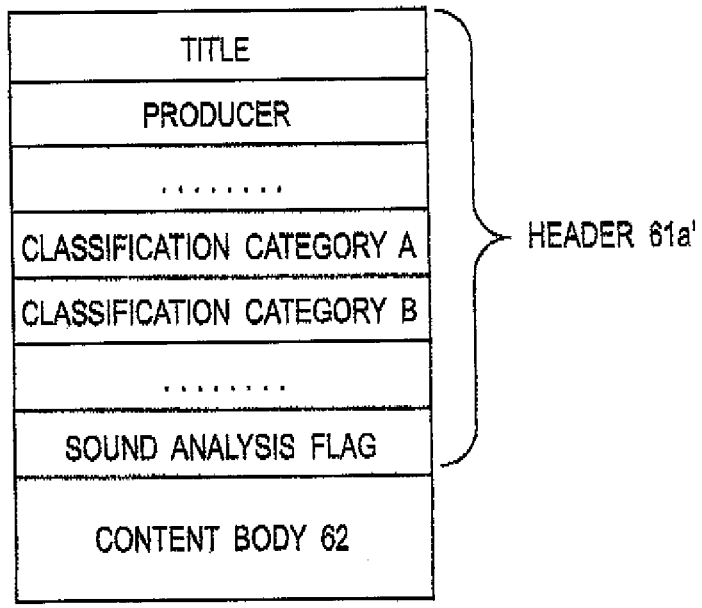
FIG. 56 is a diagram showing a format of a delivery file according to the sixth embodiment.

FIG. 56 illustrates a storage format of delivery file according to the sixth embodiment.

Difference of a delivery file of the sixth embodiment in FIG. 56 from that of the second embodiment in FIG. 23 is that a header 61a' includes a category of classification. Difference from the delivery file of the fifth embodiment in FIG. 36 is that the header 61a' includes an audio analysis flag. As described in the fifth embodiment, in the sixth embodiment, categories of classification can be also recorded in a content. Therefore, in addition to a category of classification acquired by audio analysis, another category of classification can be recorded. At a step of creation of content, an audio analysis flag is set as '0'. At the step S1040, while a category of classification is recorded, the audio analysis flag is changed to '1'. The foregoing description is for the audio analysis process.

Accordingly, on the server 1' of the fifth embodiment, there is the need of giving a category of classification to content by an operator, an administrator, or the like. On the server 1a' of the sixth embodiment, as well as the second embodiment, since a header 61a' of delivery file includes an audio analysis flag, a category of classification is given to a content automatically on the terminal end.

Therefore, in addition to the effects of the fifth embodiment, the sixth embodiment further permits a significant cut of, among others, man-hours or costs. In the sixth embodiment, combined use of a category of classification given by hand and that by audio analysis allows for a provision of various and multifaceted playlists.

(Seventh Embodiment)

Description is now made of a seventh embodiment.

The seventh embodiment corresponds to the third embodiment in FIG. 26. There is a replacement of the terminal 2a in FIG. 26 to a terminal 2a' of the seventh embodiment using classification configuration data, and also the reproduction device 4 in FIG. 26 to a reproduction device 4' of the seventh embodiment using present classification configuration data.

It is noted that the server of the seventh embodiment can be either one of the server 1' of the fifth embodiment in FIG. 35, and the server 1a' of the sixth embodiment in FIG. 55. For simplified description, it will be described as the server 1' later on. Operations of the server are similar to those of the fifth or sixth embodiments, and redundant description will be omitted.

Figure 57:
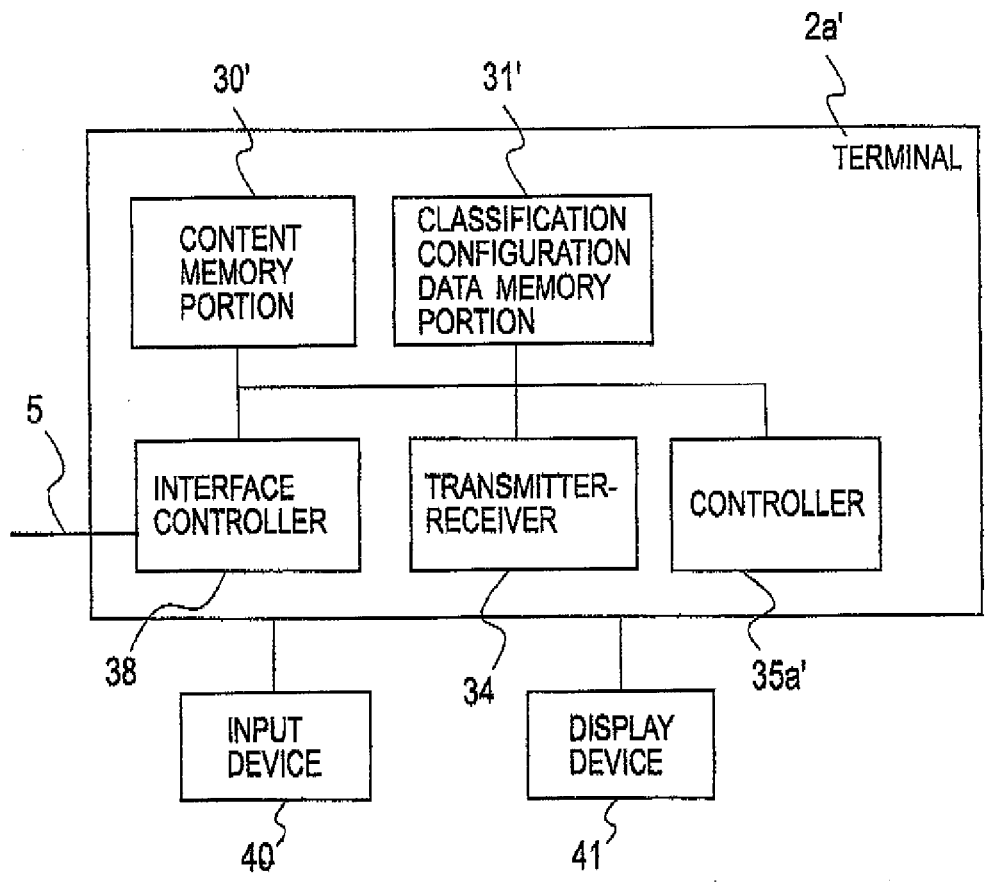
FIG. 57 is a block diagram showing a configuration of a terminal according to a seventh embodiment.

FIG. 57 is a block diagram illustrating a configuration of the terminal 2a' of the seventh embodiment.

In FIG. 57, the terminal 2a' includes a content memory portion 30', a classification configuration data memory portion 31', a transmitter-receiver 34, a controller 35a', and an interface controller 38, and has an input device 40 and a display device 41 connected thereto.

According to the seventh embodiment, the terminal 2a' connected through a network 3 to a server 1', includes the reproduction device 4' connected thereto, through an interface 5 similar to that of the third embodiment. The connection between the terminal 2a' and the reproduction device 4' can be disconnected at any time.

Figure 58:
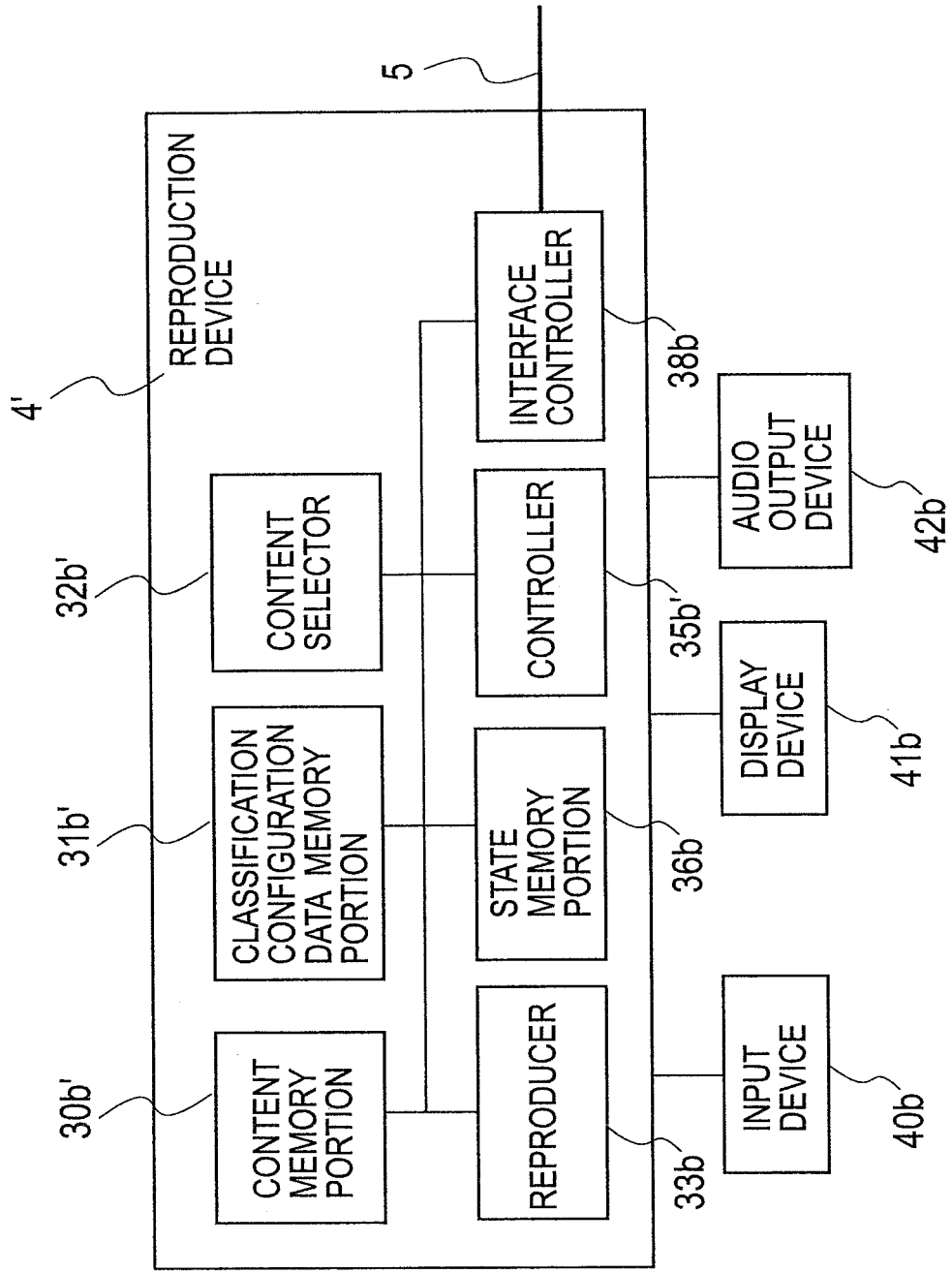
FIG. 58 is a block diagram showing a configuration of a reproduction device according to the seventh embodiment.

FIG. 58 is a block diagram illustrating a configuration of the reproduction device 4' of the seventh embodiment.

In FIG. 58, the reproduction device 4' includes a content memory portion 30b', a classification configuration data memory portion 31b', a content selector 32b', a reproducer 33b, a controller 35b', a state memory portion 36b, and an interface controller 38b, and has an input device 40b, a display device 41b and an audio output device 42b connected thereto. It is noted that the reproduction device 4', and the input device 40b, display device 41b and audio output device 42b may be configured as a single device, to be a portable reproduction device.

In the seventh embodiment, as well as the third embodiment, after power-on, there is a menu screen as shown in FIG. 29 to be displayed on the display device 41 of the terminal 2a'. When a user selects each menu item of "1: Download of control data", and "2: Download of content", operations of the terminal 2a' and the server 1' are similar to those of the fifth embodiment.

Figure 59:
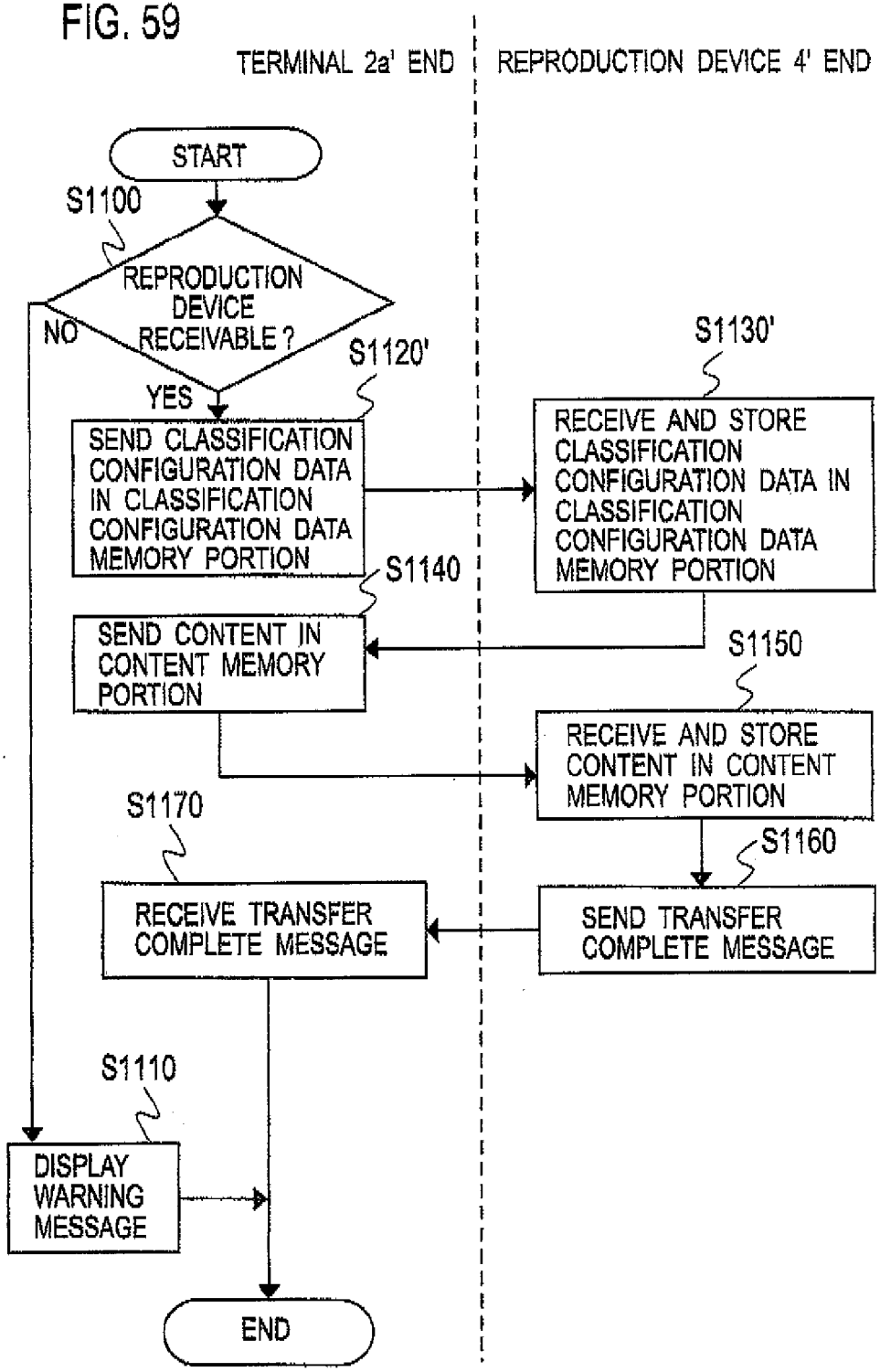
FIG. 59 is a flowchart showing a transfer process to the reproduction device according to the seventh embodiment.

FIG. 59 is a flowchart showing operations of the terminal 2a' and the reproduction device 4' of the seventh embodiment when a user selects "3: Transfer to reproduction device" from the menu screen shown in FIG. 29.

FIG. 59 corresponds to FIG. 31 of the third embodiment. The process at the steps S1120 and S1130 in FIG. 31 of the third embodiment is based on "playlist", while that at steps S1120' and S1130' in FIG. 59 of the seventh embodiment is based on "category of classification". Other steps are similar to those in FIG. 31.

That is, at a step S1100, on the terminal 2a' of the seventh embodiment, the interface controller 38 checks whether or not the reproduction device 4' is in a state available for reception of data. If it is available for reception of data (Yes at the S1100), at a step S1120', the interface controller 38 reads a set of classification configuration data from the classification configuration data memory portion 31' to transmit through the interface 5 to the reproduction device 4'.

At a step S1130', on the reproduction device 4' of the seventh embodiment, the interface controller 38b receives a set of classification configuration data from the terminal 2a' to store in the classification configuration data memory portion 31b'. It is noted that following steps are similar to those of the third embodiment in FIG. 31, and redundant description will be omitted.

The foregoing description is for the transfer process of classification configuration data and content from the terminal 2a' to the reproduction device 4' of the seventh embodiment. It is noted that as well as the third embodiment, after the transfer process is completed, a user can disconnect the reproduction device 4' from the interface 5 to start a reproduction operation as necessary.

The reproduction operation on the reproduction device 4' of the seventh embodiment is similar to that on the terminal 2' of the fifth embodiment in FIG. 43. That is, there are similar operations taken by: the content memory portion 30b' of the reproduction device 4' and the content memory portion 30' of the terminal 2'; the classification configuration data memory portion 31b' of the reproduction device 4' and the classification configuration data memory portion 31' of the terminal 2'; the content selector 32b' of the reproduction device 4' and the content selector 32' of the terminal 2'; the reproducer 33b of the reproduction device 4' and the reproducer 33 of the terminal 2'; the controller 35'b of the reproduction device 4' and the controller 35' of the terminal 2'; and the state memory portion 36b of the reproduction device 4' and the state memory portion 36 of the terminal 2', respectively.

Therefore, according to the seventh embodiment, even for the reproduction device 4' without a direct connection to the server 1', there can be a connection through the terminal 2a' having a communication function to the server 1', to download, among others, classification configuration data and contents, permitting a reproduction of content with a facilitated changeover among categories of classification, and thus a reproduction of content in accordance with a state of mind the user may have.

(Eighth Embodiment)

Description is now made of an eighth embodiment of the present invention. According to the eighth embodiment, as well as the fourth embodiment, there is no storage of contents on the terminal but streaming from the server to the terminal.

Figure 60:
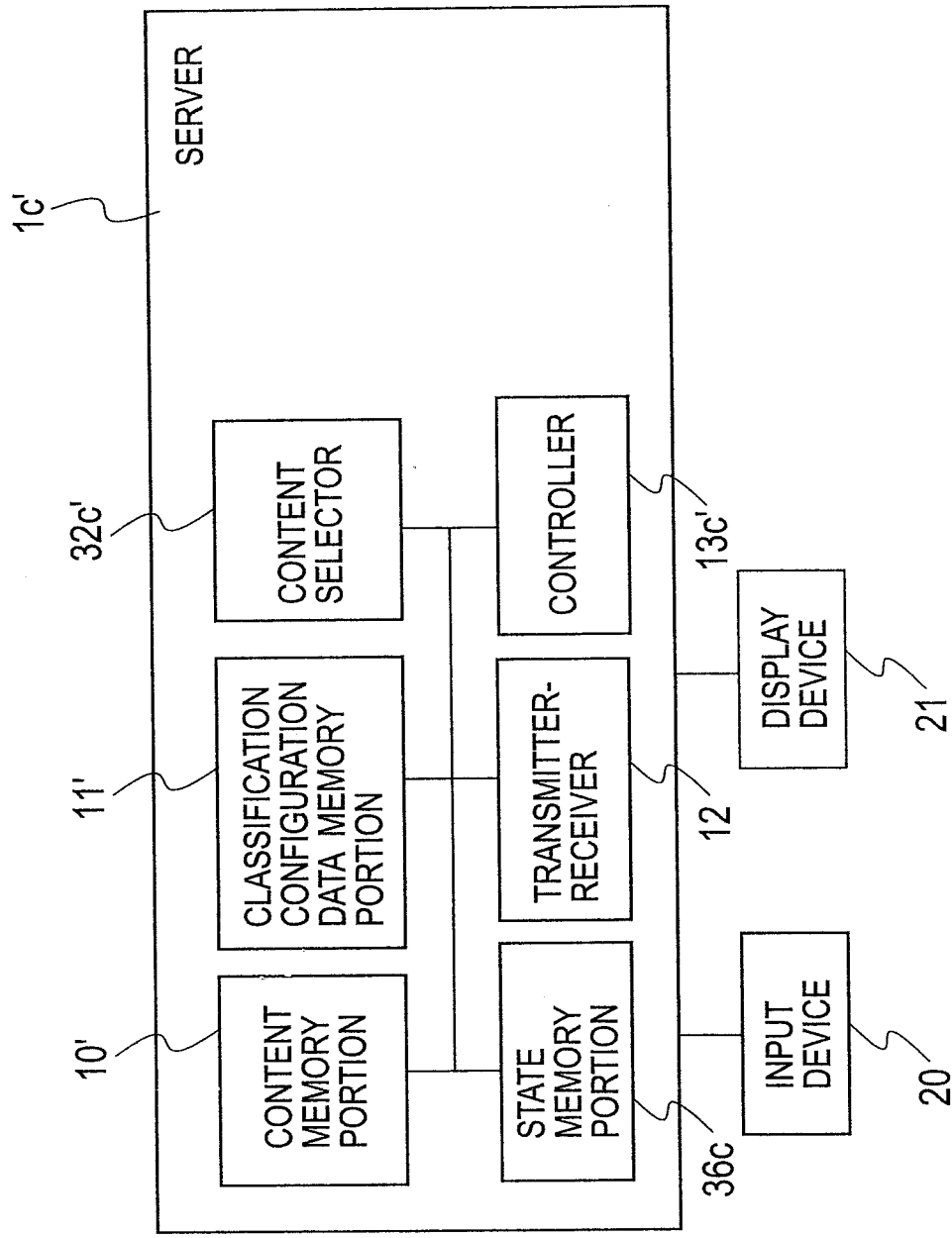
FIG. 60 is a block diagram showing a configuration of a server according to an eighth embodiment.

FIG. 60 is a block diagram illustrating a configuration of the server 1c' of the eighth embodiment.

The server 1c' of the eighth embodiment includes a content memory portion 10', a classification configuration data memory portion 11', a transmitter-receiver 12, a controller 13c', a content selector 32c', and a state memory portion 36c', and has an input device 20 and a display device 21 connected thereto. Here, operations of the content memory portion 10', classification configuration data memory portion 11', and transmitter-receiver 12 are similar to those in the eighth embodiment. Operations of the content selector 32c', and state memory portion 36c are similar to the content selector 32' and state memory portion 36 of the terminal 2' of the eighth embodiment, respectively. Omitted in the eighth embodiment, as well as the sixth embodiment, the server 1c' may include an audio analyzer 14.

It is noted that the terminal 2c' of the eighth embodiment is similar to the terminal 2c of the fourth embodiment in FIG. 33, and description is made with reference to the configuration in FIG. 33. Unlike the fifth embodiment, there is no need of transmission of classification configuration data, and only the need of transmission of transition command data as control data from the server 1c' to the terminal 2c'. After user's instruction for a start of content reproduction, prior to the content reproduction process, there may be a transmission of transition command data from the server 1c' to the terminal 2c'. The transition command data memory portion 39 stores a classification configuration data ID corresponding to the transition command data.

Description is now made of operations.

FIG. 61 is a flowchart showing a content reproduction process on the server 1c' and the terminal 2c' of the eighth embodiment.

FIG. 61 corresponds to FIG. 34 of the fourth embodiment. Processes at the steps S1220, S1230 and S1320 in FIG. 34 of the fourth embodiment are based on "playlist", while those at steps S1220', S1230' and S1320' in FIG. 61 of the eight embodiment are based on "category of classification". Other steps are similar to those in FIG. 34.

That is, at a step S1200, on the terminal 2c', the controller 35c' reads a classification configuration data ID from the transition command data memory portion 39 to include in a reproduction start message to transmit through the transmitter-receiver 34 to the server 1c'. At a step S1210, on the server 1c', the controller 13c' receives a reproduction start message through the transmitter-receiver 12, and stores a classification configuration data ID included in the reproduction start message in the state memory portion 36c.

At a step S1220', the controller 13c' refers to the classification configuration data memory portion 11' to select one of categories of classification stored therein to be used for reproduction as default, to store in the state memory portion 36c. For classification configuration data configured in layers, there is selection of a category of classification in the lowest layer.

At a step S1230', the content selector 32c selects a content corresponding to a category of classification stored in the state memory portion 36c from the content memory portion 10'. Specifically, from each delivery file stored in the content memory portion 10', categories of classification in a header 61' are read to create a collection of contents corresponding to a category of classification stored in the state memory portion 36c, and then a content is selected from the collection. There may be a content not reproduced after a start of content reproduction operation to be selected preferentially. Or, there may be the frequency of reproduction for every content to be stored in the content memory portion 10' for a preferential selection of content having the highest frequency of reproduction. To the contrary, there may be a preferential selection of content having the lowest frequency of reproduction. There may be use of header information of time of production of a content, etc. for selection. Then, a path name of file of selected content is stored in the state memory portion 36c.

Processes at steps S1240 to S1310 are similar to those in the fourth embodiment in FIG. 34. It is noted that, at the step S1260, the controller 35c' displays information of content included in a header 61' of a received delivery file, while reading a set of transition commands for changeovers among categories of classification from the transition command data memory portion 39 for display on the display device 41.

Then, if the controller 35c' determines it is not for a reproduction stop message (No at the step S1310), it is for a transition message. At a step S1320', the controller 13c' makes a changeover of classification categories based on information of a "layer", a "direction", and a "variation amount" included in a transition message, and stores the new category of classification in the state memory portion 36c. The control flow goes back to the step S1230', and repeats the foregoing processes. If the controller 35c' determines it is a reproduction end message at the step S1300 (Yes at the step S1300), the control flow also goes back to the step S1230'.

Here, when a set of classification configuration data corresponding to a classification configuration data ID stored in the state memory portion 36c of the server 1c' at the step S1210 is in the format using "order" in FIG. 38, or in the format using "coordinate values" in FIG. 39, a classification configuration changeover process in response to a transition message at the step S1320' is almost similar to that of the fifth embodiment in FIG. 53. After the steps of S900 to S950' shown in FIG. 53, a selected classification configuration is stored in the state memory portion 36c. Unlike the fifth embodiment, each element not of the terminal 2'(2c') but of the server 1c' implements processes.

Details of the step 1320' for classification configuration data in the format using "similarities" in FIG. 40 are similar to processes of the fifth embodiment in FIG. 54. After the steps of S1500' to S1520' in FIG. 54, a selected category of classification is stored in the state memory portion 36c. In this case, unlike the fifth embodiment, each element not of the terminal 2'(2c') but of the server 1c' implements processes.

Other processes are similar to those of the third to fifth embodiments.

Therefore, according to the eighth embodiment, when the server $1c'$ streams contents, there is no need of storage of contents on the terminal $2c'$ or selection of contents corresponding to a category of classification, allowing for making the terminal $2c'$ at low cost. From contents stored in the server $1c'$, there is an intuitive operation enabled to effect a changeover among various categories of classification, permitting reproduction of the content. There come up favorable applications such as making use of a trial listening before purchase of contents as a chance of access to a plenty of contents provided by the server.

It is noted that in the eighth embodiment, the terminal $2c'$ does not include a classification configuration data memory 31, and there is no transmission of classification configuration data from the server $1c'$ to the terminal $2c'$, but the present invention is not limited to this. For example, as well as the fifth embodiment, the terminal $2c'$ may include a classification configuration data memory portion $31'$ instead of the transition command data memory portion 39. After the server $1c'$ transmits a set of classification configuration data to the terminal $2c'$, as well as the fifth embodiment, processes corresponding to the steps S1220' and S1320' may be implemented on the terminal $2c'$, and a content selection process at the step S1230' may be implemented on the server $1c'$. That is, on the terminal $2c'$, a category of classification selected based on the set of classification configuration data may be transmitted from the terminal $2c'$ to the server $1c'$, and on the server $1c'$, a content corresponding to the category of classification may be selected to be transmitted to the terminal $2c'$.

In the fifth to eighth embodiments, there has been description of delivery of not only classification configuration data but also a content as delivery file by the server, the present invention is not limited to this. Contents may be provided to a terminal by a media of an optical disk of a CD, a DVD, a BD, etc. It may be further provided by broadcast by a broadcaster. For a delivery through the network, a server to deliver contents, and a server to deliver classification configuration data may be separate servers, as a matter of course.

According to the fifth to eighth embodiments, from a plenty of contents provided by the server, a user can reproduce a content in accordance with a state of mind the user may have, by user of categories of classification with a facilitated operation. Based on a content being reproduced, the user can specify a relative change therefrom, to make a changeover to another category of classification for reproduction of the content, allowing for an intuitive operation.

The fifth to eighth embodiments eliminate times and labors that otherwise might have been necessitated to prepare playlists with processes of transition of impressions defined in advance, and enables an intuitive operation to effect a changeover among various categories of classification, permitting reproduction of the content. As a result, there come up favorable applications such as making use of a trail listening before purchase of contents as a chance of access to a plenty of contents available from the server 1.

The server transmits classification configuration data to the terminal, etc. to update those on the terminal, etc., thus facilitating an addition of new category of classification.

Further, a user can make a selection from sets of classification configuration data for use. Thus, the user can define a process of transition of categories of classification in accordance with one's preference. A changeover among sets of classification configuration data renews the process of transition of categories of classification even for contents the user already have. Thus, the user does not get tired easily, and user's interest or attention for contents or delivery service will be kept without difficulty.

Industrial Applicability

The present invention is available for a server configured to provide a delivery service of content of, among other, music, or movie, a terminal having a communication function, including a personal computer and a mobile phone, etc. configured to receive the content for reproduction, and further a reproduction device, such as a portable content reproducer, etc. connectable to the terminal.

The invention claimed is:

1. A terminal comprising:
a playlist configuration data memory configured to store a set of playlist configuration data including a plurality of playlists represented in numerical values, respectively, and a set of transition commands, each transition command including a variation quantity which is a numerical value showing a difference between playlists for changeover from one playlist to another;
a reproducer configured to reproduce a content in accordance with a playlist; and
a controller implemented by a central processing unit (CPU) configured to use data stored in the playlist configuration data memory to control the reproducer;
wherein the numerical values in the set of playlist configuration data are one of:
numerical values assigned to the plurality of playlists in a prescribed order, and numerical values assigned to the plurality of playlists in a prescribed coordinate,
wherein the set of transition commands includes a plurality of transition commands in which respective variation quantities differ,
wherein the numerical value showing the difference included in each transition command is a numerical value corresponding to a difference in one of: the prescribed order, and the prescribed coordinate, between a pre-changeover playlist and a post-changeover playlist,
and wherein the controller is configured to work for a reception of an input specifying a transition command from the set of transition commands from outside, to have a numerical value corresponding to a playlist being used by the reproducer when the input is received, shown in the set of playlist configuration data, to have an addition thereto or a subtraction therefrom, of a variation quantity shown by the transition command specified by the input, to select a playlist represented by a closest or corresponding numerical value to a numerical value obtained by the addition or the subtraction, to change from a reproduction being implemented by the reproducer to a reproduction in accordance with the selected playlist, and to work for a reception of an input from outside to specify a set of playlist configuration data from plural sets of playlist configuration data stored in a server, to store the set of playlist configuration data transmitted from the server, in the playlist configuration data memory.

2. The terminal according to claim 1, wherein
the controller is configured to decide randomly between an addition or a subtraction of the variation quantity shown by the transition command specified by the input from outside, to the numerical value shown in the set of playlist configuration data.

3. A terminal comprising:
a playlist configuration data memory configured to store a set of playlist configuration data including a plurality of playlists represented, respectively, in numerical values, and a set of transition commands, each transition command including a variation quantity which is a numerical value showing a difference between playlists for changeover from one playlist to another;

a reproducer configured to reproduce a content in accordance with a playlist; and a controller implemented by a central processing unit (CPU) configured to use data stored in the playlist configuration data memory to control the reproducer;

wherein the numerical values in the set of playlist configuration data are numerical values assigned to similarities between playlists, wherein the set of transition commands includes a plurality of transition commands in which respective variation quantities differ, wherein the numerical value showing the difference included in each transition command is a numerical value corresponding to a similarity between a pre-changeover playlist and a post-changeover playlist, and wherein the controller is configured to work for a reception of an input specifying a transition command from the set of transition commands from outside, to select a playlist having a similarity with a playlist being used by the reproducer when the input is received, shown by a closest or corresponding numerical value to a numerical value shown by the transition command specified by the input, to change from a reproduction being implemented by the reproducer to a reproduction in accordance with the selected playlist, and to work for a reception of an input from outside to specify a set of playlist configuration data from plural sets of playlist configuration data stored in a server, to store the set of playlist configuration data transmitted from the server, in the playlist configuration data storage.

4. A reproduction device connectable through an interface to a terminal connected through a network to a server, the reproduction device comprising:

a playlist configuration data memory configured to store a set of playlist configuration data including a plurality of playlists represented in numerical values, respectively, and a set of transition commands, each transition command including a variation quantity which is a numerical value showing a difference value between playlists for changeover from one playlist to another;

a reproducer configured to reproduce a content in accordance with a playlist;

an interface controller configured to communicate with the terminal through the interface; and a controller implemented by a central processing unit (CPU) configured to use data stored in the playlist configuration data memory to control the reproducer;

wherein the numerical values in the set of playlist configuration data are one of:

numerical values assigned to the plurality of playlists in a prescribed order, and numerical values assigned to the plurality of playlists in a prescribed coordinate, wherein the set of transition commands includes a plurality of transition commands in which respective variation quantities differ, wherein the numerical value showing the difference included in each transition command is a numerical value corresponding to a difference in one of: the prescribed order, and the prescribed coordinate, and wherein the controller is configured to work for a reception through the interface controller, of a set of playlist configuration data acquired by the terminal from plural sets of playlist configuration data stored in the server, to store the set of playlist configuration data in the playlist configuration data memory, and to work for a reception of an input specifying a transition command from the set of transition commands, to have a numerical value corresponding to a playlist being used by the reproducer when the input is received, shown in the set of playlist configuration data, to have an addition thereto or a subtraction therefrom, of a variation quantity shown by the transition command specified by the input, to select a playlist represented by a closest or corresponding numerical value to a numerical value obtained by the addition or the subtraction, to change from a reproduction being implemented by the reproducer to a reproduction in accordance with the selected playlist.

5. The reproduction device according to claim 4, wherein the controller is configured to decide randomly between an addition or a subtraction of the variation quantity shown by the transition command specified by the input, to the numerical value shown in the set of playlist configuration data.

6. A reproduction device connectable through an interface to a terminal connected through a network to a server, the reproduction device comprising:

a playlist configuration data memory configured to store a set of playlist configuration data including a plurality of playlists represented in numerical values, respectively, and a set of transition commands, each transition command including a variation quantity which is a numerical value showing a similarity between playlists for changeover from one playlist to another;

a reproducer configured to reproduce a content in accordance with a playlist;

an interface controller configured to communicate with the terminal through the interface; and a controller implemented by a central processing unit (CPU) configured to use data stored in the playlist configuration data memory to control the reproducer;

wherein the numerical values in the set of playlist configuration data are numerical values assigned to similarities between playlists, wherein the set of transition commands includes a plurality of transition commands in which respective variation quantities differ, wherein the numerical value showing the difference included in each transition command is a numerical value corresponding to a similarity between a pre-changeover playlist and a post-changeover playlist, and wherein the controller is configured to work for a reception through the interface controller, of a set of playlist configuration data acquired by the terminal from plural sets of playlist configuration data stored in the server, to store the set of playlist configuration data in the playlist configuration data memory, and to work for a reception of an input specifying a transition command from the plurality of transition commands, to select a playlist having a similarity with a playlist being used by the reproducer when the input is received, shown by a closest or corresponding numerical value to a numerical value shown by the transition command specified by the input, to change from a reproduction being implemented by the reproducer to a reproduction in accordance with the selected playlist.

7. A server comprising:

a playlist memory configured to store a plurality of playlists for streaming of a content to a terminal;

a playlist configuration data memory configured to store a set of playlist configuration data including the plurality of playlists represented in numerical values, respectively, and a set of transition commands, each transition command including a variation quantity which is a numerical value showing a difference between playlists for changeover from one playlist to another; and a controller implemented by a central processing unit (CPU) configured to use data stored in the playlist memory and the playlist configuration data memory to control a streaming reproduction;

wherein the numerical values in the set of playlist configuration data are one of:

numerical values assigned to the plurality of playlists in a prescribed order, and numerical values assigned to the plurality of playlists in a prescribed coordinate, wherein the set of transition commands includes a plurality of transition commands in which respective variation quantities differ, wherein the numerical value showing the difference included in each transition command is a numerical value corresponding to a difference in one of: the prescribed order, and the prescribed coordinate, and wherein the controller is configured to work for a reception of an input specifying a transition command from the set of transition commands from the terminal, to have a numerical value corresponding to a playlist being used for a streaming reproduction by a reproducer when the input is received, shown in the set of playlist configuration data, to have an addition thereto or a subtraction therefrom, of a variation quantity shown by the transition command specified by the input, to select a playlist represented by a closest or corresponding numerical value to a numerical value obtained by the addition or the subtraction, to change from a streaming reproduction being implemented by the reproducer to a streaming reproduction in accordance with the selected playlist.

8. The server according to claim 7, wherein the controller is configured to decide randomly between an addition or a subtraction of the variation quantity shown by the transition command specified by the input, to the numerical value shown in the set of playlist configuration data.

9. The server, comprising:

a playlist memory configured to store a plurality of playlists for streaming of a content to a terminal;

a playlist configuration data memory configured to store a set of playlist configuration data including the plurality of playlists represented in numerical values, respectively, and a set of transition commands, each transition command including a variation quantity which is a numerical value showing a similarity between playlists for changeover from one playlist to another; and a controller implemented by a central processing unit (CPU) configured to use data stored in the playlist memory and the playlist configuration data memory to control a streaming reproduction;

wherein the numerical values in the set of playlist configuration data are numerical values assigned to similarities between playlists, wherein the set of transition commands includes a plurality of transition commands in which respective variation quantities differ, wherein the numerical value showing the difference included in each transition command is a numerical value corresponding to a similarity between a pre-changeover playlist and a post-changeover playlist, and wherein the controller is configured to work for a reception of an input specifying a transition command from the set of transition commands from the terminal, to select a playlist having a similarity with a playlist being used for a streaming reproduction by a reproducer when the input is received, represented by a closest or corresponding numerical value to a numerical value shown by the transition command specified by the input, to change from a streaming reproduction being implemented by the reproducer to a streaming reproduction in accordance with the selected playlist.

10. A terminal comprising:

a reproducer configured to reproduce a content in accordance with a category of classification;

a classification configuration data memory configured to store a set of classification configuration data including a plurality of categories of classification represented in numerical values, respectively, and a set of transition commands, each transition command including a variation quantity which is a numerical value showing a difference between categories of classification for changeover from one category of classification to another; and a controller implemented by a central processing unit (CPU) configured to use data stored in the classification configuration data memory to control the reproducer;

wherein the numerical values in the set of classification configuration data are one of:

numerical values assigned to the plurality of categories of classification in a prescribed order, and numerical values assigned to the plurality of categories of classification in a prescribed coordinate, wherein the set of transition commands includes a plurality of transition commands in which respective variation quantities differ, wherein the numerical value showing the difference included in each transition command is a numerical value corresponding to a difference in one of: the prescribed order, and the prescribed coordinate, between a pre-changeover category of classification and a post-changeover category of classification, and wherein the controller is configured to work for a reception of an input specifying a transition command from the set of transition commands from outside, to have a numerical value corresponding to a category of classification being used by the reproducer when the input is received, shown in the set of classification configuration data, to have an addition thereto or a subtraction therefrom, of a variation quantity shown by the transition command specified by the input, to select a category of classification represented by a closest or corresponding numerical value to a numerical value obtained by the addition or the subtraction, to change from a reproduction being implemented by the reproducer to a reproduction in accordance with the selected category of classification, and to work for a reception of an input from outside to specify a set of classification configuration data from plural sets of classification configuration data stored in a server, to store the set of classification configuration data transmitted from the server, in the classification configuration data memory.

11. The terminal according to claim 10, wherein the controller is configured to decide randomly between an addition or a subtraction of the variation quantity shown by the transition command specified by the input, to the numerical value shown in the set of classification configuration data.

12. A terminal comprising:
a reproducer configured to reproduce a content in accordance with a category of classification;
a classification configuration data memory configured to store a set of classification configuration data including a plurality of categories of classification represented in numerical values, respectively, and a set of transition commands, each transition command including a variation quantity which is a numerical value showing a difference between categories of classification for changeover from one category of classification to another; and
a controller implemented by a central processing unit (CPU) configured to use data stored in the classification configuration data memory to control the reproducer;
wherein the numerical values in the set of classification configuration data are numerical values assigned to similarities between categories of classification,
wherein the set of transition commands includes a plurality of transition commands in which respective variation quantities differ,
wherein the numerical value showing the difference included in each transition command is a numerical value corresponding to a similarity between a pre-changeover category of classification and a post-changeover category of classification,
and wherein the controller is configured to work for a reception of an input specifying a transition command from the set of transition commands from outside, to select a category of classification having a similarity with a category of classification being used by the reproducer when the input is received, shown by a closest or corresponding numerical value to a numerical value shown by the transition command specified by the input, to change from a reproduction being implemented by the reproducer to a reproduction in accordance with the selected category of classification, and to work for a reception of an input from outside to specify a set of classification configuration data from plural sets of classification configuration data stored in a server, to store the set of classification configuration data transmitted from the server, in the classification configuration data storage.

13. A reproduction device connectable through an interface to a terminal connected through a network to a server, the reproduction device comprising:
a reproducer configured to reproduce a content in accordance with a category of classification;
an interface controller configured to communicate with the terminal through the interface;
a classification configuration data memory configured to store a set of classification configuration data including a plurality of categories of classification represented in numerical values, respectively, and a set of transition commands, each transition command including a variation quantity which is a numerical value showing a difference between categories of classification for changeover from one category of classification to another; and
a controller implemented by a central processing unit (CPU) configured to use data stored in the classification configuration data memory to control the reproducer;
wherein the numerical values in the set of classification configuration data are one of:
numerical values assigned to the plurality of categories of classification in a prescribed order, and numerical values assigned to the plurality of categories of classification in a prescribed coordinate,
wherein the set of transition commands includes a plurality of transition commands in which respective variation quantities differ,
wherein the numerical value showing the difference included in each transition command is a numerical value corresponding to a difference in one of: the prescribed order, and the prescribed coordinate, between a pre-changeover category of classification and a post-changeover category of classification,
and wherein the controller is configured to work for a reception through the interface controller, of a set of classification configuration data acquired by the terminal from plural sets of classification configuration data stored in the server, to store the set of classification configuration data in the classification configuration data memory, and to work for a reception of an input specifying a transition command from the set of transition commands, to have a numerical value corresponding to a category of classification being used by the reproducer when the input is received, shown in the set of classification configuration data, to have an addition thereto or a subtraction therefrom, of a variation quantity shown by the transition command specified by the input, to select a category of classification represented by a closest or corresponding numerical value to a numerical value obtained by the addition or the subtraction, to change from a reproduction being implemented by the reproducer to a reproduction in accordance with the selected category of classification.

14. The reproduction device according to claim 13, wherein
the controller is configured to decide randomly between an addition or a subtraction of the variation quantity shown by the transition command specified by the input, to the numerical value shown in the set of classification configuration data.

15. A reproduction device connectable through an interface to a terminal connected through a network to a server, the reproduction device comprising:
a reproducer configured to reproduce a content in accordance with a category of classification;
an interface controller configured to communicate with the terminal through the interface;
a classification configuration data memory configured to store a set of classification configuration data including a plurality of categories of classification represented in numerical values, respectively, and a set of transition commands, each transition command including a variation quantity which is a numerical value showing a difference between categories of classification for changeover from one category of classification to another; and
a controller implemented by a central processing unit (CPU) configured to use data stored in the classification configuration data memory to control the reproducer;
wherein the numerical values in the set of classification configuration data are numerical values assigned to similarities between categories of classification,
wherein the set of transition commands includes a plurality of transition commands in which respective variation quantities differ,
wherein the numerical value showing the difference included in each transition command is a numerical value corresponding to a similarity between a pre-changeover category of classification and a post-changeover category of classification, and wherein the controller is configured to work for a reception through the interface controller, of a set of classification configuration data acquired by the terminal from plural sets of classification configuration data stored in the server, to store the set of classification configuration data in the classification configuration data memory, and to work for a reception of an input specifying a transition command from the set of transition commands, to select a category of classification having a similarity with a category of classification being used by the reproducer when the input is received, shown by a closest or corresponding numerical value to a numerical value shown by the transition command specified by the input, to change from a reproduction being implemented by the reproducer to a reproduction in accordance with the selected category of classification.

16. A server comprising:
a classification category memory configured to store a plurality of categories of classification for streaming of a content to a terminal;
a classification configuration data memory configured to store a set of classification configuration data including the plurality of categories of classification represented in numerical values, respectively and a set of transition commands, each transition command including a variation quantity which is a numerical value showing a difference between categories of classification for changeover from one category of classification to another;
a controller implemented by a central processing unit (CPU) configured to use data stored in the classification category memory and the classification configuration data memory to control a streaming reproduction;
wherein the numerical values in the set of classification configuration data are one of:
numerical values assigned to the plurality of categories of classification in a prescribed order, and numerical values assigned to the plurality of categories of classification in a prescribed coordinate,
wherein the set of transition commands includes a plurality of transition commands in which respective variation quantities differ,
wherein the numerical value showing the difference included in each transition command is a numerical value corresponding to a difference in one of: the prescribed order, and the prescribed coordinate, between a pre-changeover category of classification and a post-changeover category of classification,
and wherein the controller is configured to work for a reception of an input specifying a transition command from the set of transition commands from the terminal, to have a numerical value corresponding to a category of classification being used for a streaming reproduction by the reproducer when the input is received, shown in the set of classification configuration data, to have an addition thereto or a subtraction therefrom, of a variation quantity shown by the transition command specified by the input, to select a category of classification represented by a closest or corresponding numerical value to a numerical value obtained by the addition or the subtraction, to change from a streaming reproduction being implemented by the reproducer to a streaming reproduction in accordance with the selected category of classification.

17. The server according to claim 16, wherein
the controller is configured to decide randomly between an addition or a subtraction of the variation quantity shown by the transition command specified by the input, to the numerical value shown in the set of classification configuration data.

18. A server comprising:
a classification category memory configured to store a plurality of categories of classification for streaming of a content to a terminal;
a classification configuration data memory configured to store a set of classification configuration data including the plurality of categories of classification represented in numerical values, respectively, and a set of transition commands, each transition command including a variation quantity which is a numerical value showing a difference between categories of classification for changeover from one category of classification to another; and
a controller implemented by a central processing unit (CPU) configured to use data stored in the classification category memory and the classification configuration data memory to control a streaming reproduction;
wherein the numerical values in the set of classification configuration data are numerical values assigned to similarities between categories of classification,
wherein the set of transition commands includes a plurality of transition commands in which respective variation quantities differ,
wherein the numerical value showing the difference included in each transition command is a numerical value corresponding to a similarity between a pre-changeover category of classification and a post-changeover category of classification,
and wherein the controller is configured to work for a reception of an input specifying a transition command from the set of transition commands from the terminal, to select a category of classification having a similarity with a category of classification being used for a streaming reproduction by the reproducer when the input is received, represented by a closest or corresponding numerical value to a numerical value shown by the transition command specified by the input, to change from a streaming reproduction being implemented by the reproducer to a streaming reproduction in accordance with the selected category of classification.

19. The terminal according to claim 1, wherein
the playlist configuration data memory is configured to store the set of playlist configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a playlist being used by the reproducer when the input is received.

20. The terminal according to claim 1, wherein
the set of playlist configuration data and the set of transition commands stored in the playlist configuration data memory have a respective hierarchical structure.

21. The terminal according to claim 3, wherein
the playlist configuration data memory is configured to store the set of playlist configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a playlist being used by the reproducer when the input is received.

22. The terminal according to claim 3, wherein
the set of playlist configuration data and the set of transition commands stored in the playlist configuration data memory have a respective hierarchical structure.

23. The reproduction device according to claim 4, wherein
the playlist configuration data memory is configured to store the set of playlist configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a playlist being used by the reproducer when the input is received.

24. The reproduction device according to claim 4, wherein
the set of playlist configuration data and the set of transition commands stored in the playlist configuration data memory have a respective hierarchical structure.

25. The reproduction device according to claim 6, wherein
the playlist configuration data memory is configured to store the set of playlist configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a playlist being used by the reproducer when the input is received.

26. The reproduction device according to claim 6, wherein
the set of playlist configuration data and the set of transition commands stored in the playlist configuration data memory have a respective hierarchical structure.

27. The server according to claim 7, wherein
the playlist configuration data memory is configured to store the set of playlist configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a playlist being used by the reproducer when the input is received.

28. The server according to claim 7, wherein
the set of playlist configuration data and the set of transition commands stored in the playlist configuration data memory have a respective hierarchical structure.

29. The server according to claim 9, wherein
the playlist configuration data memory is configured to store the set of playlist configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a playlist being used by the reproducer when the input is received.

30. The server according to claim 9, wherein
the set of playlist configuration data and the set of transition commands stored in the playlist configuration data memory have a respective hierarchical structure.

31. The terminal according to claim 10, wherein
the classification configuration data memory is configured to store the set of classification configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a category of classification being used by the reproducer when the input is received.

32. The terminal according to claim 10, wherein
the set of classification configuration data and the set of transition commands stored in the classification configuration data memory have a respective hierarchical structure.

33. The terminal according to claim 12, wherein
the classification configuration data memory is configured to store the set of classification configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a category of classification being used by the reproducer when the input is received.

34. The terminal according to claim 12, wherein
the set of classification configuration data and the set of transition commands stored in the classification configuration data memory have a respective hierarchical structure.

35. The reproduction device according to claim 13, wherein
the classification configuration data memory is configured to store the set of classification configuration data, the variation quantities, and the set of transition commands related to a set of messages corresponding to the variation quantities, respectively, and wherein the controller is configured to show the set of messages to a user and to work for a reception of an input specifying a transition command by a selection of a message by the user; to add or subtract a variation quantity shown by the transition command specified by the input to or from a numerical value corresponding to a category of classification being used by the reproducer when the input is received.

36. The reproduction device according to claim 13, wherein
the set of classification configuration data and the set of transition commands stored in the classification configuration data memory have a respective hierarchical structure.

37. The reproduction device according to claim 15, wherein
the classification configuration data memory is configured to store the set of classification configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a category of classification being used by the reproducer when the input is received.

38. The reproduction device according to claim 15, wherein
the set of classification configuration data and the set of transition commands stored in the classification configuration data memory have a respective hierarchical structure.

39. The server according to claim 16, wherein
the classification configuration data memory is configured to store the set of classification configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a category of classification being used by the reproducer when the input is received.

40. The server according to claim 16, wherein
the set of classification configuration data and the set of transition commands stored in the classification configuration data memory have a respective hierarchical structure.

41. The server according to claim 18, wherein
the classification configuration data memory is configured to store the set of classification configuration data, the variation quantities, and the set of transition commands related to a set of messages corresponding to the variation quantities, respectively, and wherein
the controller is configured to show the set of messages to a user and to work for a reception of an input specifying a transition command by a selection of a message by the user; to add or subtract a variation quantity shown by the transition command specified by the input to or from a numerical value corresponding to a category of classification being used by the reproducer when the input is received.

42. The server according to claim 18, wherein
the set of classification configuration data and the set of transition commands stored in the classification configuration data memory have a respective hierarchical structure.

* * * * *